United States Patent
Saito et al.

(12)

(10) Patent No.: US 8,619,389 B1
(45) Date of Patent: Dec. 31, 2013

(54) MAGNETIC HEAD FOR PERPENDICULAR MAGNETIC RECORDING HAVING A WRITE SHIELD

(71) Applicant: TDK Corporation, Tokyo (JP)

(72) Inventors: Masahiro Saito, Tokyo (JP); Norikazu Ota, Tokyo (JP); Masaya Kato, Tokyo (JP); Atsushi Matsuo, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/777,387

(22) Filed: Feb. 26, 2013

(51) Int. Cl.
*G11B 5/17* (2006.01)
*G11B 5/187* (2006.01)

(52) U.S. Cl.
USPC .................................. 360/123.06

(58) Field of Classification Search
USPC ............ 360/123.06, 123.03, 123.11, 123.12, 360/125.3
See application file for complete search history.

(56) References Cited

U.S. PATENT DOCUMENTS

| | | | |
|---|---|---|---|
| 5,995,342 | A | 11/1999 | Cohen et al. |
| 6,301,077 | B1 | 10/2001 | Sasaki |
| 7,365,943 | B2 | 4/2008 | Yamakawa et al. |
| 7,633,711 | B2 | 12/2009 | Hsiao et al. |
| 7,748,104 | B2 | 7/2010 | Bonhote et al. |
| 8,203,803 | B2 | 6/2012 | Etoh et al. |
| 8,411,390 | B2 * | 4/2013 | Franca-Neto et al. ... 360/123.06 |
| 8,470,186 | B2 * | 6/2013 | Chen et al. ...................... 216/22 |
| 8,472,139 | B2 * | 6/2013 | Urakami et al. ........... 360/125.3 |
| 8,514,518 | B2 * | 8/2013 | McFadyen et al. ........ 360/125.3 |
| 2005/0111138 | A1 | 5/2005 | Yamakawa et al. |
| 2005/0128637 | A1 | 6/2005 | Johnston et al. |
| 2006/0132971 | A1 | 6/2006 | Clinton et al. |
| 2007/0035885 | A1 | 2/2007 | Im et al. |
| 2007/0188915 | A1 | 8/2007 | Aoki |
| 2009/0034121 | A1 | 2/2009 | Ohta et al. |
| 2009/0067098 | A1 | 3/2009 | Kim et al. |
| 2009/0116144 | A1 | 5/2009 | Lee et al. |
| 2011/0255196 | A1* | 10/2011 | Wu et al. ..................... 360/244.2 |
| 2012/0218663 | A1 | 8/2012 | Sasaki et al. |
| 2012/0314323 | A1 | 12/2012 | Sasaki et al. |
| 2013/0057987 | A1 | 3/2013 | Sasaki et al. |

FOREIGN PATENT DOCUMENTS

| | | |
|---|---|---|
| JP | A-61-150118 | 7/1986 |
| JP | A-1-282715 | 11/1989 |
| JP | A-2-235211 | 9/1990 |
| JP | A-5-101337 | 4/1993 |
| JP | A-9-147319 | 6/1997 |
| JP | A-2004-362668 | 12/2004 |

OTHER PUBLICATIONS

U.S. Appl. No. 13/708,507, filed Dec. 7, 2012.
U.S. Appl. No. 13/967,811, filed Aug. 15, 2013.
Office Action dated Oct. 17, 2013 issued in U.S. Appl. No. 13/708,507.

* cited by examiner

*Primary Examiner* — Angel Castro
(74) *Attorney, Agent, or Firm* — Oliff & Berridge, PLC

(57) ABSTRACT

A write shield includes first and second shield portions located on opposite sides of a main pole in a track width direction. A return path section includes first and second yoke portions located on opposite sides of the main pole in the track width direction. A coil surrounds at least part of the entire outer periphery of the main pole when viewed from a medium facing surface. The coil includes a first magnetic portion located in a first space between the main pole and the first yoke portion, and a second magnetic portion located in a second space between the main pole and the second yoke portion. The first and second magnetic portions are made of a magnetic conductive material.

23 Claims, 30 Drawing Sheets

MAGNETIC HEAD FOR PERPENDICULAR MAGNETIC RECORDING HAVING A WRITE SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a write shield.

2. Description of Related Art

The recording systems of magnetic recording devices such as magnetic disk drives include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head unit having a magnetoresistive element (hereinafter, also referred to as MR element) for reading and a write head unit having an induction-type electromagnetic transducer for writing are stacked. The write head unit includes a main pole that produces a write magnetic field in a direction perpendicular to the plane of a recording medium.

In a magnetic disk drive, the magnetic head is mounted on a slider that flies slightly above the surface of a recording medium. The magnetic head has a medium facing surface to face the surface of the recording medium. The recording medium includes a magnetic recording layer. Tracks are concentrically formed in the magnetic recording layer. The tracks are the area of the magnetic recording layer on which data is to be written.

Here, the side of positions closer to a leading end relative to a reference position will be defined as the leading side, and the side of positions closer to a trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks in the neighborhood of a track targeted for writing are erased or attenuated during writing of a signal on the track targeted for writing. In the present application, this phenomenon will be called unwanted erasure. Unwanted erasure includes adjacent track erasure (ATE) and wide-area track erasure (WATE). To achieve higher recording density, it is necessary to prevent unwanted erasure.

In order to prevent unwanted erasure induced by the skew and achieve higher recording density, it is effective to provide a write shield in the vicinity of the main pole. For example, U.S. Patent Application Publication No. 2005/0128637 A1 discloses a magnetic head having a write shield (a first side shorting shield, a second side shorting shield, a top shorting shield, and a bottom shorting shield) that has an end face wrapping around an end face of the main pole in the medium facing surface.

U.S. Pat. No. 7,633,711 B2 discloses a magnetic head having a write shield (a trailing shield) that has an end face located in the medium facing surface at an area from the trailing side of the end face of the main pole to opposite sides of the end face of the main pole in the track width direction.

U.S. Pat. No. 7,365,943 B2 discloses a magnetic head having a write shield (a shield yoke) that has end faces located in the medium facing surface at positions on opposite sides of the end face of the main pole in the track width direction.

The write shield has the function of capturing a magnetic flux that is produced from the end face of the main pole and spreads in directions other than the direction perpendicular to the plane of the recording medium, so as to prevent the magnetic flux from reaching the recording medium. A magnetic head having the write shield is capable of preventing unwanted erasure and capable of providing further improved recording density.

To make full use of the function of the write shield, it is preferred to provide a return path section for connecting the write shield and part of the main pole away from the medium facing surface to each other. The write shield and the return path section allow a magnetic flux that has been produced from the end face of the main pole and has magnetized the recording medium to flow back to the main pole. In the magnetic head disclosed in U.S. Patent Application Publication No. 2005/0128637 A1, a first return pole located on the trailing side relative to the main pole and a second return pole located on the leading side relative to the main pole constitute the aforementioned return path section.

In the magnetic head disclosed in U.S. Pat. No. 7,633,711 B2, a second return pole located on the trailing side relative to the main pole constitutes the aforementioned return path section.

The magnetic head disclosed in U.S. Pat. No. 7,365,943 B2 is provided with a return yoke connected to part of the main pole away from the medium facing surface. However, the write shield (the shield yoke) is not connected to the return yoke. In this magnetic head, the write shield is prone to flux saturation and thus it is difficult to make full use of the function of the write shield.

In a magnetic head having the write shield and the return path section, there is a space defined by the main pole, the write shield and the return path section. A coil is provided to pass through the space. The coil is driven by a write signal.

To prevent unwanted erasure, it is particularly important to capture a sufficient amount of magnetic flux into the write shield from two portions of the end face of the write shield that are located on opposite sides of the end face of the main pole in the track width direction, and to keep the magnetic flux having been captured into the write shield from leaking out of the write shield.

In the magnetic head disclosed in U.S. Patent Application Publication No. 2005/0128637 A1, a magnetic flux having been captured into the write shield from each of the two portions of the end face of the write shield that are located on opposite sides of the end face of the main pole in the track width direction bifurcates into two separate flows: one toward the first return pole located on the trailing side relative to the main pole; and the other toward the second return pole located on the leading side relative to the main pole. At this time, the magnetic flux passes through a magnetic path composed of a plurality of magnetic layers stacked one on another. The magnetic path includes one or more boundaries between two adjacent magnetic layers, the one or more boundaries being exposed in the medium facing surface. In the vicinity of the one or more boundaries, magnetic flux tends to leak from within the magnetic path to the outside thereof. This may result in the occurrence of unwanted erasure.

In the magnetic head disclosed in U.S. Pat. No. 7,633,711 B2, a magnetic flux having been captured into the write shield from each of the two portions of the end face of the write shield that are located on opposite sides of the end face of the main pole in the track width direction flows toward the second return pole located on the trailing side relative to the main pole. At this time, the magnetic flux passes through a boundary between the write shield and the second return pole which are stacked, the boundary being exposed in the medium facing surface. This may result in the occurrence of unwanted erasure.

OBJECT AND SUMMARY OF THE INVENTION

It is an object of the present invention to provide a magnetic head for perpendicular magnetic recording that makes it possible to make full use of the function of the write shield and prevent unwanted erasure, and to provide a head assembly and a magnetic recording device that each include such a magnetic head.

A magnetic head for perpendicular magnetic recording of the present invention includes: a medium facing surface facing a recording medium; a coil that produces a magnetic field corresponding to data to be written on the recording medium; a main pole; a write shield made of a magnetic material; a gap part made of a nonmagnetic material; and a return path section made of a magnetic material. The main pole has an end face located in the medium facing surface. The main pole allows a magnetic flux corresponding to the magnetic field produced by the coil to pass, and produces a write magnetic field for writing data on the recording medium by means of a perpendicular magnetic recording system. The write shield has an end face located in the medium facing surface. The gap part is interposed between the main pole and the write shield. The return path section connects the write shield and part of the main pole away from the medium facing surface to each other.

The end face of the write shield includes a first end face portion and a second end face portion located on opposite sides of the end face of the main pole in the track width direction. The write shield includes a first shield portion and a second shield portion located on opposite sides of the main pole in the track width direction. The first shield portion has the first end face portion. The second shield portion has the second end face portion. The return path section includes a first yoke portion and a second yoke portion located on opposite sides of the main pole in the track width direction. The first yoke portion is connected to the first shield portion so that a first space is defined by the main pole, the gap part, the first shield portion and the first yoke portion. The second yoke portion is connected to the second shield portion so that a second space is defined by the main pole, the gap part, the second shield portion and the second yoke portion. The coil passes through the first and second spaces so as to surround at least part of the entire outer periphery of the main pole when viewed from the medium facing surface. The first shield portion includes a portion located between the first space and the medium facing surface. The second shield portion includes a portion located between the second space and the medium facing surface. The coil includes a first magnetic portion located in the first space and a second magnetic portion located in the second space. The first and second magnetic portions are made of a magnetic conductive material.

In the magnetic head of the present invention, the coil may further include a nonmagnetic portion located outside the first and second spaces and made of a nonmagnetic conductive material.

In the magnetic head of the present invention, at least in a region between two cross sections that are perpendicular to the direction of travel of the recording medium and sandwich the first and second magnetic portions of the coil, the write shield and the return path section may be made of the same material as the first and second magnetic portions of the coil.

In the magnetic head of the present invention, the write shield may include a portion that is located farther from the main pole in the track width direction than are one or more interfaces between the write shield and the return path section.

In the magnetic head of the present invention, the end face of the write shield may further include a third end face portion located on the front side in the direction of travel of the recording medium relative to the end face of the main pole, and the write shield may further include a third shield portion located on the front side in the direction of travel of the recording medium relative to the main pole. The third shield portion has the third end face portion.

Where the write shield includes the third shield portion, the return path section may further include a third yoke portion located on the front side in the direction of travel of the recording medium relative to the main pole. The third yoke portion is connected to the third shield portion so that a third space is defined by the main pole, the gap part, the third shield portion and the third yoke portion. The coil may include a portion passing through the third space. The portion of the coil passing through the third space may be made of a nonmagnetic conductive material.

In the magnetic head of the present invention, the end face of the write shield may further include a fourth end face portion located on the rear side in the direction of travel of the recording medium relative to the end face of the main pole, and the write shield may further include a fourth shield portion located on the rear side in the direction of travel of the recording medium relative to the main pole. The fourth shield portion has the fourth end face portion.

Where the write shield includes the fourth shield portion, the return path section may further include a fourth yoke portion located on the rear side in the direction of travel of the recording medium relative to the main pole. The fourth yoke portion is connected to the fourth shield portion so that a fourth space is defined by the main pole, the gap part, the fourth shield portion and the fourth yoke portion. The coil may include a portion passing through the fourth space. The portion of the coil passing through the fourth space may be made of a nonmagnetic conductive material.

In the magnetic head of the present invention, the end face of the write shield may further include a third end face portion located on the front side in the direction of travel of the recording medium relative to the end face of the main pole, and a fourth end face portion located on the rear side in the direction of travel of the recording medium relative to the end face of the main pole. Furthermore, the write shield may further include a third shield portion located on the front side in the direction of travel of the recording medium relative to the main pole, and a fourth shield portion located on the rear side in the direction of travel of the recording medium relative to the main pole. The third shield portion has the third end face portion, and the fourth shield portion has the fourth end face portion.

Where the write shield includes the third and fourth shield portions, the return path section may further include a third yoke portion located on the front side in the direction of travel of the recording medium relative to the main pole, and a fourth yoke portion located on the rear side in the direction of travel of the recording medium relative to the main pole. The third yoke portion is connected to the third shield portion so that a third space is defined by the main pole, the gap part, the third shield portion and the third yoke portion. The fourth yoke portion is connected to the fourth shield portion so that a fourth space is defined by the main pole, the gap part, the fourth shield portion and the fourth yoke portion. The coil may include a portion passing through at least one of the third space and the fourth space. The portion of the coil passing through at least one of the third space and the fourth space may be made of a nonmagnetic conductive material.

Further, in the magnetic head of the present invention, the coil may not wrap one turn around the entire outer periphery of the main pole. In this case, of the entire outer periphery of the main pole when viewed from the medium facing surface, the coil may surround a portion located on the front side or the rear side in the direction of travel of the recording medium and portions located on opposite sides in the track width direction. Further, the distance from the medium facing surface to one of edges of one or more interfaces between the main pole and the return path section, the one of the edges being closest to the medium facing surface, may fall within the range of 1.0 to 2.5 µm.

A head assembly of the present invention includes a slider, and a supporter that flexibly supports the slider. The slider includes the magnetic head of the present invention and is disposed to face a recording medium.

A magnetic recording device of the present invention includes the magnetic head of the present invention, a recording medium, and a positioning device that supports the magnetic head and positions the magnetic head with respect to the recording medium.

A method of manufacturing the magnetic head of the present invention includes the steps of forming the coil, forming the main pole, forming the write shield, forming the gap part, and forming the return path section. The step of forming the coil includes the step of forming the first and second magnetic portions using a magnetic conductive material. The step of forming the write shield includes the step of forming at least part of the write shield using the same material as the first and second magnetic portions of the coil. The step of forming the return path section includes the step of forming at least part of the return path section using the same material as the first and second magnetic portions of the coil. The step of forming the first and second magnetic portions of the coil, the step of forming the at least part of the write shield, and the step of forming the at least part of the return path section are performed simultaneously.

In the method of manufacturing the magnetic head of the present invention, the coil may further include a nonmagnetic portion located outside the first and second spaces and made of a nonmagnetic conductive material, and the step of forming the coil may further include the step of forming the nonmagnetic portion.

In the magnetic head of the present invention, the write shield includes the first and second shield portions located on opposite sides of the main pole in the track width direction, and the return path section includes the first and second yoke portions located on opposite sides of the main pole in the track width direction. The coil passes through the first and second spaces so as to surround at least part of the entire outer periphery of the main pole when viewed from the medium facing surface. Thus, according to the magnetic head of the present invention, and the head assembly and the magnetic recording device including this magnetic head, it is possible to make full use of the function of the write shield and to prevent unwanted erasure.

Further, in the magnetic head of the present invention, the coil includes the first magnetic portion located in the first space and the second magnetic portion located in the second space. The first and second magnetic portions are made of a magnetic conductive material. Thus, according to the magnetic head of the present invention, and the head assembly and the magnetic recording device including this magnetic head, it is possible for the first and second magnetic portions of the coil to be patterned at the same time as at least part of each of the write shield and the return path section. This facilitates the manufacture of the magnetic head.

Further, in the method of manufacturing the magnetic head of the present invention, the step of forming the first and second magnetic portions of the coil, the step of forming at least part of the write shield, and the step of forming at least part of the return path section are performed simultaneously. This facilitates the manufacture of the magnetic head.

Other objects, features and advantages of the present invention will become fully apparent from the following description.

DETAILED DESCRIPTION OF THE PREFERRED EMBODIMENTS

First Embodiment

Figure 7:
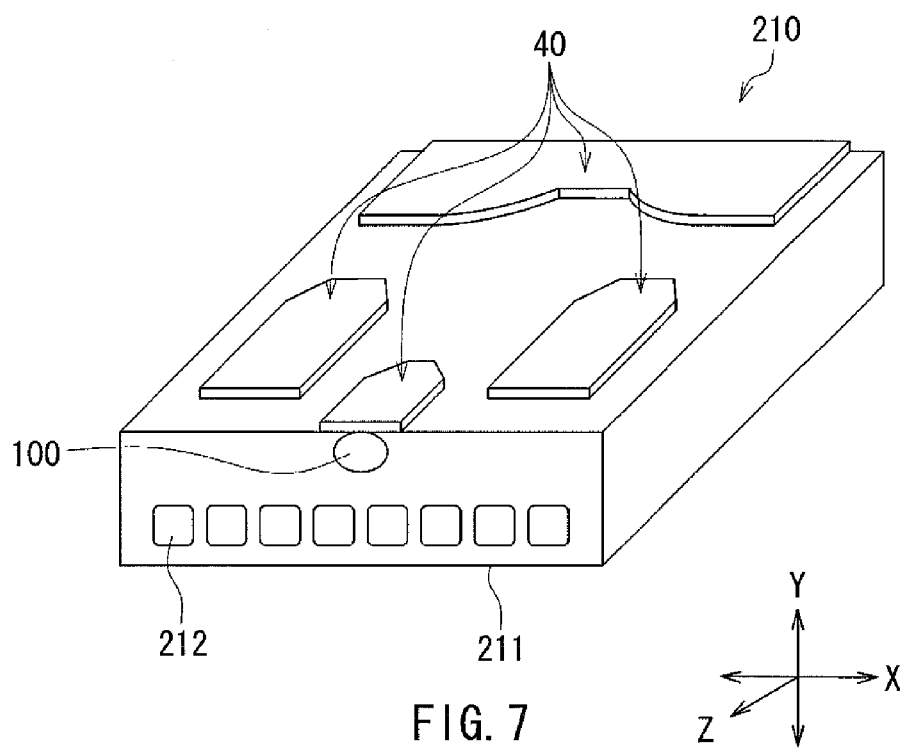
FIG. 7 is a perspective view showing a slider including the magnetic head according to the first embodiment of the invention.

Embodiments of the present invention will now be described in detail with reference to the drawings. First, reference is made to FIG. 7 to describe a slider 210 including a magnetic head according to a first embodiment of the invention. The magnetic head according to the present embodiment is for use in perpendicular magnetic recording. In a magnetic recording device, the slider 210 is disposed to face a circular-plate-shaped recording medium (a magnetic disk) that is driven to rotate. In FIG. 7, the X direction is a direction across the tracks of the recording medium, i.e., the track width direction. The Y direction is a direction perpendicular to the surface of the recording medium. The Z direction is the direction of travel of the recording medium when viewed from the slider 210. The X, Y, and Z directions are orthogonal to one another. The slider 210 has a base body 211. The base body 211 is generally hexahedron-shaped. One of the six surfaces of the base body 211 is designed to face the surface of the recording medium. At this one of the six surfaces, there is formed a medium facing surface 40 to face the surface of the recording medium. When the recording medium rotates and travels in the Z direction, an airflow passing between the recording medium and the slider 210 causes a lift below the slider 210 in the Y direction of FIG. 7. The lift causes the slider 210 to fly over the surface of the recording medium. The magnetic head 100 according to the present embodiment is formed near the air-outflow-side end (the end in the Z direction) of the slider 210. A plurality of terminals 212 are also provided at the air-outflow-side end of the slider 210.

A head assembly according to the present embodiment will now be described with reference to FIG. 8. The head assembly according to the present embodiment includes the slider 210 shown in FIG. 7 and a supporter that flexibly supports the slider 210. Forms of the head assembly include a head gimbal assembly and a head arm assembly described below.

The head gimbal assembly 220 will be described first. The head gimbal assembly 220 includes the slider 210, and a suspension 221 serving as the supporter that flexibly supports the slider 210. The suspension 221 includes: a plate-spring-shaped load beam 222 formed of, e.g., stainless steel; a flexure 223 to which the slider 210 is joined, the flexure 223 being provided at an end of the load beam 222 and giving an appropriate degree of freedom to the slider 210; and a base plate 224 provided at the other end of the load beam 222. The base plate 224 is configured to be attached to an arm 230 of an actuator for moving the slider 210 along the X direction across the tracks of the recording medium 262. The actuator has the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms with a plurality of head gimbal assemblies 220 respectively attached to the arms is called a head stack assembly.

Figure 8:
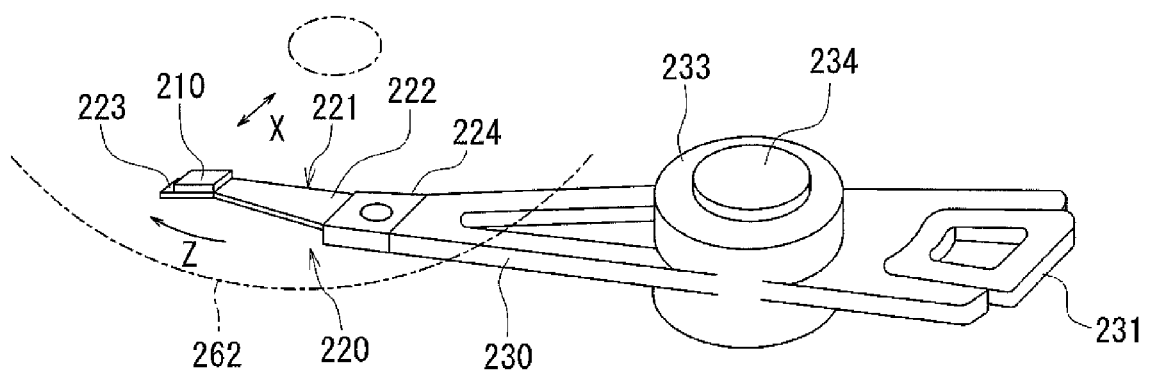
FIG. 8 is a perspective view showing a head arm assembly according to the first embodiment of the invention.

FIG. 8 shows the head arm assembly according to the present embodiment. In the head arm assembly, the head gimbal assembly 220 is attached to an end of the arm 230. A coil 231 that forms part of the voice coil motor is fixed to the other end of the arm 230. A bearing 233 is provided in the middle of the arm 230. The bearing 233 is attached to a shaft 234 for rotatably supporting the arm 230.

Figure 9:
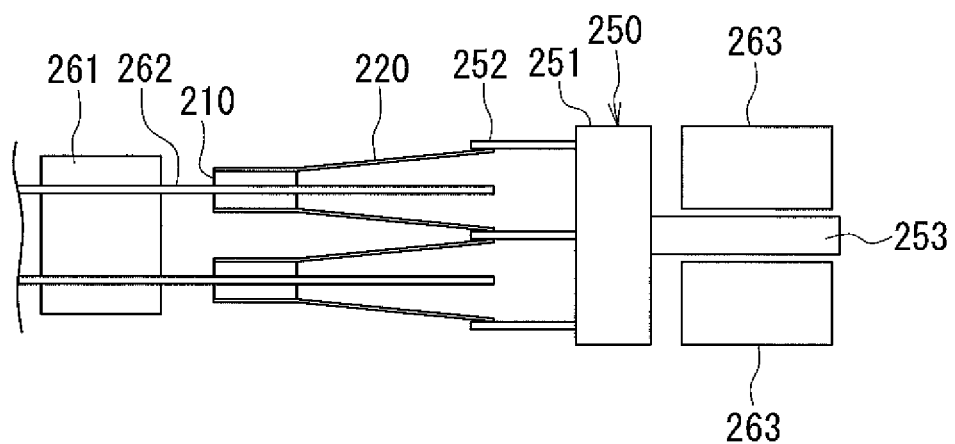
FIG. 9 is an explanatory diagram for illustrating the main part of a magnetic recording device according to the first embodiment of the invention.
Figure 10:
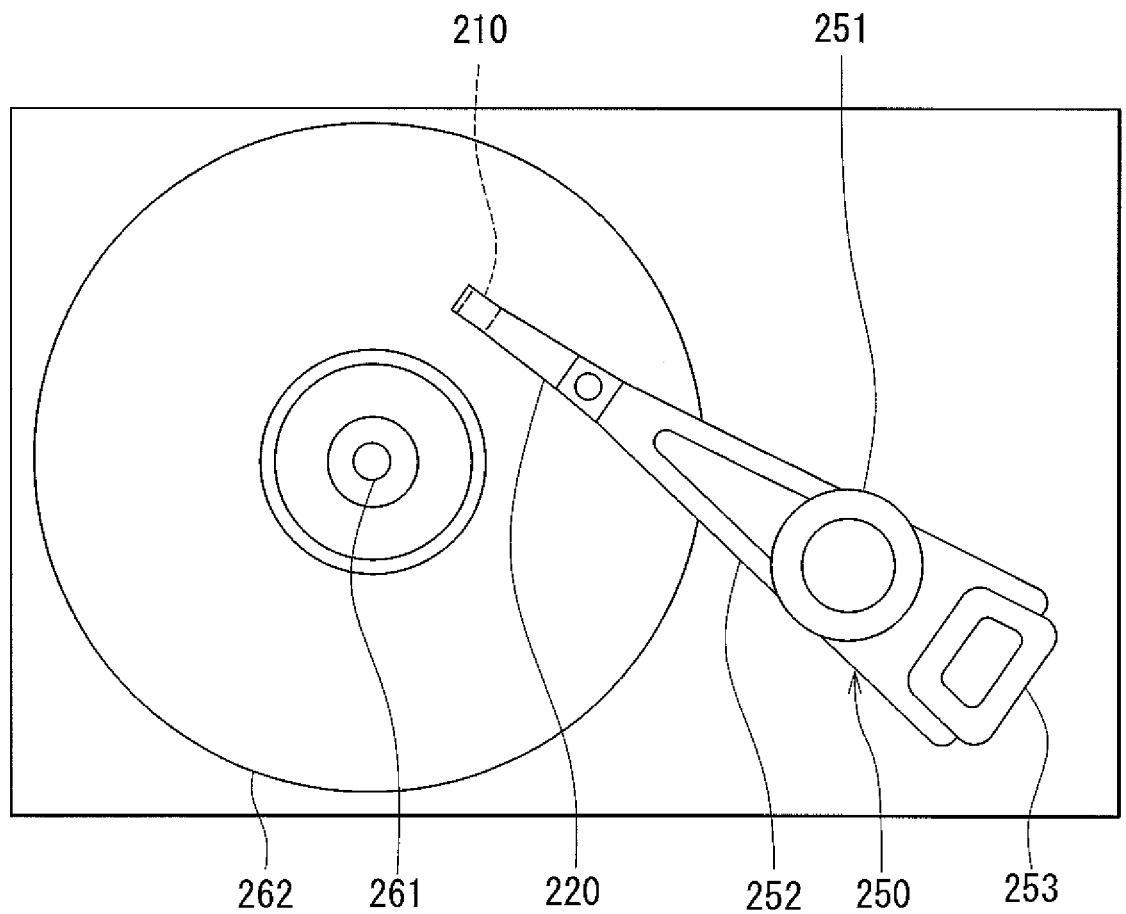
FIG. 10 is a plan view of the magnetic recording device according to the first embodiment of the invention.

Reference is now made to FIG. 9 and FIG. 10 to describe an example of the head stack assembly and an example of a magnetic recording device according to the present embodiment. FIG. 9 is an explanatory diagram illustrating the main part of the magnetic recording device. FIG. 10 is a plan view of the magnetic recording device. The head stack assembly 250 includes a carriage 251 having a plurality of arms 252. A plurality of head gimbal assemblies 220 are attached to the arms 252 such that the assemblies 220 are aligned in the vertical direction with spacing between every adjacent ones. A coil 253 forming part of the voice coil motor is mounted on a side of the carriage 251 opposite from the arms 252. The head stack assembly 250 is installed in the magnetic recording device. The magnetic recording device includes a plurality of recording media 262 mounted on a spindle motor 261. Two sliders 210 are allocated to each recording medium 262 such that the two sliders 210 are opposed to each other with the recording medium 262 interposed therebetween. The voice coil motor includes permanent magnets 263 arranged to be opposed to each other with the coil 253 of the head stack assembly 250 interposed therebetween. The actuator and the head stack assembly 250 except the sliders 210 support the sliders 210 and position them with respect to the recording media 262. Note that the magnetic recording device of the present invention may be configured otherwise than the above-described configuration. For example, the magnetic recording device of the present invention may be provided with a single recording medium 262 and one or two head gimbal assemblies 220.

In the magnetic recording device according to the present embodiment, the actuator moves the slider 210 across the tracks of the recording medium 262 and positions the slider 210 with respect to the recording medium 262. The magnetic head 100 included in the slider 210 has a read head unit and a write head unit, which will be described in detail later.

Figure 1:
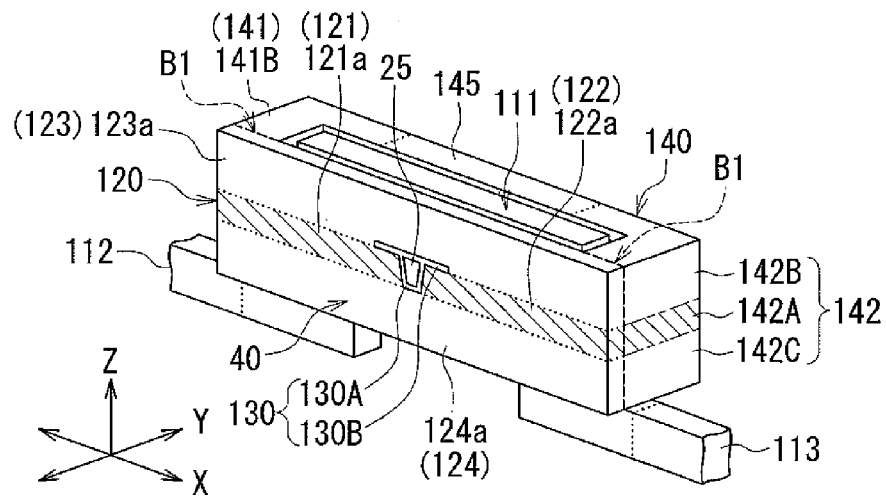
FIG. 1 is a perspective view showing the main part of a magnetic head according to a first embodiment of the invention.
Figure 2:
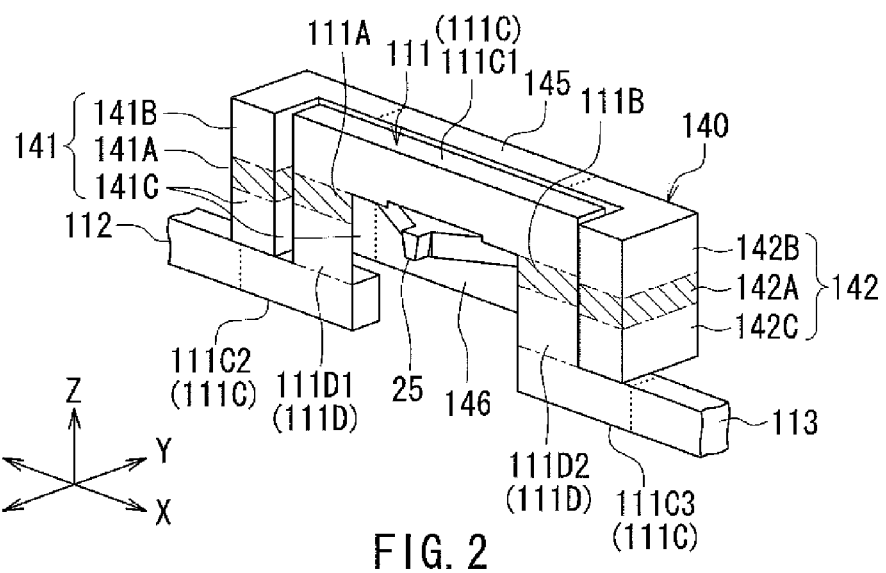
FIG. 2 is a perspective view showing the main part shown in FIG. 1 with some portions eliminated.
Figure 3:
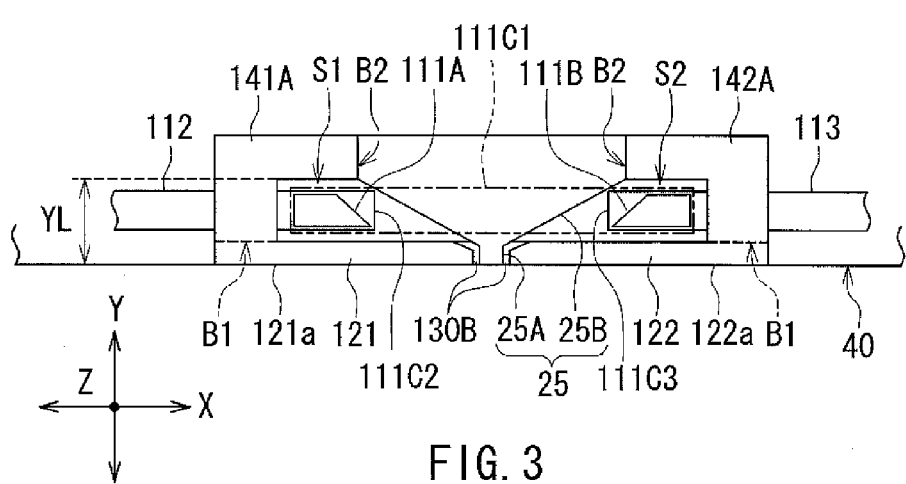
FIG. 3 is a plan view showing the main part shown in FIG. 1 with some other portions eliminated.

Reference is now made to FIG. 1 to FIG. 3 to describe the general configuration of the magnetic head according to the present embodiment, particularly the general configuration of the write head unit. FIG. 1 is a perspective view showing the main part of the magnetic head. FIG. 2 is a perspective view showing the main part shown in FIG. 1 with some portions eliminated. FIG. 3 is a plan view showing the main part shown in FIG. 1 with some other portions eliminated. The X, Y, and Z directions shown in FIG. 7 are also shown in FIG. 1 to FIG. 3.

As shown in FIG. 1 and FIG. 3, the magnetic head according to the present embodiment has the medium facing surface 40. The write head unit includes a coil 111, leads 112 and 113, a main pole 25, a write shield 120, a gap part 130, and a return path section 140. FIG. 2 omits the write shield 120. FIG. 3 omits respective portions of the coil 111 and the return path section 140 that are located on the trailing side relative to the main pole 25. The main pole 25, the write shield 120, and the return path section 140 are each made of a magnetic material. The magnetic material may be, for example, NiFe, CoFe, CoNiFe, CoNi, FeCo, or FeNi.

The write shield 120 and the return path section 140 form one or more interfaces B1 therebetween. In the present embodiment, in particular, the write shield 120 and the return path section 140 form two interfaces B1 therebetween. FIG. 1 and FIG. 3 show the two interfaces B1 between the write shield 120 and the return path section 140 by broken lines. Further, the main pole 25 and the return path section 140 form one or more interfaces B2 therebetween. In the present embodiment, in particular, the main pole 25 and the return path section 140 form four interfaces B2 therebetween. FIG. 3 shows two of the four interfaces B2 between the main pole 25 and the return path section 140 by solid lines.

The main pole 25 has an end face located in the medium facing surface 40, a top surface, a bottom end opposite to the top surface, and two side surfaces connecting the top surface and the bottom end to each other. In the present embodiment, the main pole 25 includes a track width defining portion 25A and a wide portion 25B, in particular. The track width defining portion 25A has an end face located in the medium facing surface 40, and an end portion opposite to the end face. The wide portion 25B is connected to the end portion of the track width defining portion 25A. The top surface of the main pole 25 includes a top surface of the track width defining portion 25A and a top surface of the wide portion 25B. The top surface of the wide portion 25B is greater than the top surface of the track width defining portion 25A in width in the track width direction.

The width of the top surface of the track width defining portion 25A in the track width direction is generally constant regardless of the distance from the medium facing surface 40. The width of the top surface of the wide portion 25B in the track width direction is, for example, equal to that of the top surface of the track width defining portion 25A when seen at the boundary between the track width defining portion 25A and the wide portion 25B, and gradually increases with increasing distance from the medium facing surface 40, then becoming constant. Note that the track width defining portion 25A may be omitted to configure the wide portion 25B to have an end face located in the medium facing surface 40. Further, relative to a direction perpendicular to the medium facing surface 40, two edges of the top surface of the wide portion 25B that are opposite in the track width direction may each form an angle that is constant regardless of the distance from the medium facing surface 40 or that varies with distance from the medium facing surface 40.

The thickness of the main pole 25 in the vicinity of the medium facing surface 40 may decrease toward the medium facing surface 40. In this case, the top surface of the main pole 25 may include a first inclined portion and a first flat portion arranged in this order, the first inclined portion being closer to the medium facing surface 40, and the bottom end of the main pole 25 may include a second inclined portion and a second flat portion arranged in this order, the second inclined portion being closer to the medium facing surface 40. The first inclined portion has a first end located in the medium facing surface 40 and a second end opposite to the first end. The first flat portion is connected to the second end. The first inclined portion is inclined such that the second end is located on the front side in the direction of travel of the recording medium (the Z direction), i.e., the trailing side, relative to the first end.

The second inclined portion has a third end located in the medium facing surface 40 and a fourth end opposite to the third end. The second flat portion is connected to the fourth end. The second inclined portion is inclined such that the fourth end is located on the rear side in the direction of travel of the recording medium, i.e., the leading side, relative to the third end.

Where the top surface of the main pole 25 includes the first inclined portion and the first flat portion, a nonmagnetic layer may be provided on the first flat portion. The nonmagnetic layer is used as a mask in forming the first inclined portion in the top surface of the main pole 25 by, for example, ion milling.

The width of the end face of the main pole 25 located in the medium facing surface 40 decreases toward the leading-side end, for example. The position of the end of a record bit to be recorded on a recording medium depends on the position of the trailing-side edge of the end face of the main pole 25. FIG. 1 and FIG. 2 illustrate an example in which the end face of the main pole 25 has a trapezoidal shape. However, the shape of the end face of the main pole 25 is not limited thereto, and may be, for example, square, rectangular, circular or elliptical. Alternatively, the end face of the main pole 25 may be in the shape of a pentagon with one vertex located at the leading-side end and with one side located at the trailing-side end.

The write shield 120 has an end face located in the medium facing surface 40. As shown in FIG. 1, the end face of the write shield 120 includes first to fourth end face portions 121a, 122a, 123a, and 124a. The first and second end face portions 121a and 122a are located on opposite sides of the end face of the main pole 25 in the track width direction (the X direction). The third end face portion 123a is located on the front side in the direction of travel of the recording medium (the Z direction), i.e., the trailing side, relative to the end face of the main pole 25. The fourth end face portion 124a is located on the rear side in the direction of travel of the recording medium, i.e., the leading side, relative to the end face of the main pole 25. In the medium facing surface 40, the first to fourth end face portions 121a, 122a, 123a, and 124a are arranged to wrap around the end face of the main pole 25.

The write shield 120 includes first to fourth shield portions 121, 122, 123, and 124. In FIG. 1 the boundaries between these portions are shown by dotted lines. The first and second shield portions 121 and 122 are located on opposite sides of the main pole 25 in the track width direction. The third shield portion 123 is located on the front side in the direction of travel of the recording medium relative to the main pole 25.

The fourth shield portion 124 is located on the rear side in the direction of travel of the recording medium relative to the main pole 25.

As shown in FIG. 1, the first shield portion 121 has the first end face portion 121a. The second shield portion 122 has the second end face portion 122a. The third shield portion 123 has the third end face portion 123a. The fourth shield portion 124 has the fourth end face portion 124a.

The gap part 130 is made of a nonmagnetic material such as alumina ($Al_2O_3$) and interposed between the main pole 25 and the write shield 120. The gap part 130 includes a first gap portion 130A interposed between the main pole 25 and each of the first, second and fourth shield portions 121, 122 and 124, and a second gap portion 130B interposed between the main pole 25 and the third shield portion 123. In the medium facing surface 40, the width of the second gap portion 130B in the track width direction is greater than the distance between the first shield portion 121 and the second shield portion 122. This is for the purpose of preventing the end of a record bit to be recorded on a recording medium from becoming arc-shaped.

The return path section 140 connects the write shield 120 and part of the main pole 25 away from the medium facing surface 40 to each other, thereby magnetically coupling the write shield 120 and the main pole 25 to each other. The return path section 140 includes first and second yoke portions 141 and 142, and first and second coupling portions 145 and 146. In FIG. 1 and FIG. 2 the boundaries between these portions are shown by dotted lines.

The first and second yoke portions 141 and 142 are located on opposite sides of the main pole 25 in the track width direction. As shown in FIG. 3, the first yoke portion 141 is connected to the first shield portion 121 so that a first space S1 is defined by the main pole 25, the gap part 130, the first shield portion 121 and the first yoke portion 141. Further, the second yoke portion 142 is connected to the second shield portion 122 so that a second space S2 is defined by the main pole 25, the gap part 130, the second shield portion 122 and the second yoke portion 142. The first shield portion 121 includes a portion located between the first space S1 and the medium facing surface 40. The second shield portion 122 includes a portion located between the second space S2 and the medium facing surface 40.

In the present embodiment, the first yoke portion 141 includes a portion 141A connected to the first shield portion 121, a portion 141B located on the front side in the direction of travel of the recording medium (the Z direction) relative to the portion 141A, and a portion 141C located on the rear side in the direction of travel of the recording medium relative to the portion 141A. Further, the second yoke portion 142 includes a portion 142A connected to the second shield portion 122, a portion 142B located on the front side in the direction of travel of the recording medium relative to the portion 142A, and a portion 142C located on the rear side in the direction of travel of the recording medium relative to the portion 142A. In FIG. 1 and FIG. 2 the boundaries between these portions are shown by chain double-dashed lines. The portions 141A and 142A are located at the same level as the first and second shield portions 121 and 122 in the direction of travel of the recording medium. The portions 141B and 142B are located at the same level as the third shield portion 123 in the direction of travel of the recording medium, and are connected to the third shield portion 123. The portions 141C and 142C are located at the same level as the fourth shield portion 124 in the direction of travel of the recording medium, and are connected to the fourth shield portion 124.

The first and second coupling portions 145 and 146 are located away from the medium facing surface 40. The first coupling portion 145 is located on the front side in the direction of travel of the recording medium relative to the main pole 25 and connected to the main pole 25, and couples the portion 141B of the first yoke portion 141 and the portion 142B of the second yoke portion 142 to each other. The second coupling portion 146 is located on the rear side in the direction of travel of the recording medium relative to the main pole 25 and connected to the main pole 25, and couples the portion 141C of the first yoke portion 141 and the portion 142C of the second yoke portion 142 to each other.

As shown in FIG. 1, where the write shield 120 includes the first to fourth shield portions 121, 122, 123 and 124, the first yoke portion 141 need only include one or more of the portions 141A, 141B and 141C, while the second yoke portion 142 need only include one or more of the portions 142A, 142B and 142C.

The write shield 120 may include only the first to third shield portions 121, 122 and 123. In this case, the first yoke portion 141 need only include at least one of the portions 141A and 141B, while the second yoke portion 142 need only include at least one of the portions 142A and 142B.

The write shield 120 may include only the first, second and fourth shield portions 121, 122 and 124. In this case, the first yoke portion 141 need only include at least one of the portions 141A and 141C, while the second yoke portion 142 need only include at least one of the portions 142A and 142C.

The write shield 120 may include only the first and second shield portions 121 and 122. In this case, the first yoke portion 141 includes at least the portion 141A, while the second yoke portion 142 includes at least the portion 142A.

Where the first yoke portion 141 does not include the portion 141B and the second yoke portion 142 does not include the portion 142B, the first coupling portion 145 may be omitted. Where the first yoke portion 141 does not include the portion 141C and the second yoke portion 142 does not include the portion 142C, the second coupling portion 146 may be omitted.

Here, as shown in FIG. 3, the distance from the medium facing surface 40 to one of edges of the one or more interfaces B2 between the main pole 25 and the return path section 140, the one of the edges being closest to the medium facing surface 40, will be defined as the yoke length and denoted by symbol YL. In the present embodiment, the yoke length YL is the shortest one of the distances from the medium facing surface 40 to respective ones of edges of the interfaces between: the main pole 25 and the yoke portion 141; the main pole 25 and the yoke portion 142; the main pole 25 and the coupling portion 145; and the main pole 25 and the coupling portion 146, the respective ones of the edges being closest to the medium facing surface 40. The aforementioned distances from the medium facing surface 40 to the respective ones of the edges of the interfaces between the main pole 25 and the portions 141, 142, 145, and 146 closest to the medium facing surface 40 may be equal to each other. The yoke length YL falls within the range of 1.0 to 2.5 μm, for example.

The coil 111 is located at a distance from the medium facing surface 40. The leads 112 and 113 are connected to opposite ends of the coil 111. The coil 111 and the leads 112 and 113 form one continuous conductor. Of this conductor, a portion located inwardly from the outer surface of an assembly consisting of the write shield 120 and the return path section 140 is the coil 111, whereas portions located outwardly from the aforementioned outer surface are the leads 112 and 113. In FIG. 1 and FIG. 2 the boundaries between the coil 111 and the leads 112 and 113 are indicated by dotted lines. In FIG. 3, the portion of the coil 111 located on the trailing side relative to the main pole 25 is indicated by a chain double-dashed line. The coil 111 passes through the first and second spaces S1 and S2 so as to surround at least part of the entire outer periphery of the main pole 25 when viewed from the medium facing surface 40. In the present embodiment, as shown in FIG. 2, of the entire outer periphery of the main pole 25 when viewed from the medium facing surface 40, the coil 111 particularly surrounds a portion located on the front side in the direction of travel of the recording medium (the Z direction) and portions located on opposite sides in the track width direction (the X direction). Thus, the coil 111 does not wrap one turn around the entire outer periphery of the main pole 25. The leads 112 and 113 are located on the rear side in the direction of travel of the recording medium relative to the main pole 25 and drawn from opposite ends of the coil 111 in opposite directions along the track width.

The coil 111 includes a first magnetic portion 111A located in the first space S1, a second magnetic portion 111B located in the second space S2, and the remaining portion located outside the first and second spaces S1 and S2. The first and second magnetic portions 111A and 111B are made of a magnetic conductive material. The remaining portion includes at least one of a nonmagnetic portion 111C made of a nonmagnetic conductive material and a third magnetic portion 111D made of a magnetic conductive material. In the present invention, the remaining portion may consist entirely of the nonmagnetic portion 111C or entirely of the third magnetic portion 111D. In the present embodiment, the remaining portion includes the nonmagnetic portion 111C and the third magnetic portion 111D.

The nonmagnetic portion 111C includes three portions 111C1, 111C2, and 111C3. The portion 111C1 is located on the front side in the direction of travel of the recording medium relative to the first and second magnetic portions 111A and 111B and connects the first magnetic portion 111A and the second magnetic portion 111B to each other. The portion 111C2 is located at the same level as the leads 112 and 113 in the direction of travel of the recording medium and connected to the lead 112. The portion 111C3 is located at the same level as the leads 112 and 113 in the direction of travel of the recording medium and connected to the lead 113.

The third magnetic portion 111D includes two portions 111D1 and 111D2. The portion 111D1 connects the first magnetic portion 111A and the portion 111C2 to each other. The portion 111D2 connects the second magnetic portion 111B and the portion 111C3 to each other.

In FIG. 2, the boundaries between the aforementioned portions constituting the coil 111 are indicated by dot-and-dash lines. Further, in FIG. 2 the first and second magnetic portions 111A and 111B are hatched for the purpose of clarity.

The first to third magnetic portions 111A, 111B, and 111D may be made of NiFe, CoFe, CoNiFe, CoNi, FeCo, or FeNi, for example. The nonmagnetic portion 111C may be made of Cu, for example.

Here, assume a region between two cross sections that are perpendicular to the direction of travel of the recording medium (the Z direction) and sandwich the first and second magnetic portions 111A and 111B of the coil 111. One of the two cross sections includes the interface between the first magnetic portion 111A and the portion 111C1 and the interface between the second magnetic portion 111B and the portion 111C1, while the other includes the interface between the first magnetic portion 111A and the portion 111D1 and the interface between the second magnetic portion 111B and the portion 111D2. At least in the aforementioned region, the write shield 120 and the return path section 140 may be made of the same material as the first and second magnetic portions 111A and 111B of the coil 111. More specifically, at least the first and second shield portions 121 and 122 of the write shield 120 and at least the portions 141A and 142A of the first and second yoke portions 141 and 142 of the return path section 140 may be made of the same material as the first and second magnetic portions 111A and 111B of the coil 111. In FIG. 1 and FIG. 2, the respective portions of the coil 111, the write shield 120 and the return path section 140 that may be made of the same material are indicated by the same hatching.

Further, in a region between two cross sections that are perpendicular to the direction of travel of the recording medium (the Z direction) and sandwich the third magnetic portion 111D of the coil 111, the write shield 120 and the return path section 140 may be made of the same material as the third magnetic portion 111D of the coil 111. More specifically, at least the fourth shield portion 124 of the write shield 120 and at least the portions 141C and 142C of the first and second yoke portions 141 and 142 of the return path section 140 may be made of the same material as the third magnetic portion 111D of the coil 111.

Figure 4:
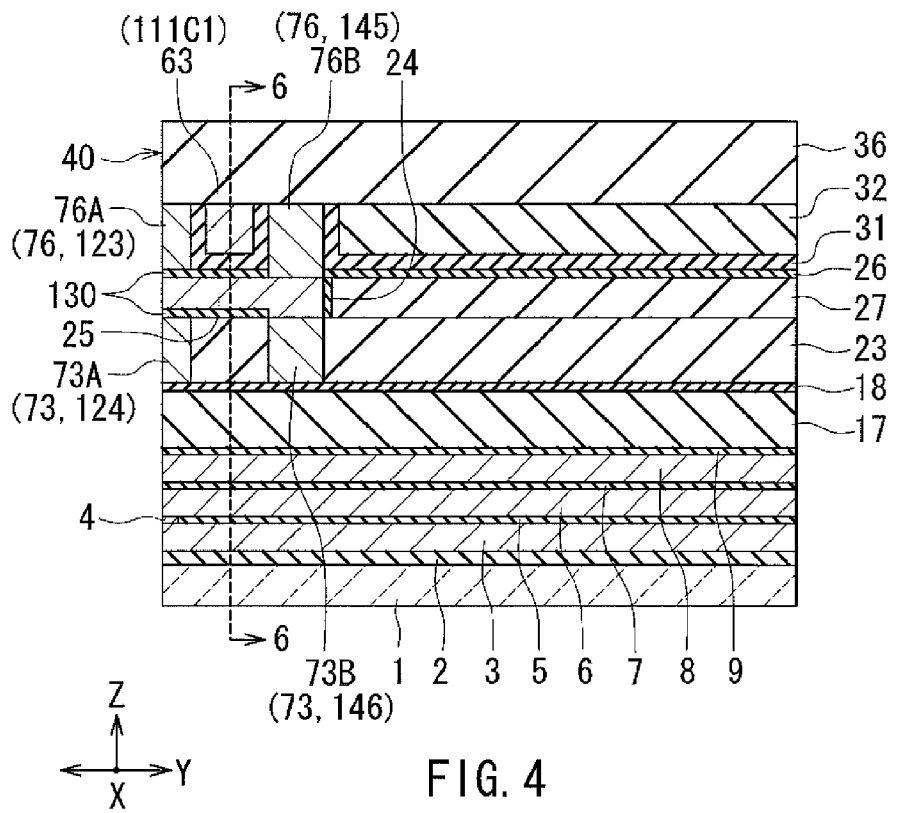
FIG. 4 is a cross-sectional view showing the configuration of the magnetic head according to the first embodiment of the invention.
Figure 5:
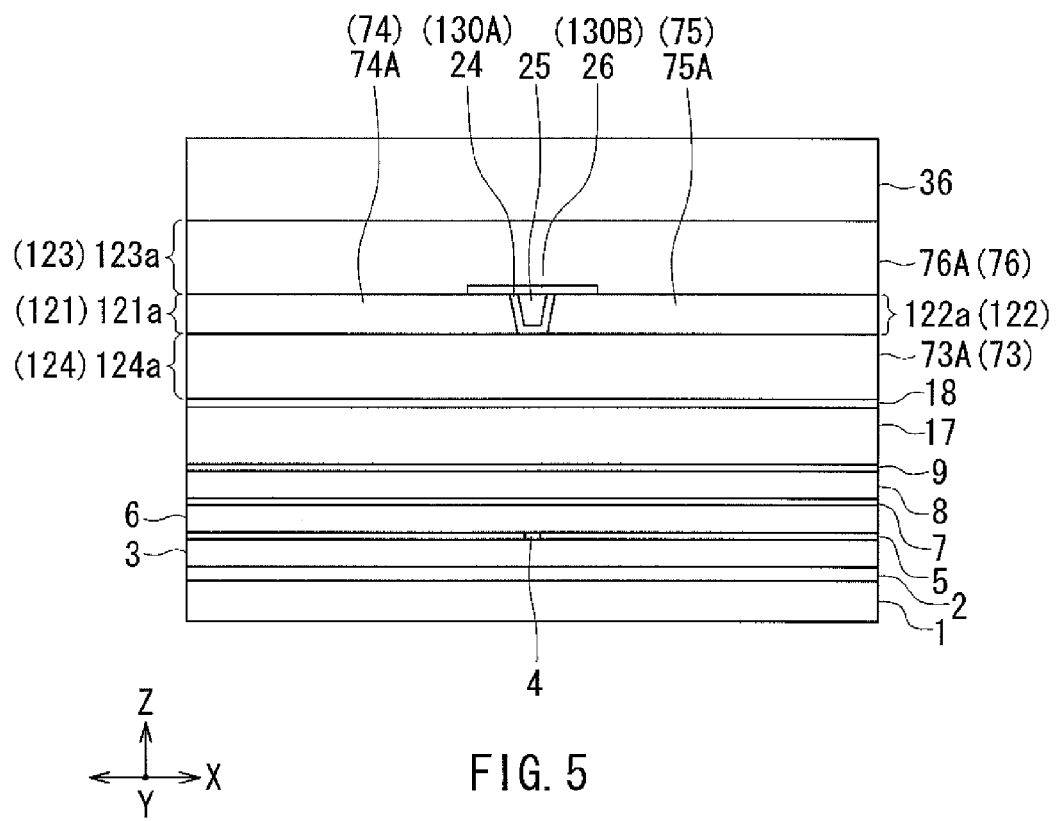
FIG. 5 is a front view showing the medium facing surface of the magnetic head according to the first embodiment of the invention.
Figure 6:
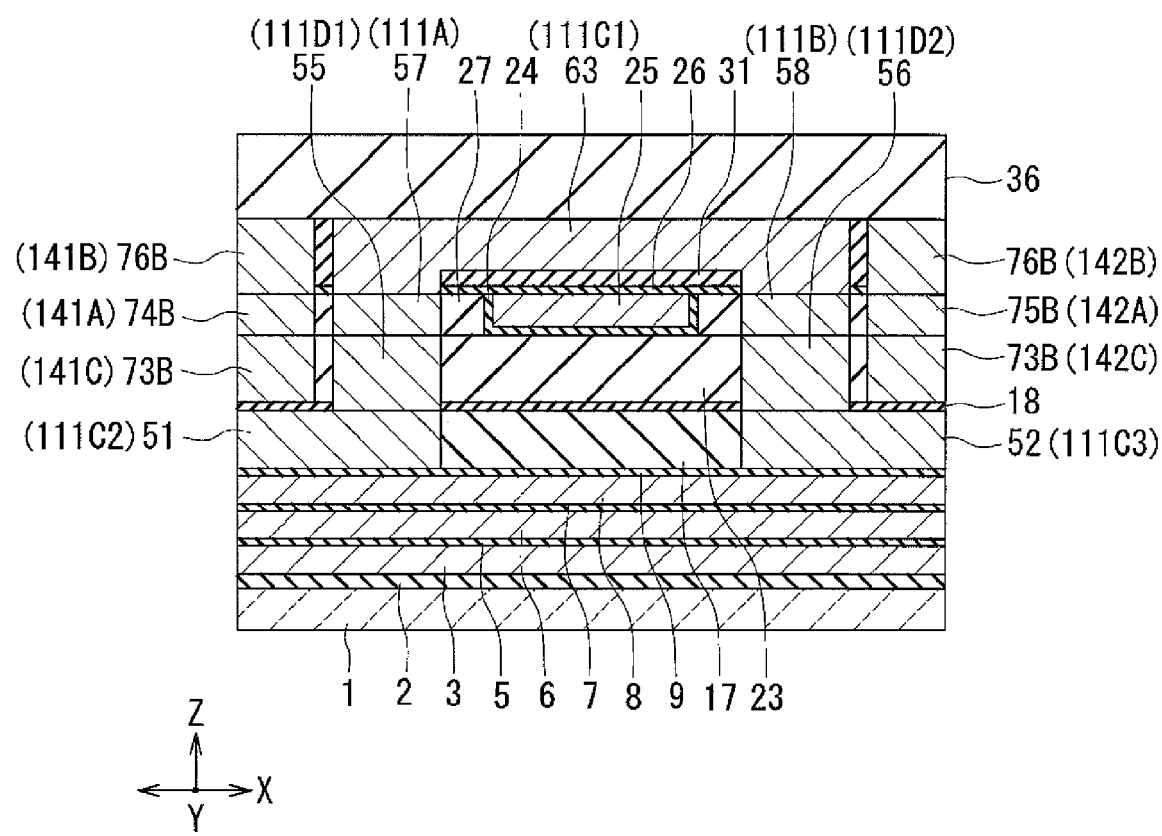
FIG. 6 is a cross-sectional view showing a cross section taken at the position indicated by line 6-6 of FIG. 4.

The configuration of the magnetic head according to the present embodiment will now be described in more detail with reference to FIG. 1 to FIG. 6. FIG. 4 is a cross-sectional view showing the configuration of the magnetic head. FIG. 5 is a front view showing the medium facing surface of the magnetic head. FIG. 6 is a cross-sectional view showing a cross section taken at the position indicated by line 6-6 of FIG. 4. The X, Y, and Z directions shown in FIG. 7 are also shown in FIG. 4 to FIG. 6.

As shown in FIG. 4 to FIG. 6, the magnetic head according to the present embodiment includes: a substrate 1 made of a ceramic material such as aluminum oxide-titanium carbide ($Al_2O_3$—TiC) and having a top surface; an insulating layer 2 made of an insulating material and disposed on the substrate 1; a bottom read shield layer 3 made of a magnetic material and disposed on the insulating layer 2; a magnetoresistive element (hereinafter referred to as MR element) 4 disposed on the bottom read shield layer 3; a top read shield layer 6 made of a magnetic material and disposed on the MR element 4; and an insulating layer 5 made of an insulating material, disposed between the bottom read shield layer 3 and the top read shield layer 6 and surrounding the MR element 4. The insulating layers 2 and 5 are made of alumina, for example. Note that FIG. 4 shows a cross section perpendicular to the medium facing surface 40 and to the top surface of the substrate 1.

An end of the MR element 4 is located in the medium facing surface 40. The MR element 4 may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the planes of layers constituting the GMR element or the current-perpendicular-to-plane (CPP) type in which the sense current is fed in a direction generally perpendicular to the planes of layers constituting the GMR element. Where the MR element 4 is a TMR element or a CPP-type GMR element, the bottom read shield layer 3 and the top read shield layer 6 may also serve as electrodes for feeding the sense current to the MR element 4. Where the MR element 4 is a CIP-type GMR element, insulating films are respectively provided between the MR element 4 and the bottom read shield layer 3 and between the MR element 4 and the top read shield layer 6, and two leads are provided between these insulating films in order to feed the sense current to the MR element 4.

The parts from the bottom read shield layer 3 to the top read shield layer 6 constitute the read head unit. The magnetic head further includes: a nonmagnetic layer 7 made of a nonmagnetic material and disposed on the top read shield layer 6; a middle shield layer 8 made of a magnetic material and disposed on the nonmagnetic layer 7; an insulating layer 9 disposed on the middle shield layer 8; and the write head unit disposed on the insulating layer 9. The middle shield layer 8 has the function of shielding the MR element 4 from magnetic fields generated in the write head unit. The nonmagnetic layer 7 and the insulating layer 9 are made of alumina, for example. The write head unit includes the coil 111, the leads 112 and 113, the main pole 25, the write shield 120, the gap part 130, and the return path section 140. The coil 111 is composed of a plurality of conductive layers described later.

As shown in FIG. 6, the magnetic head further includes two conductive layers 51 and 52 made of a nonmagnetic conductive material and disposed on the insulating layer 9, and an insulating layer 17 disposed on the insulating layer 9 and surrounding the conductive layers 51 and 52. The conductive layer 51 forms the portion 111C2 of the nonmagnetic portion 111C of the coil 111 and the lead 112. The conductive layer 52 forms the portion 111C3 of the nonmagnetic portion 111C of the coil 111 and the lead 113. The insulating layer 17 is made of alumina, for example.

As shown in FIG. 6, the magnetic head further includes an insulating layer 18 disposed on the conductive layers 51 and 52 and the insulating layer 17, and conductive layers 55 and 56 made of a magnetic conductive material. The insulating layer 18 has a first opening for exposing a portion of the top surface of the conductive layer 51 near an edge thereof closest to the conductive layer 52, and a second opening for exposing a portion of the top surface of the conductive layer 52 near an edge thereof closest to the conductive layer 51. The conductive layer 55 lies on the conductive layer 51 at the position of the first opening of the insulating layer 18. The conductive layer 56 lies on the conductive layer 52 at the position of the second opening of the insulating layer 18. The conductive layer 55 forms the portion 111D1 of the third magnetic portion 111D of the coil 111. The conductive layer 56 forms the portion 111D2 of the third magnetic portion 111D of the coil 111. The insulating layer 18 is made of alumina, for example.

As shown in FIG. 4 and FIG. 5, the magnetic head further includes a magnetic layer 73 made of a magnetic conductive material. The magnetic layer 73 includes a first portion 73A and a second portion 73B. The first portion 73A forms the fourth shield portion 124. The second portion 73B forms the portion 141C of the first yoke portion 141, the portion 142C of the second yoke portion 142, and the second coupling portion 146. The first portion 73A and the second portion 73B are both located on the insulating layer 18. The first portion 73A is shaped to be elongated in the X direction. The second portion 73B is connected to portions of the first portion 73A adjacent to opposite ends thereof in the X direction so that a space is defined by the first portion 73A and the second portion 73B. As shown in FIG. 6, the conductive layers 55 and 56 are located in the space. The insulating layer 18 is interposed between the second portion 73B and the conductive layers 51 and 52. The conductive layers 55 and 56 and the magnetic layer 73 may be made of the same material.

As shown in FIG. 4 and FIG. 6, the magnetic head further includes an insulating layer 23 lying on the insulating layer 18 and surrounding the conductive layers 55 and 56 and the magnetic layer 73. The top surfaces of the conductive layers 55 and 56, the magnetic layer 73 and the insulating layer 23 are even with each other. The insulating layer 23 is made of alumina, for example.

The magnetic head further includes a nonmagnetic layer 24 made of an insulating nonmagnetic material. The nonmagnetic layer 24 covers respective portions of the bottom end and the two side surfaces of the main pole 25. The main pole 25 lies on the first and second portions 73A and 73B of the magnetic layer 73 and the insulating layer 23 such that the nonmagnetic layer 24 is interposed between the first portion 73A of the magnetic layer 73 and the insulating layer 23. At a position away from the medium facing surface 40, the bottom end of the main pole 25 is in contact with the top surface of the second coupling portion 146 formed of the second portion 73B. The nonmagnetic layer 24 is made of alumina, for example.

As shown in FIG. 6, the magnetic head further includes conductive layers 57 and 58 made of a magnetic conductive material. The conductive layer 57 lies on the conductive layer 55. The conductive layer 58 lies on the conductive layer 56. The conductive layers 57 and 58 are located on opposite sides of the main pole 25 in the track width direction (the X direction) and are each spaced from the main pole 25. The conductive layer 57 forms the first magnetic portion 111A of the coil 111. The conductive layer 58 forms the second magnetic portion 111B of the coil 111.

As shown in FIG. 5 and FIG. 6, the magnetic head further includes magnetic layers 74 and 75 made of a magnetic conductive material. The magnetic layer 74 includes a first portion 74A forming the first shield portion 121, and a second portion 74B forming the portion 141A of the first yoke portion 141. The magnetic layer 75 includes a first portion 75A forming the second shield portion 122, and a second portion 75B forming the portion 142A of the second yoke portion 142. The first portions 74A and 75A are shaped to be elongated in the X direction and lie on the first portion 73A of the magnetic pole 73 at positions on opposite sides of the main pole 25 in the track width direction (the X direction) with a spacing between the main pole 25 and each of the portions 74A and 75A. The nonmagnetic layer 24 is interposed between the main pole 25 and each of the first portions 74A and 75A. The conductive layers 57 and 58 and the magnetic layers 74 and 75 may be made of the same material.

The second portions 74B and 75B lie on the second portion 73B of the magnetic layer 73 at positions on opposite sides of the main pole 25 in the track width direction, and are connected to the main pole 25 at positions away from the medium facing surface 40. Further, the second portion 74B is connected to a part of the first portion 74A in the vicinity of the end thereof farthest from the main pole 25. The second portion 75B is connected to a part of the first portion 75A in the vicinity of the end thereof farthest from the main pole 25.

A portion of the main pole 25 in the vicinity of the medium facing surface 40 is located at a predetermined distance from the first, second and fourth shield portions 121, 122 and 124 formed by the first portions 74A, 75A, and 73A of the magnetic layers 74, 75, and 73. A portion of the nonmagnetic layer 24 that is interposed between the main pole 25 and each of the first portions 74A, 75A and 73A forms the first gap portion 130A.

As shown in FIG. 4 and FIG. 6, the magnetic head further includes an insulating layer 27 disposed around the main pole 25, the conductive layers 57 and 58, the magnetic layers 74 and 75 and the nonmagnetic layer 24. The top surfaces of the main pole 25, the conductive layers 57 and 58, the magnetic layers 74 and 75, the nonmagnetic layer 24, and the insulating layer 27 are even with each other. The insulating layer 27 is made of alumina, for example.

As shown in FIG. 4 and FIG. 6, the magnetic head further includes a nonmagnetic layer 26 made of an insulating nonmagnetic material and lying on the main pole 25, the first portions 74A and 75A of the magnetic layers 74 and 75, the nonmagnetic layer 24 and the insulating layer 27. The nonmagnetic layer 26 does not cover a portion of the top surface of the main pole 25 located away from the medium facing surface 40.

As shown in FIG. 4 and FIG. 6, the magnetic head further includes a magnetic layer 76 made of a magnetic material. The magnetic layer 76 includes a first portion 76A forming the third shield portion 123, and a second portion 76B forming the portion 141B of the first yoke portion 141, the portion 142B of the second yoke portion 142 and the first coupling portion 145. The first portion 76A is shaped to be elongated in the X direction and lies on the first portions 74A and 75A of the magnetic layers 74 and 75 and the nonmagnetic layer 26. The second portion 76B lies on the second portions 74B and 75B of the magnetic layers 74 and 75 and the main pole 25. The second portion 76B is connected to portions of the first portion 76A adjacent to opposite ends thereof in the X direction so that a space is defined by the first portion 76A and the second portion 76B. At a position away from the medium facing surface 40, the top surface of the main pole 25 is in contact with the bottom surface of the first coupling portion 145 formed of the second portion 76B.

A portion of the nonmagnetic layer 26 that is interposed between the main pole 25 and the first portion 76A (the third shield portion 123) forms the second gap portion 130B. In the medium facing surface 40, a portion of the end face of the first portion 76A (the third end face portion 123a) is separated from the end face of the main pole 25 by a predetermined distance created by the thickness of the second gap portion 130B. The thickness of the second gap portion 130B is preferably 200 nm or smaller, and more preferably falls within the range of 15 to 50 nm.

As shown in FIG. 4 and FIG. 6, the magnetic head further includes a conductive layer 63 made of a nonmagnetic conductive material. The conductive layer 63 is shaped to be elongated in the X direction and located in the space defined by the first portion 76A and the second portion 76B of the magnetic layer 76. The magnetic head further includes an insulating film 31 interposed between the conductive layer 63 and each of the magnetic layer 76 and the nonmagnetic layer 26. Each of the nonmagnetic layer 26 and the insulating film 31 has an opening for exposing the top surface of the conductive layer 57 and an opening for exposing the top surface of the conductive layer 58. The conductive layer 63 is shaped to be elongated in the X direction. A portion of the conductive layer 63 adjacent to its one end in the longitudinal direction is in contact with the conductive layer 57, and a portion of the conductive layer 63 adjacent to its other end in the longitudinal direction is in contact with the conductive layer 58. The conductive layer 63 forms the portion 111C1 of the nonmagnetic portion 111C of the coil 111. The nonmagnetic layer 26 and the insulating film 31 are interposed between the conductive layer 63 and the main pole 25. The insulating film 31 is made of alumina, for example.

The magnetic head further includes an insulating layer 32 disposed on the nonmagnetic layer 26 and surrounding the conductive layer 63 and the magnetic layer 76. The top surfaces of the conductive layer 63, the magnetic layer 76, the insulating film 31 and the insulating layer 32 are even with each other. The insulating layer 32 is made of alumina, for example.

The magnetic head further includes a protective layer 36 made of an insulating material such as alumina and disposed to cover the write head unit. The base body 211 shown in FIG. 7 is mainly composed of the substrate 1 and the protective layer 36 shown in FIG. 4 to FIG. 6.

As has been described, the magnetic head according to the present embodiment has the medium facing surface 40, the read head unit, and the write head unit. The read head unit and the write head unit are stacked on the substrate 1. The read head unit is located on the rear side in the direction of travel of the recording medium (the Z direction), i.e., the leading side, relative to the write head unit.

The write head unit includes the coil 111, the leads 112 and 113, the main pole 25, the write shield 120, the gap part 130, and the return path section 140. The coil 111 and the leads 112 and 113 are formed of the conductive layers 51, 52, 55 to 58, and 63. More specifically, as shown in FIG. 4 and FIG. 6, the conductive layer 51 forms the portion 111C2 of the nonmagnetic portion 111C and the lead 112. The conductive layer 52 forms the portion 111C3 of the nonmagnetic portion 111C and the lead 113. The conductive layer 55 forms the portion 111D1 of the third magnetic portion 111D. The conductive layer 56 forms the portion 111D2 of the third magnetic portion 111D. The conductive layer 57 forms the first magnetic portion 111A. The conductive layer 58 forms the second magnetic portion 111B. The conductive layer 63 forms the portion 111C1 of the nonmagnetic portion 111C. In order to prevent a fracture during energization, the conductive layer 63 connecting the conductive layers 57 and 58 to each other preferably has a somewhat great thickness such as 0.35 μm or greater.

The write shield 120 includes the first to fourth shield portions 121 to 124. The gap part 130 includes the first and second gap portions 130A and 130B. The return path section 140 includes the first and second yoke portions 141 and 142 and the first and second coupling portions 145 and 146.

The function and effects of the magnetic head according to the present embodiment will now be described. The magnetic head writes data on a recording medium by using the write head unit and reads data stored on a recording medium by using the read head unit. In the write head unit, the coil 111 produces a magnetic field corresponding to data to be written on a recording medium. The main pole 25 allows a magnetic flux corresponding to the magnetic field produced by the coil 111 to pass, and produces a write magnetic field for writing data on the recording medium by means of a perpendicular magnetic recording system.

The write shield 120 captures a disturbance magnetic field applied to the magnetic head from the outside thereof. This prevents the disturbance magnetic field from being intensively captured into the main pole 25 and inducing erroneous writing on a recording medium. Further, the write shield 120 has the function of capturing a magnetic flux that is produced from the end face of the main pole 25 and spreads in directions other than the direction perpendicular to the plane of the recording medium, so as to prevent the magnetic flux from reaching the recording medium. Moreover, the write shield 120 and the return path section 140 have the function of allowing a magnetic flux that has been produced from the end face of the main pole 25 and has magnetized the recording medium to flow back to the main pole 25.

In the present embodiment, the write shield 120 includes the first and second shield portions 121 and 122 located on opposite sides of the main pole 25 in the track width direction, and the return path section 140 includes the first and second yoke portions 141 and 142 located on opposite sides of the main pole 25 in the track width direction. The coil 111 passes through the first and second spaces S1 and S2 so as to surround at least part of the entire outer periphery of the main pole 25 when viewed from the medium facing surface 40. The present embodiment having these features makes it possible to make full use of the function of the write shield 120 and to prevent unwanted erasure. This advantageous effect will be described in detail below.

In the present embodiment, a magnetic flux having been captured into the first shield portion 121 flows toward the first yoke portion 141, while a magnetic flux having been captured into the second shield portion 122 flows toward the second yoke portion 142. More specifically, in the present embodiment, the magnetic fluxes having been captured into the first and second shield portions 121 and 122 located on opposite sides of the main pole 25 in the track width direction flow smoothly, with hardly any restriction imposed by the magnetic path structure, toward the first and second yoke portions 141 and 142 located on opposite sides of the main pole 25 in the track width direction, and flow back to the main pole 25. Thus, the present embodiment makes it possible to capture a sufficient amount of magnetic flux into the write shield 120 from the first and second shield portions 121 and 122, and prevent the magnetic flux having been captured into the write shield 120 from leaking out of the write shield 120. Consequently, according to the present embodiment, it is possible to make full use of the function of the write shield 120 and to prevent unwanted erasure.

Now, a magnetic head of a first comparative example having the following configuration will be contemplated for comparison with the magnetic head according to the present embodiment. The magnetic head of the first comparative example does not have the first and second yoke portions 141 and 142 of the first embodiment, and instead has a first return yoke located on the trailing side relative to the main pole 25 and connected to the write shield 120, a second return yoke located on the leading side relative to the main pole 25 and connected to the write shield 120, a first coupling part coupling the first return yoke to part of the main pole 25 away from the medium facing surface 40, and a second coupling part coupling the second return yoke to part of the main pole 25 away from the medium facing surface 40. Further, the magnetic head of the first comparative example has a coil having a first winding portion wound around the first coupling part and a second winding portion wound around the second coupling part, in place of the coil 111 of the first embodiment. U.S. Patent Application Publication No. 2005/0128637 A1 discloses a magnetic head having a configuration similar to that of the magnetic head of the first comparative example.

In the magnetic head of the first comparative example, a magnetic flux having been captured into each of the first and second shield portions 121 and 122 located on opposite sides of the main pole 25 in the track width direction bifurcates into two separate flows; one toward the first return yoke; and the other toward the second return yoke. At this time, the magnetic flux passes through a magnetic path composed of a plurality of magnetic layers stacked one on another. The magnetic path includes one or more boundaries between two adjacent magnetic layers, the one or more boundaries being exposed in the medium facing surface 40. In the vicinity of the one or more boundaries, magnetic flux tends to leak from within the magnetic path to the outside thereof. This may result in the occurrence of unwanted erasure. The occurrence of unwanted erasure may become noticeable particularly when the two adjacent magnetic layers are made of different materials.

In contrast to this, the magnetic head according to the present embodiment is configured so that neither the magnetic path passing through the first shield portion 121 and the first yoke portion 141 nor the magnetic path passing through the second shield portion 122 and the second yoke portion 142 includes any boundary between two magnetic layers that is exposed in the medium facing surface 40. Thus, the present embodiment makes it possible to prevent the occurrence of unwanted erasure resulting from a boundary between two magnetic layers.

Now, a comparison will be made between the operation of the magnetic head of the first comparative example and that of the magnetic head according to the present embodiment when the width of the second gap portion 130B in the track width direction is greater than the distance between the first shield portion 121 and the second shield portion 122 in the medium facing surface 40, as shown in FIG. 5. In the magnetic head of the first comparative example, as described above, a magnetic flux having been captured into each of the first and second shield portions 121 and 122 bifurcates into two separate flows: one toward the first return yoke; and the other toward the second return yoke. The flow of the magnetic flux toward the first return yoke from each of the first and second shield portions 121 and 122 is restricted on the way by the second gap portion 130B which is large in width in the track width direction. Thus, in the vicinity of the second gap portion 130B, the magnetic flux tends to leak from within the write shield 120 to the outside thereof. This may result in the occurrence of unwanted erasure.

In contrast to this, in the magnetic head according to the present embodiment, magnetic fluxes having been captured into the first and second shield portions 121 and 122 flow toward the first and second yoke portions 141 and 142, respectively, as described above. Therefore, the flows of the magnetic fluxes will not be restricted by the second gap portion 130B. Thus, according to the present embodiment, it is possible to prevent the occurrence of unwanted erasure attributable to the second gap portion 130B.

Now, consider a magnetic head of a second comparative example having such a structure that the first and second yoke portions 141 and 142 are added to the magnetic head of the first comparative example. In the magnetic head of the second comparative example, a magnetic flux corresponding to a magnetic field produced by the first winding portion trifurcates into three separate flows: one from the first coupling part toward the main pole 25; another from the first coupling part toward the first yoke portion 141; and the other from the first coupling part toward the second yoke portion 142. Likewise, a magnetic flux corresponding to a magnetic field produced by the second winding portion trifurcates into three separate flows: one from the second coupling part toward the main pole 25; another from the second coupling part toward the first yoke portion 141; and the other from the second coupling part toward the second yoke portion 142. As a result, magnetic fields are produced from the first and second end faces 121a and 122a in a direction the same as the direction of the write magnetic field produced from the end face of the main pole 25. This causes the problem of unwanted erasure to arise with the magnetic head of the second comparative example.

In contrast to this, in the magnetic head according to the present embodiment, since the coil 111 is wound around the main pole 25, magnetic fields produced from the first and second end faces 121a and 122a are in the opposite direction to the direction of the write magnetic field produced from the end face of the main pole 25. The present embodiment is thus free from the aforementioned problem with the second comparative example.

As can be seen from the foregoing, the present embodiment makes it possible to make full use of the function of the write shield 120 and to prevent unwanted erasure. Simulation results showing this effect will be described later.

Part of the magnetic flux leaking from a portion of the main pole 25 other than the end face is captured by the write shield 120. An increase in the amount of magnetic flux captured by the write shield 120 may degrade the above-described function of the write shield 120. To address this problem, in the present embodiment the first and second magnetic portions 111A and 111B of the coil 111 located near the main pole 25 are made of a magnetic conductive material, so that part of the magnetic flux leaking from the main pole 25 can be absorbed by the first and second magnetic portions 111A and 111B. According to the present embodiment, it is thereby possible to prevent degradation of the function of the write shield 120.

If the entirety of the coil 111 is made of a magnetic conductive material, the magnetic flux absorbed by the first and second magnetic portions 111A and 111B of the coil 111 may leak to the outside from a portion of the coil 111 located outside the first and second spaces S1 and S2. This may result in the occurrence of unwanted erasure. In contrast to this, in the present embodiment the coil 111 includes the nonmagnetic portion 111C located outside the first and second spaces S1 and S2 and made of a nonmagnetic conductive material. This makes it possible to prevent the magnetic flux absorbed by the first and second magnetic portions 111A and 111B of the coil 111 from leaking to the outside from a portion of the coil 111 located outside the first and second spaces S1 and S2. This also contributes to the prevention of unwanted erasure.

Figure 11:
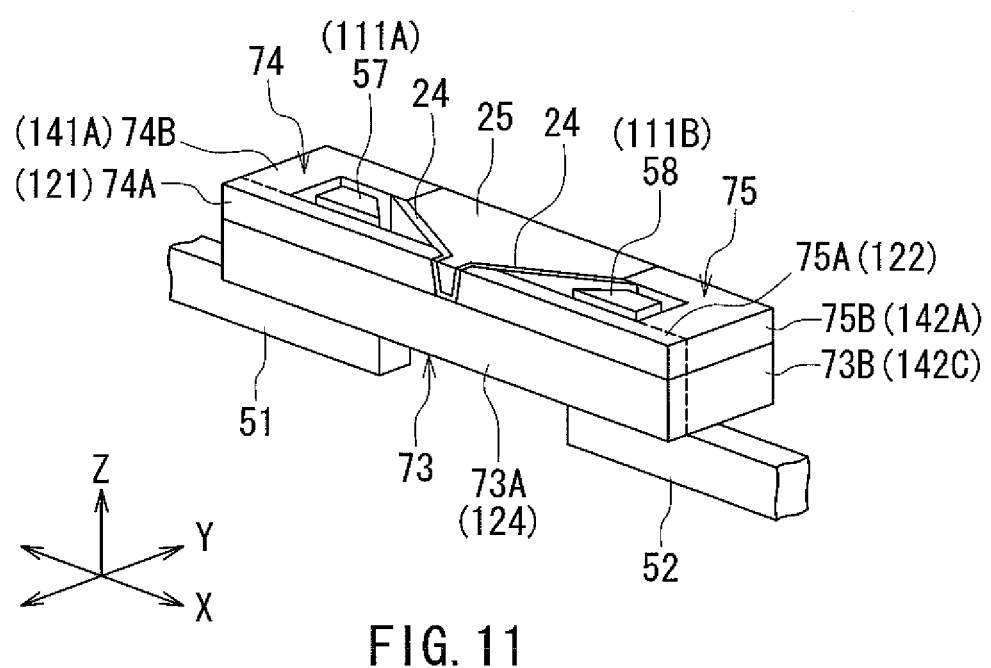
FIG. 11 is a perspective view showing a step of a method of manufacturing the magnetic head according to the first embodiment of the invention.

Now, a method of manufacturing the magnetic head according to the present embodiment will be described. The method of manufacturing the magnetic head includes the step of forming the read head unit and the step of forming the write head unit. The step of forming the write head unit will be described with reference to FIG. 4 to FIG. 6 and FIG. 11. FIG. 11 is a perspective view showing a step of the method of manufacturing the magnetic head according to the present embodiment. FIG. 11 shows part of a stack of layers formed in the process of manufacturing the magnetic head.

In the step of forming the write head unit, first, the conductive layers 51 and 52 are formed on the insulating layer 9. For example, frame plating is employed to form the conductive layers 51 and 52. Next, the insulating layer 17 is formed to cover the conductive layers 51 and 52. The insulating layer 17 is then polished by, for example, chemical mechanical polishing (hereinafter referred to CMP), until the conductive layers 51 and 52 are exposed. Next, the insulating layer 18 is formed over the entire top surface of the stack. The insulating layer 18 is then selectively etched to form therein the first and second openings mentioned previously.

Next, the conductive layers 55 and 56 and the magnetic layer 73 including the first and second portions 73A and 73B are formed. The magnetic layer 73 is formed simultaneously with the conductive layers 55 and 56 using the same material as the conductive layers 55 and 56. For example, frame plating is employed to form the conductive layers 55 and 56 and the magnetic layer 73. The conductive layer 55 is formed on the conductive layer 51 at the position of the first opening of the insulating layer 18. The conductive layer 56 is formed on the conductive layer 52 at the position of the second opening of the insulating layer 18. The magnetic layer 73 is formed on the insulating layer 18. Next, the insulating layer 23 is formed to cover the conductive layers 55 and 56 and the magnetic layer 73. The insulating layer 23 is then polished by, for example, CMP, until the conductive layers 55 and 56 and the magnetic layer 73 are exposed.

Next, the nonmagnetic layer 24 and the main pole 25 are formed. This step will now be described in detail. First, a mold (not illustrated) for forming the main pole 25 is formed over the conductive layers 55 and 56, the magnetic layer 73 and the insulating layer 23. The mold is formed by patterning a photoresist layer by photolithography. The mold has a penetrating opening that has a shape corresponding to the planar shape (the shape in a plan view) of the main pole 25. The nonmagnetic layer 24 and the main pole 25 will be formed in this opening.

Then, the nonmagnetic layer 24 is formed in the opening by atomic layer deposition, for example. After that, the nonmagnetic layer 24 is selectively etched to form therein an opening for exposing part of the top surface of the second portion 73B of the magnetic layer 73. Next, a magnetic film to later become the main pole 25 is formed by plating, for example. The magnetic film fills the opening of the mold, and has a part lying on the top surface of the mold. The magnetic film is then polished by, for example, CMP, until the top surface of the mold is exposed. This makes the magnetic film into the main pole 25. The mold is then removed.

In the step of forming the write head unit, the conductive layers 57 and 58 and the magnetic layers 74 and 75 are then formed. The magnetic layers 74 and 75 are formed simultaneously with the conductive layers 57 and 58 using the same material as the conductive layers 57 and 58. For example, frame plating is employed to form the conductive layers 57 and 58 and the magnetic layers 74 and 75. The conductive layer 57 is formed on the conductive layer 55. The conductive layer 58 is formed on the conductive layer 56. The magnetic layers 74 and 75 are formed on the magnetic layer 73. FIG. 11 shows an assemblage of the main pole 25, the conductive layers 51, 52 and 55 to 58, the magnetic layers 73 to 75 and the nonmagnetic layer 24 after the formation of the conductive layers 57 and 58 and the magnetic layers 74 and 75.

Next, the magnetic layer 76 including the first and second portions 76A and 76B are formed. For example, frame plating is employed to form the magnetic layer 76. The magnetic layer 76 is formed on the main pole 25, the nonmagnetic layer 26 and the magnetic layers 74 and 75. Next, the insulating film 31 is formed over the entire top surface of the stack. The insulating film 31 is then selectively etched to form therein two openings for exposing the top surfaces of the conductive layers 57 and 58. Next, the conductive layer 63 is formed to fill the space defined by the first portion 76A and the second portion 76B of the magnetic layer 76. For example, frame plating is employed to form the conductive layer 63. The conductive layer 63 is formed such that a portion thereof lies over the insulating film 31 located on the top surface of the magnetic layer 76. The conductive layer 63 and the insulating film 31 are then polished by, for example, CMP, until the top surface of the magnetic layer 76 is exposed. Next, the insulating layer 32 is formed to cover the conductive layer 63 and the magnetic layer 76. The insulating layer 32 is then polished by, for example, CMP, until the conductive layer 63 and the magnetic layer 76 are exposed. The write head unit is completed through a series of steps described above.

Next, the magnetic layer 76 including the first and second portions 76A and 76B are formed. For example, frame plating is employed to form the magnetic layer 76. The magnetic layer 76 is formed on the main pole 25, the nonmagnetic layer 26 and the magnetic layers 74 and 75. Next, the insulating film 31 is formed over the entire top surface of the stack. The insulating film 31 is then selectively etched to form therein two openings for exposing the top surfaces of the conductive layers 57 and 58. Next, the conductive layer 63 is formed to fill the space defined by the first portion 76A and the second portion 76B of the magnetic layer 76. For example, frame plating is employed to form the conductive layer 63. The conductive layer 63 is formed such that a portion thereof lies over the insulating film 31 located on the top surface of the magnetic layer 76. The conductive layer 63 and the insulating film 31 are then polished by, for example, CMP, until the top surface of the magnetic layer 76 is exposed. Next, the insulating layer 32 is formed to cover the conductive layer 63 and the magnetic layer 76. The insulating layer 32 is then formed by, for example, CMP, until the conductive layer 63 and the magnetic layer 76 are exposed. The write head unit is completed through a series of steps described above.

The features of the method of manufacturing the magnetic head according to the present embodiment will now be described. The method of manufacturing the magnetic head according to the present embodiment includes the steps of: forming the coil 111; forming the main pole 25; forming the write shield 120; forming the gap part 130; and forming the return path section 140. The step of forming the coil 111 includes the step of forming the conductive layers 57 and 58, which form the first and second magnetic portions 111A and 111B, respectively, using a magnetic conductive material. The step of forming the coil 111 further includes the step of forming the nonmagnetic portion 111C (the conductive layers 51, 52 and 63) and the step of forming the third magnetic portion 111D (the conductive layers 55 and 56).

The step of forming the write shield 120 includes the step of forming at least part of the write shield 120 using the same material as the first and second magnetic portions 111A and 111B of the coil 111, that is, the same material as the conductive layers 57 and 58. In the present embodiment, the at least part of the write shield 120 refers to the first shield portion 121 formed of the first portion 74A of the magnetic layer 74 and the second shield portion 122 formed of the first portion 75A of the magnetic layer 75. The step of forming the write shield 120 further includes the step of forming the third shield portion 123 (the first portion 76A of the magnetic layer 76) and the step of forming the fourth shield portion 124 (the first portion 73A of the magnetic layer 73).

The step of forming the return path section 140 includes the step of forming at least part of the return path section 140 using the same material as the first and second magnetic portions 111A and 111B of the coil 111, that is, the same material as the conductive layers 57 and 58. In the present embodiment, the at least part of the return path section 140 refers to the portion 141A of the first yoke portion 141 formed of the second portion 74B of the magnetic layer 74 and the portion 142A of the second yoke portion 142 formed of the second portion 75B of the magnetic layer 75. The step of forming the return path section 140 further includes the step of forming the portion 141B of the first yoke portion 141, the portion 142B of the second yoke portion 142 and the first coupling portion 145, that is, the step of forming the second portion 76B of the magnetic layer 76, and the step of forming the portion 141C of the first yoke portion 141, the portion 142C of the second yoke portion 142 and the second coupling portion 146, that is, the step of forming the second portion 73B of the magnetic layer 73.

In the present embodiment, the magnetic layers 74 and 75 are formed simultaneously with the conductive layers 57 and 58 using the same material as the conductive layers 57 and 58. More specifically, in the present embodiment, the step of forming the first and second magnetic portions 111A and 111B of the coil 111, the step of forming at least part of the write shield 120 (at least the first and second shield portions 121 and 122), and the step of forming at least part of the return path section 140 (at least the portions 141A and 142A of the first and second yoke portions 141 and 142) are performed simultaneously. Thus, in the present embodiment, the first and second magnetic portions 111A and 111B of the coil 111 are patterned simultaneously with at least part of each of the write shield 120 and the return path section 140. This makes the manufacture of the magnetic head easier than in the case where these portions are patterned separately.

Further, in the present embodiment, the magnetic layer 73 is formed simultaneously with the conductive layers 55 and 56 using the same material as the conductive layers 55 and 56. More specifically, in the present embodiment, the step of forming the third magnetic portion 111D of the coil 111, the step of forming at least part of the write shield 120 (at least the fourth shield portion 124), and the step of forming at least part of the return path section 140 (at least the portion 141C of the first yoke portion 141, the portion 142C of the second yoke portion 142 and the second coupling portion 146) are also performed simultaneously. This makes the manufacture of the magnetic head easier than in the case where these portions are patterned separately.

Second Embodiment

Figure 12:
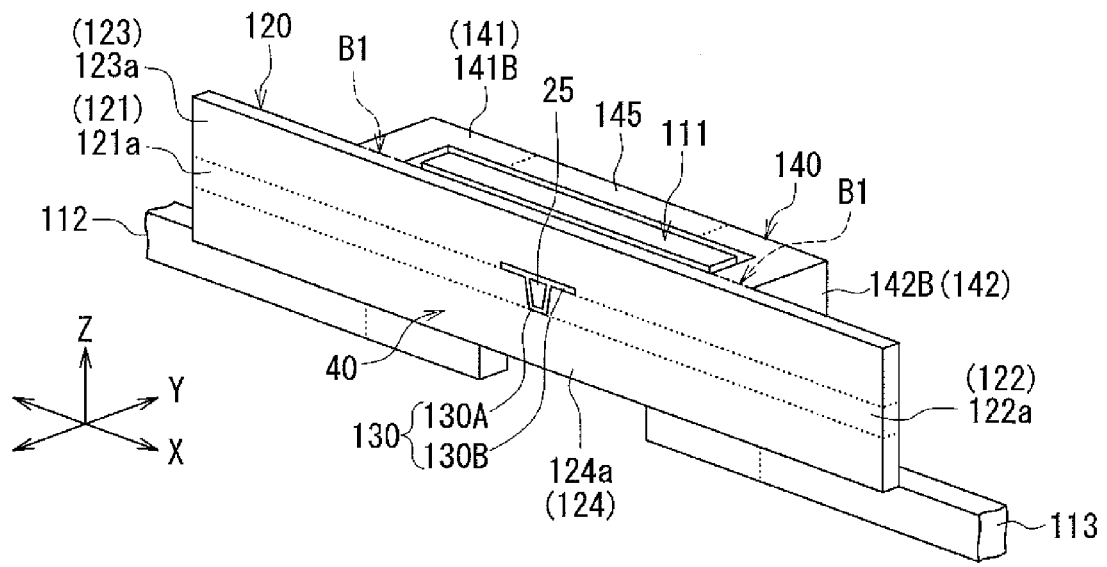
FIG. 12 is a perspective view showing the main part of a magnetic head according to a second embodiment of the invention.
Figure 13:
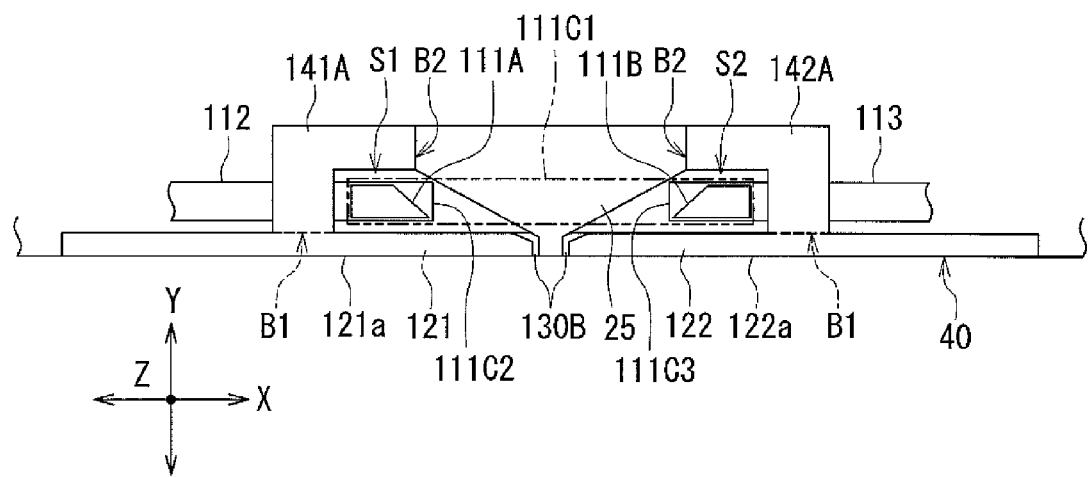
FIG. 13 is a plan view showing the main part shown in FIG. 12 with some portions eliminated.

A second embodiment of the present invention will now be described with reference to FIG. 12 and FIG. 13. FIG. 12 is a perspective view showing the main part of the magnetic head. FIG. 13 is a plan view showing the main part shown in FIG. 12 with some portions eliminated. FIG. 13 omits respective portions of the coil 111 and the return path section 140 that are located on the trailing side relative to the main pole 25. In FIG. 13, the portion of the coil 111 located on the trailing side relative to the main pole 25 is indicated by a chain double-dashed line.

The magnetic head according to the present embodiment differs from the magnetic head according to the first embodiment in the following ways. In the magnetic head according to the present embodiment, the write shield 120 includes a portion that is located farther from the main pole 25 in the track width direction than are the one or more interfaces B1 between the write shield 120 and the return path section 140. In the present embodiment, in particular, the first shield portion 121 includes a portion that is located farther from the main pole 25 in the track width direction than is one of the interfaces B1, i.e., the interface between the write shield 120 and the first yoke portion 141. Further, the second shield portion 122 includes a portion that is located farther from the main pole 25 in the track width direction than is the other one of the interfaces B1, i.e., the interface between the write shield 120 and the second yoke portion 142. The distance between the distal ends of the first shield portion 121 and the second shield portion 122 is greater than the distance between the distal ends of the first yoke portion 141 and the second yoke portion 142.

Further, in the present embodiment, the third shield portion 123 includes a portion that is located farther from the main pole 25 in the track width direction than are the one or more interfaces B1 between the write shield 120 and the return path section 140. The width of the third shield portion 123 in the track width direction is equal to the distance between the distal ends of the first shield portion 121 and the second shield portion 122, for example.

Further, in the present embodiment, the fourth portion 124 includes a portion that is located farther from the main pole 25 in the track width direction than are the one or more interfaces B1 between the write shield 120 and the return path section 140. The width of the fourth shield portion 124 in the track width direction is equal to the distance between the distal ends of the first shield portion 121 and the second shield portion 122, for example.

According to the present embodiment, when compared with the first embodiment, a greater amount of magnetic flux can be captured into the write shield 120 from the end face of the write shield 120 located in the medium facing surface 40. The present embodiment thus makes it possible to prevent unwanted erasure more effectively.

In the example shown in FIG. 12, all of the first to fourth shield portions 121, 122, 123 and 124 include a portion that is located farther from the main pole 25 in the track width direction than are the one or more interfaces B1. However, in the present embodiment, only one or more, but not all, of the first to fourth shield portions 121, 122, 123 and 124 may include a portion that is located farther from the main pole 25 in the track width direction than are the one or more interfaces B1.

The remainder of configuration, function and effects of the present embodiment are similar to those of the first embodiment.

Third Embodiment

Figure 14:
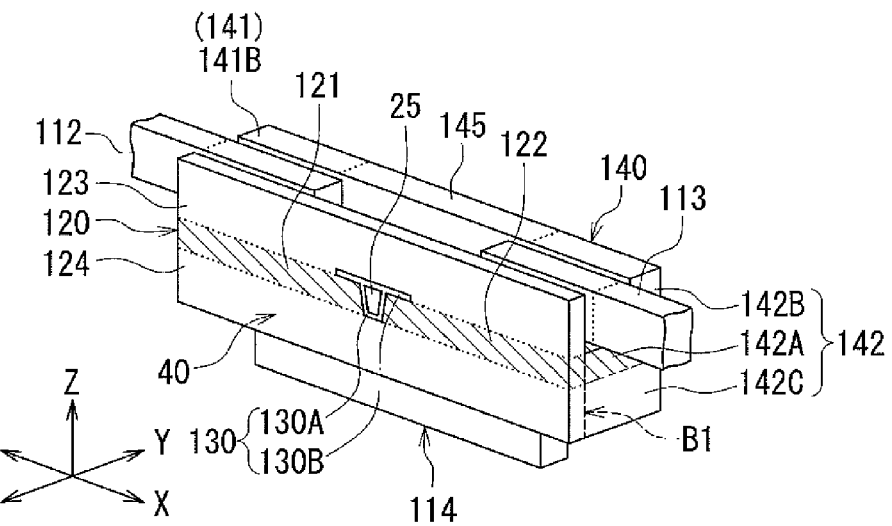
FIG. 14 is a perspective view showing the main part of a magnetic head according to a third embodiment of the invention.
Figure 15:
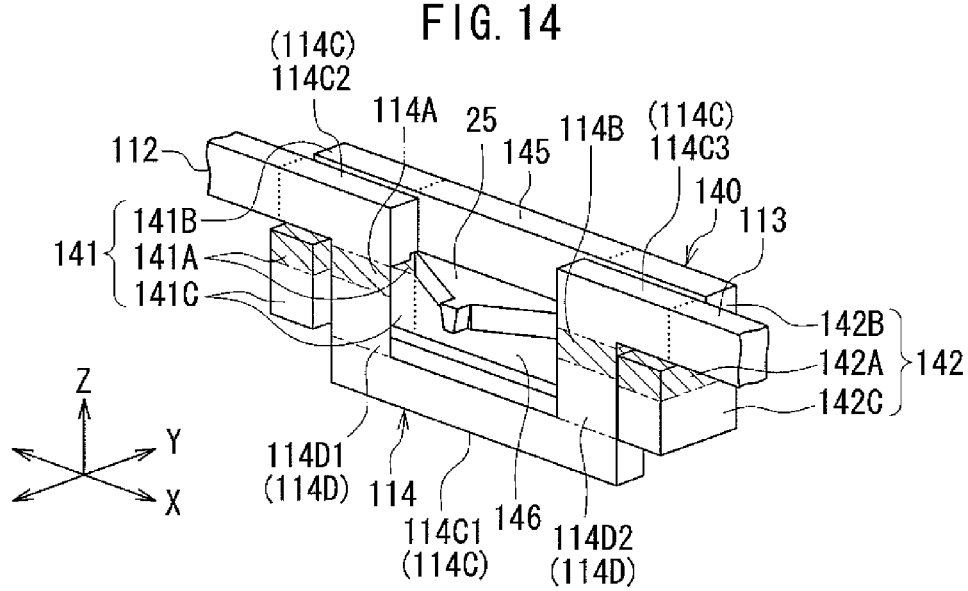
FIG. 15 is a perspective view showing the main part shown in FIG. 14 with some portions eliminated.
Figure 16:
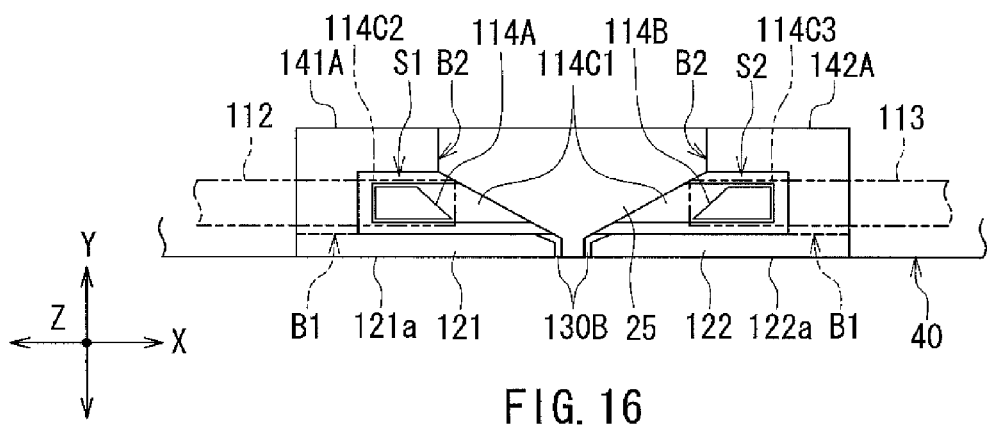
FIG. 16 is a plan view showing the main part shown in FIG. 14 with some other portions eliminated.
Figure 17:
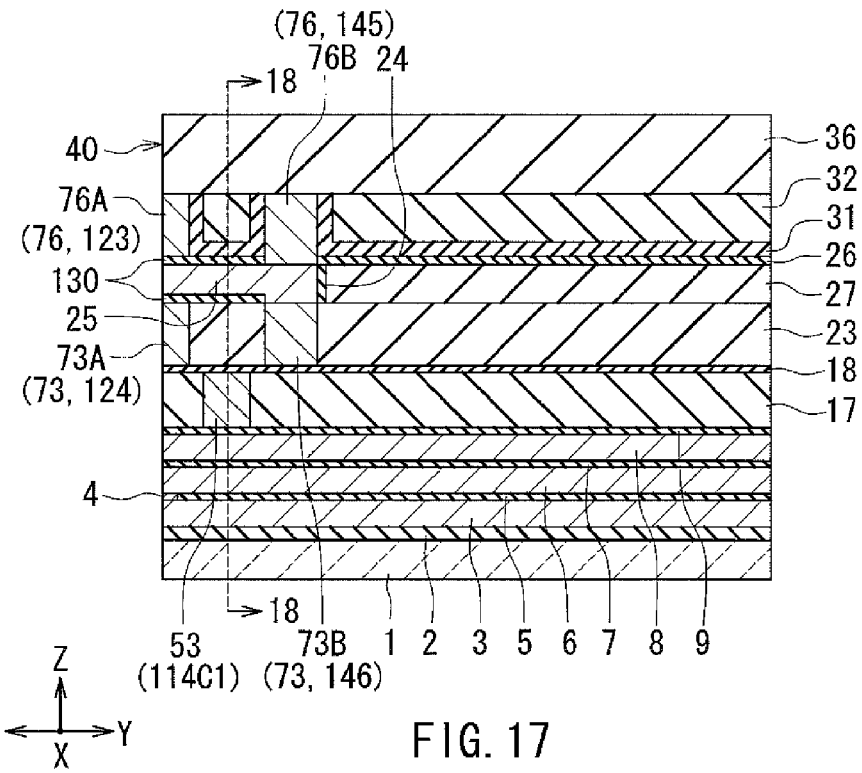
FIG. 17 is a cross-sectional view showing the configuration of the magnetic head according to the third embodiment of the invention.
Figure 18:
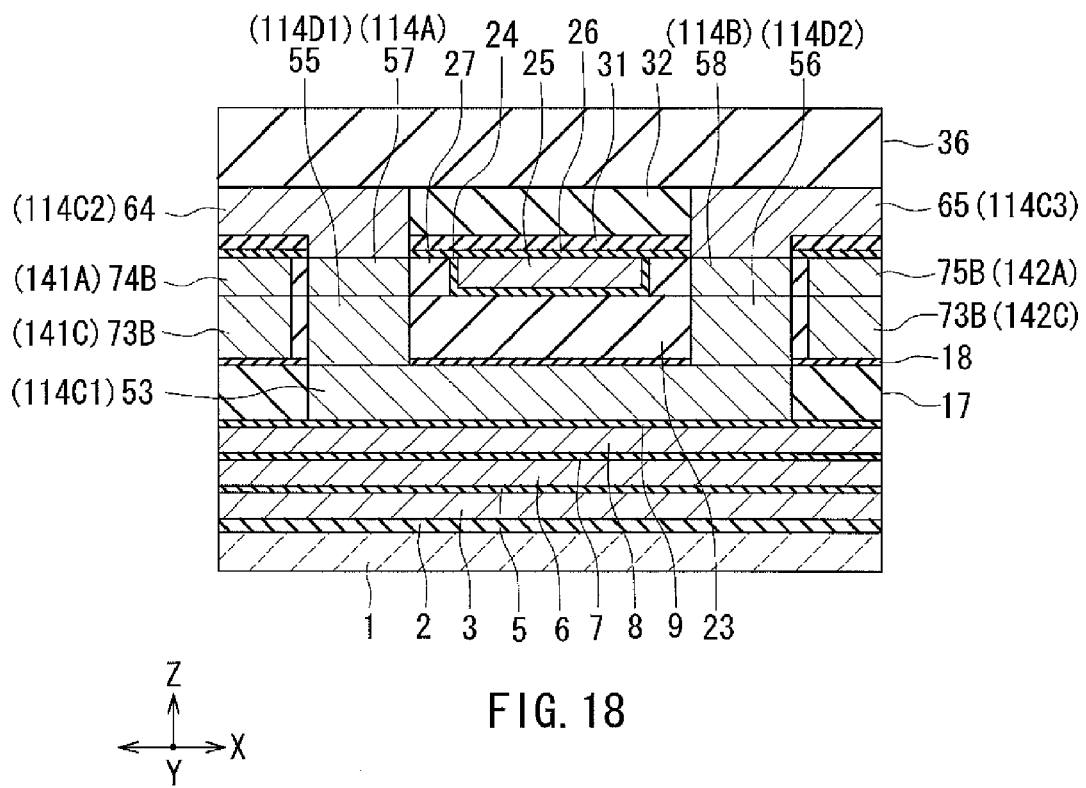
FIG. 18 is a cross-sectional view showing a cross section taken at the position indicated by line 18-18 of FIG. 17.

A third embodiment of the present invention will now be described with reference to FIG. 14 to FIG. 18. FIG. 14 is a perspective view showing the main part of the magnetic head. FIG. 15 is a perspective view showing the main part shown in FIG. 14 with some portions eliminated. FIG. 16 is a plan view showing the main part shown in FIG. 14 with some other portions eliminated. FIG. 17 is a cross-sectional view showing the configuration of the magnetic head. FIG. 18 is a cross-sectional view showing a cross section taken at the position indicated by line 18-18 of FIG. 17.

The magnetic head according to the present embodiment differs from the magnetic head according to the first embodiment in the following ways. The magnetic head according to the present embodiment has a coil 114 in place of the coil 111 of the first embodiment. In FIG. 14 and FIG. 15 the boundaries between the coil 114 and the leads 112 and 113 are shown by dotted lines. FIG. 15 omits the write shield 120. FIG. 16 omits respective portions of the coil 114 and the return path section 140 that are located on the trailing side relative to the main pole 25. In FIG. 16, the portion of the coil 114 located on the trailing side relative to the main pole 25 is indicated by a chain double-dashed line.

As shown in FIG. 15, of the entire outer periphery of the main pole 25 when viewed from the medium facing surface 40, the coil 114 particularly surrounds a portion located on the rear side in the direction of travel of the recording medium (the Z direction) and portions located on opposite sides in the track width direction (the X direction). Thus, the coil 114 does not wrap one turn around the entire outer periphery of the main pole 25. The coil 114 thus passes through the first and second spaces S1 and S2 so as to surround at least part of the entire outer periphery of the main pole 25 when viewed from the medium facing surface 40. In the present embodiment, the leads 112 and 113 are located on the front side in the direction of travel of the recording medium relative to the main pole 25 and drawn from opposite ends of the coil 114 in opposite directions along the track width.

The coil 114 includes a first magnetic portion 114A located in the first space S1, a second magnetic portion 114B located in the second space S2, and a nonmagnetic portion 114C and a third magnetic portion 114D located outside the first and second spaces S1 and S2. The first to third magnetic portions 114A, 114B, and 114D are each made of a magnetic conductive material. The nonmagnetic portion 114C is made of a nonmagnetic conductive material.

The nonmagnetic portion 114C includes three portions 114C1, 114C2, and 114C3. The portion 114C1 is located on the rear side in the direction of travel of the recording medium relative to the first and second magnetic portions 114A and 114B. The portion 114C2 is located at the same level as the leads 112 and 113 in the direction of travel of the recording medium and connects the lead 112 and the first magnetic portion 114A to each other. The portion 114C3 is located at the same level as the leads 112 and 113 in the direction of travel of the recording medium and connects the lead 113 and the second magnetic portion 114B to each other.

The third magnetic portion 114D includes two portions 114D1 and 114D2. The portion 114D1 connects the first magnetic portion 114A and the portion 114C1 to each other. The portion 114D2 connects the second magnetic portion 114B and the portion 114C1 to each other.

In FIG. 15, the boundaries between the aforementioned portions constituting the coil 114 are indicated by dot-and-dash lines. Further, in FIG. 15 the first and second magnetic portions 114A and 114B are hatched for the purpose of clarity.

Here, assume a region between two cross sections that are perpendicular to the direction of travel of the recording medium (the Z direction) and sandwich the first and second magnetic portions 114A and 114B of the coil 114. One of the two cross sections includes the interface between the first magnetic portion 114A and the portion 114C2 and the interface between the second magnetic portion 114B and the portion 114C3, while the other includes the interface between the first magnetic portion 114A and the portion 114D1 and the interface between the second magnetic portion 114B and the portion 114D2. At least in the aforementioned region, the write shield 120 and the return path section 140 may be made of the same material as the first and second magnetic portions 114A and 114B of the coil 114. More specifically, at least the first and second shield portions 121 and 122 of the write shield 120 and at least the portions 141A and 142A of the first and second yoke portions 141 and 142 of the return path section 140 may be made of the same material as the first and second magnetic portions 114A and 114B of the coil 114. In FIG. 14 and FIG. 15, the respective portions of the coil 114, the write shield 120 and the return path section 140 that may be made of the same material are indicated by the same hatching.

Further, the magnetic head according to the present embodiment has conductive layers 53, 64 and 65 each made of a nonmagnetic conductive material, in place of the conductive layers 51, 52 and 63 of the first embodiment. The coil 114 and the leads 112 and 113 are formed of the conductive layers 53, 55 to 58, 64, and 65.

As shown in FIG. 17 and FIG. 18, the conductive layer 53 is shaped to be elongated in the X direction and is disposed on the insulating layer 9. The insulating layer 17 is disposed around the conductive layer 53. In the present embodiment, the insulating layer 18 lies on the conductive layer 53 and the insulating layer 17. The insulating layer 18 has a third opening and a fourth opening in place of the first and second openings of the first embodiment. The third opening exposes a portion of the top surface of the conductive layer 53 adjacent to one end thereof in the longitudinal direction. The fourth opening exposes a portion of the top surface of the conductive layer 53 adjacent to the other end thereof in the longitudinal direction. The conductive layer 55 lies on the conductive layer 53 at the position of the third opening of the insulating layer 18. The conductive layer 56 lies on the conductive layer 53 at the position of the fourth opening of the insulating layer 18.

As shown in FIG. 18, the conductive layer 64 lies on the conductive layer 57 and the insulating film 31. The conductive layer 65 lies on the conductive layer 58 and the insulating film 31. The nonmagnetic layer 26 and the insulating film 31 are interposed between the conductive layer 64 and the second portion 74B of the magnetic layer 74 and between the conductive layer 65 and the second portion 75B of the magnetic layer 75. The insulating film 31 and the insulating layer 32 are disposed around the conductive layers 64 and 65.

In the present embodiment, neither of the portion 141B of the first yoke portion 141 and the portion 142B of the second yoke portion 142 is connected to the third shield portion 123. The second portion 76B of the magnetic layer 76 is shaped to be elongated in the X direction. The second portion 76B is not connected to the first portion 76A of the magnetic layer 76, and is disposed such that the conductive layers 64 and 65 are interposed between the first portion 76A and the second portion 76B.

As shown in FIG. 17 and FIG. 18, the conductive layer 53 forms the portion 114C1 of the nonmagnetic portion 114C. The conductive layer 55 forms the portion 114D1 of the third magnetic portion 114D. The conductive layer 56 forms the portion 114D2 of the third magnetic portion 114D. The conductive layer 57 forms the first magnetic portion 114A. The conductive layer 58 forms the second magnetic portion 114B. The conductive layer 64 forms the portion 114C2 of the nonmagnetic portion 114C and the lead 112. The conductive layer 65 forms the portion 114C3 of the nonmagnetic portion 114C and the lead 113. In order to prevent a fracture during energization, the conductive layer 53 connecting the conductive layers 55 and 56 to each other preferably has a somewhat great thickness such as 0.35 µm or greater.

The shapes of the first to fourth shield portions 121, 122, 123 and 124 of the present embodiment may be the same as those of the second embodiment.

Now, the method of manufacturing the magnetic head according to the present embodiment will be described briefly. The present embodiment differs from the first embodiment in that the coil 114 is formed in place of the coil 111. The step of forming the coil 114 includes the step of forming the conductive layers 57 and 58, which form the first and second magnetic portions 114A and 114B, respectively, using a magnetic conductive material. The step of forming the coil 114 further includes the step of forming the nonmagnetic portion 114C (the conductive layers 53, 64 and 65) and the step of forming the third magnetic portion 114D (the conductive layers 55 and 56).

In the present embodiment, as in the first embodiment, the magnetic layers 74 and 75 are formed simultaneously with the conductive layers 57 and 58 using the same material as the conductive layers 57 and 58. More specifically, in the present embodiment, the step of forming the first and second magnetic portions 114A and 114B of the coil 114, the step of forming at least part of the write shield 120 (at least the first and second shield portions 121 and 122), and the step of forming at least part of the return path section 140 (at least the portions 141A and 142A of the first and second yoke portions 141 and 142) are performed simultaneously.

Further, in the present embodiment, as in the first embodiment, the magnetic layer 73 is formed simultaneously with the conductive layers 55 and 56 using the same material as the conductive layers 55 and 56. More specifically, in the present embodiment, the step of forming the third magnetic portion 114D of the coil 114, the step of forming at least part of the write shield 120 (at least the fourth shield portion 124), and the step of forming at least part of the return path section 140 (at least the portion 141C of the first yoke portion 141, the portion 142C of the second yoke portion 142 and the second coupling portion 146) are performed simultaneously.

The remainder of configuration, function and effects of the present embodiment are similar to those of the first or second embodiment.

Fourth Embodiment

Figure 19:
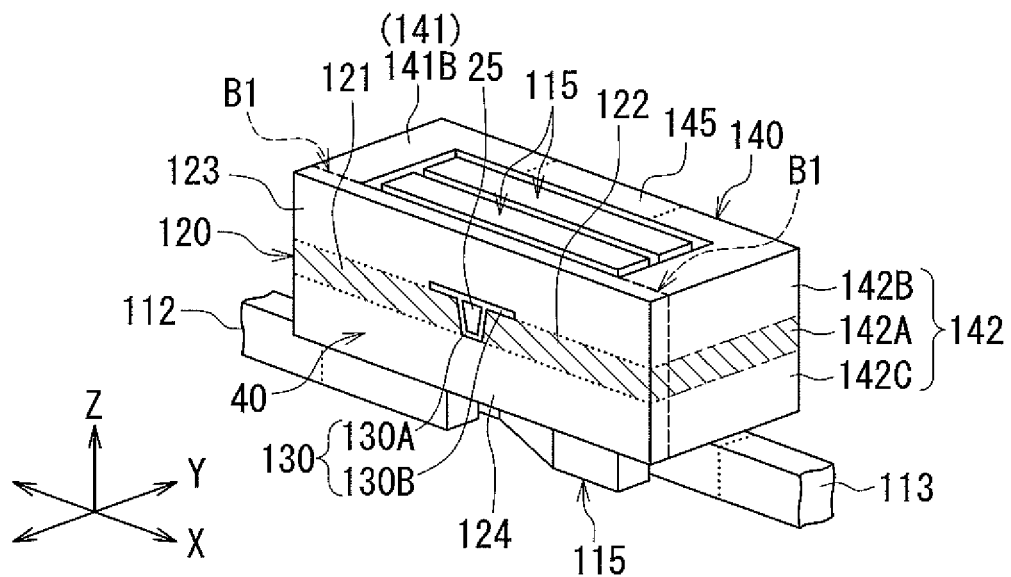
FIG. 19 is a perspective view showing the main part of a magnetic head according to a fourth embodiment of the invention.
Figure 20:
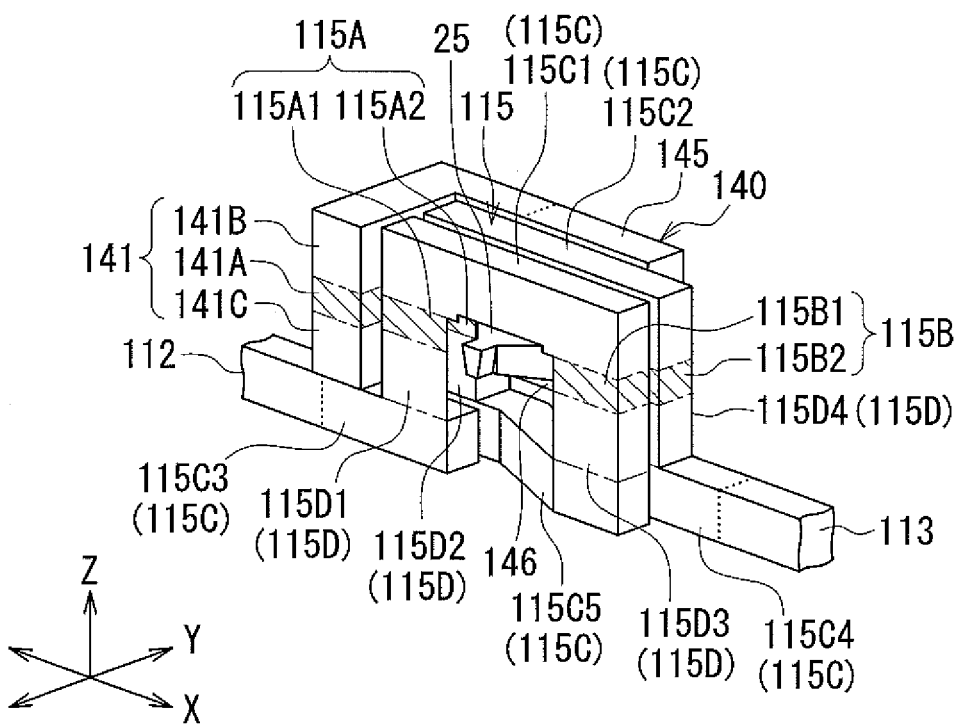
FIG. 20 is a perspective view showing the main part shown in FIG. 19 with some portions eliminated.
Figure 21:
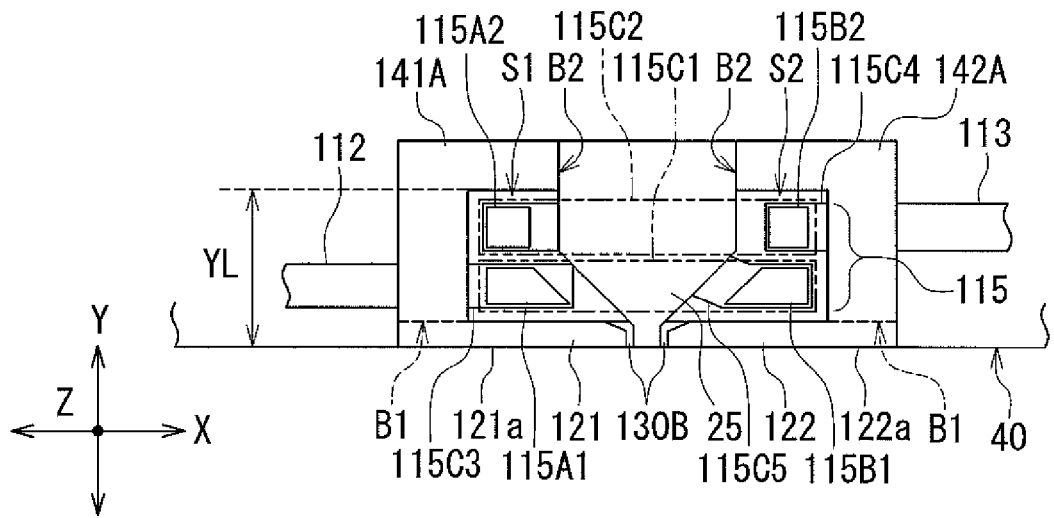
FIG. 21 is a plan view showing the main part shown in FIG. 19 with some other portions eliminated.
Figure 22:
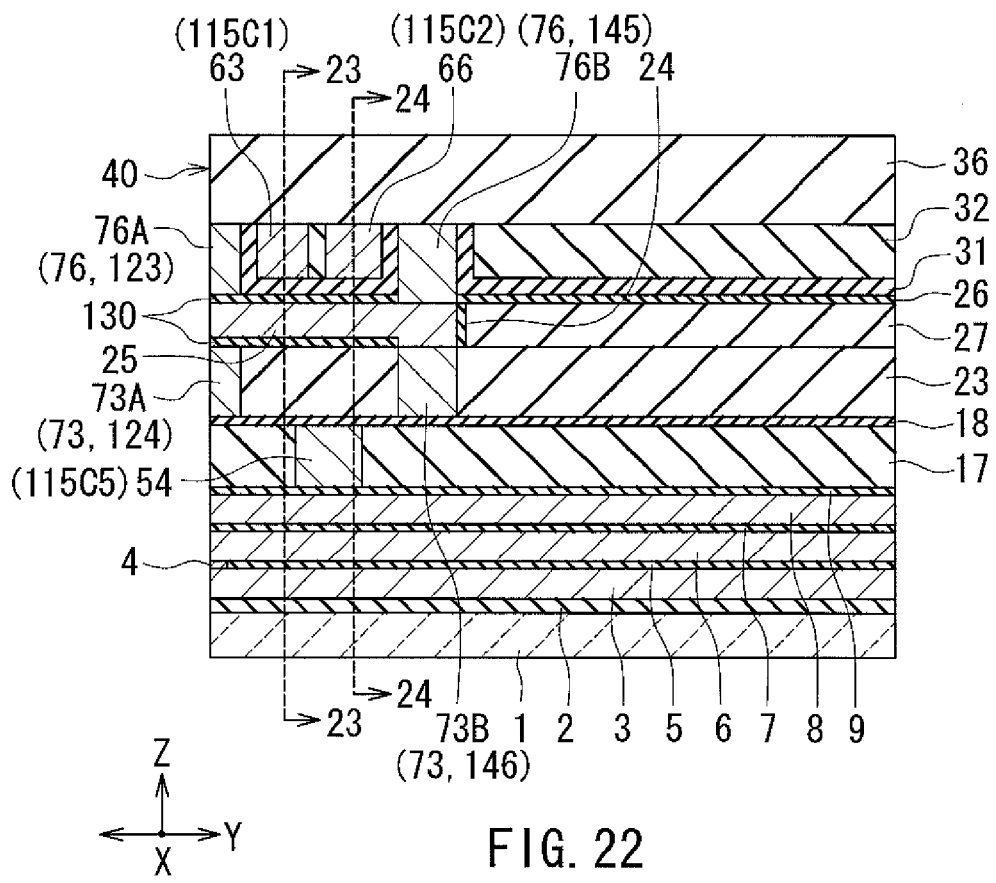
FIG. 22 is a cross-sectional view showing the configuration of the magnetic head according to the fourth embodiment of the invention.
Figure 23:
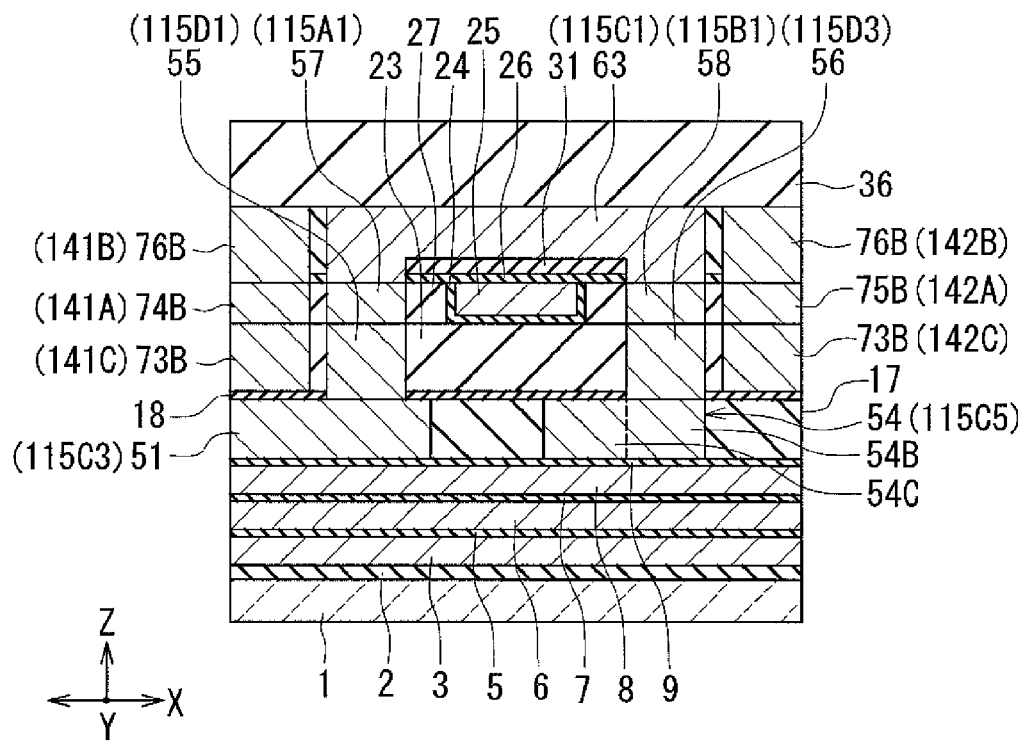
FIG. 23 is a cross-sectional view showing a cross section taken at the position indicated by line 23-23 of FIG. 22.
Figure 24:
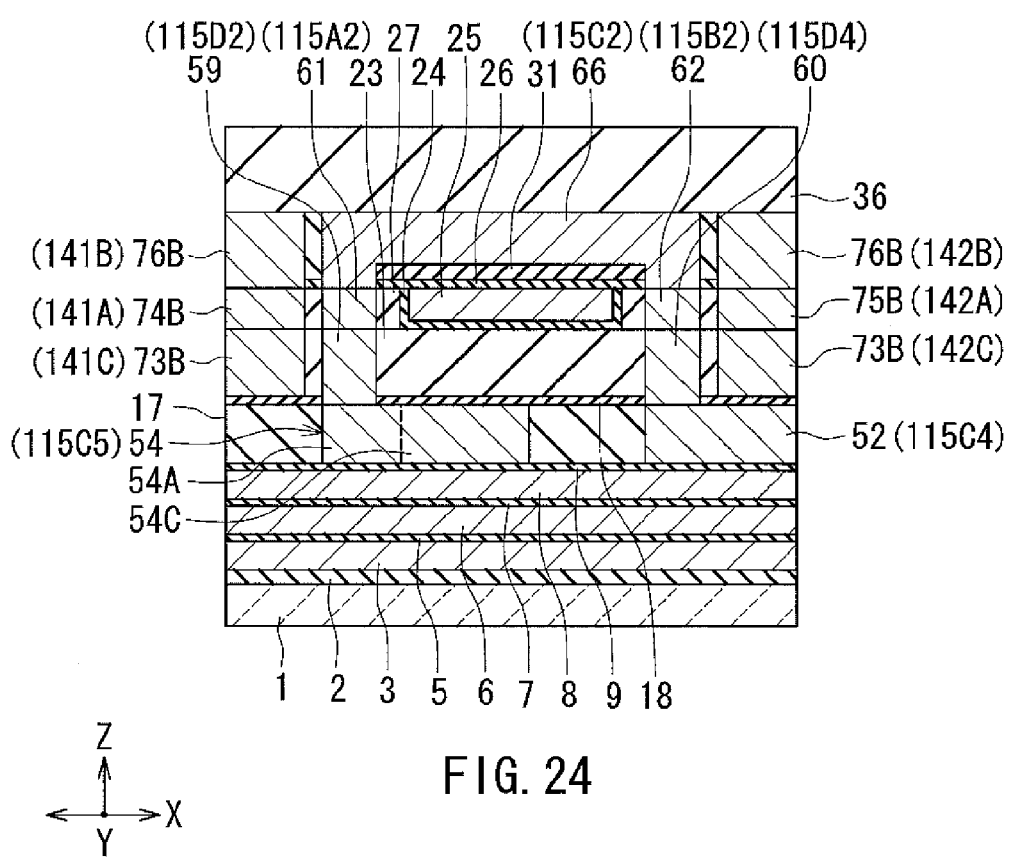
FIG. 24 is a cross-sectional view showing a cross section taken at the position indicated by line 24-24 of FIG. 22.

A fourth embodiment of the present invention will now be described with reference to FIG. 19 to FIG. 24. FIG. 19 is a perspective view showing the main part of the magnetic head. FIG. 20 is a perspective view showing the main part shown in FIG. 19 with some portions eliminated. FIG. 21 is a plan view showing the main part shown in FIG. 19 with some other portions eliminated. FIG. 22 is a cross-sectional view showing the configuration of the magnetic head. FIG. 23 is a cross-sectional view showing a cross section taken at the position indicated by line 23-23 of FIG. 22. FIG. 24 is a cross-sectional view showing a cross section taken at the position indicated by line 24-24 of FIG. 22.

The magnetic head according to the present embodiment differs from the magnetic head according to the first embodiment in the following ways. The magnetic head according to the present embodiment has a coil 115 in place of the coil 111 of the first embodiment. In FIG. 19 and FIG. 20 the boundaries between the coil 115 and the leads 112 and 113 are shown by dotted lines. FIG. 20 omits the write shield 120 and the second yoke portion 142 of the return path section 140. FIG. 21 omits respective portions of the coil 115 and the return path section 140 that are located on the trailing side relative to the main pole 25. In FIG. 21, the portion of the coil 115 located on the trailing side relative to the main pole 25 is indicated by a chain double-dashed line.

As shown in FIG. 20, the coil 115 passes through the first and second spaces S1 and S2 so as to surround the entire outer periphery of the main pole 25 when viewed from the medium facing surface 40, and wraps approximately two turns around the entire outer periphery of the main pole 25. In the present embodiment, the leads 112 and 113 are located on the rear side in the direction of travel of the recording medium relative to the main pole 25 and drawn from opposite ends of the coil 115 in opposite directions along the track width.

In the present embodiment, the yoke length YL, i.e., the distance from the medium facing surface 40 to one of edges of the one or more interfaces B2 between the main pole 25 and the return path section 140 closest to the medium facing surface 40 is greater than that in the first embodiment. The yoke length YL of the present embodiment falls within the range of 1.5 to 4.5 µm, for example.

The coil 115 includes a first magnetic portion 115A located in the first space S1, a second magnetic portion 115B located in the second space S2, and a nonmagnetic portion 115C and a third magnetic portion 115D located outside the first and second spaces S1 and S2. The first to third magnetic portions 115A, 115B, and 115D are each made of a magnetic conductive material. The nonmagnetic portion 115C is made of a nonmagnetic conductive material.

The first magnetic portion 115A includes a portion 115A1, and a portion 115A2 that is located farther from the medium facing surface 40 than is the portion 115A1. The second magnetic portion 115B includes a portion 115B1, and a portion 115B2 that is located farther from the medium facing surface 40 than is the portion 115B1.

The nonmagnetic portion 115C includes five portions 115C1, 115C2, 115C3, 115C4, and 115C5. The portion 115C1 is located on the front side in the direction of travel of the recording medium relative to the portions 115A1 and 115B1 and connects the portions 115A1 and 115B1 to each other. The portion 115C2 is located on the front side in the direction of travel of the recording medium relative to the portions 115A2 and 115B2 and connects the portions 115A2 and 115B2 to each other. The portion 115C3 is located at the same level as the leads 112 and 113 in the direction of travel of the recording medium and connected to the lead 112. The portion 115C4 is located at the same level as the leads 112 and 113 in the direction of travel of the recording medium and connected to the lead 113. The portion 115C5 extends to pass between the portion 115C3 and the portion 115C4. In the present embodiment, as shown in FIG. 19 to FIG. 21, the lead 113 is located farther from the medium facing surface 40 when compared with the first embodiment.

The third magnetic portion 115D includes a portion 115D1 connecting the portions 115A1 and 115C3 to each other, a portion 115D2 connecting the portions 115A2 and 115C5 to each other, a portion 115D3 connecting the portions 115B1 and 115C5 to each other, and a portion 115D4 connecting the portions 115B2 and 115C4 to each other. In FIG. 20 the boundaries between these portions are indicated by dot-and-dash lines. Further, in FIG. 20 the first and second magnetic portions 115A and 115B are hatched for the purpose of clarity.

Here, assume a region between two cross sections that are perpendicular to the direction of travel of the recording medium (the Z direction) and sandwich the first and second magnetic portions 115A and 115B of the coil 115. One of the two cross sections includes the interface between the portions 115A1 and 115C1, the interface between the portions 115A2 and 115C2, the interface between the portions 115B1 and 115C1, and the interface between the portions 115B2 and 115C2. The other of the two cross sections includes the interface between the portions 115A1 and 115D1, the interface between the portions 115A2 and 115D2, the interface between the portions 115B1 and 115D3, and the interface between the portions 115B2 and 115D4. At least in the aforementioned region, the write shield 120 and the return path section 140 may be made of the same material as the first and second magnetic portions 115A and 115B of the coil 115. More specifically, the first and second shield portions 121 and 122 of the write shield 120 and the portions 141A and 142A of the first and second yoke portions 141 and 142 of the return path section 140 may be made of the same material as the first and second magnetic portions 115A and 115B of the coil 115. In FIG. 19 and FIG. 20, the respective portions of the coil 115, the write shield 120 and the return path section 140 that may be made of the same material are indicated by the same hatching.

Further, the magnetic head according to the present embodiment has conductive layers 54 and 66 each made of a nonmagnetic conductive material and conductive layers 59, 60, 61 and 62 each made of a magnetic conductive material, in addition to the conductive layers 51, 52, 55 to 58 and 63. The coil 115 and the leads 112 and 113 are formed of the conductive layers 51, 52, 54 to 63 and 66.

As shown in FIG. 23 and FIG. 24, the conductive layers 55, 56, 59 and 60 are located in the space defined by the first portion 73A and the second portion 73B of the magnetic layer 73. The conductive layers 55 and 56 are located near the first portion 73A, spaced from each other and aligned in the track width direction (the X direction). The conductive layers 59 and 60 are located farther from the medium facing surface 40 than are the conductive layers 55 and 56, spaced from each other and aligned in the track width direction. The insulating layer 23 is disposed around the conductive layers 55, 56, 59 and 60. The top surfaces of the conductive layers 55, 56, 59 and 60, the magnetic layer 73, and the insulating layer 23 are even with each other.

As shown in FIG. 23, the conductive layers 57 and 58 are located on the conductive layers 55 and 56, respectively. As shown in FIG. 24, the conductive layers 61 and 62 are located on the conductive layers 59 and 60, respectively. The conductive layers 57 and 58 are located on opposite sides of the main pole 25 in the track width direction and are each spaced from the main pole 25. The conductive layers 61 and 62 are located farther from the medium facing surface 40 than are the conductive layers 57 and 58, lie on opposite sides of the main pole 25 in the track width direction and are each spaced from the main pole 25. The insulating layer 27 is disposed around the conductive layers 57, 58, 61 and 62. The top surfaces of the main pole 25, the conductive layers 57, 58, 61 and 62, the magnetic layers 74 and 75, the nonmagnetic layer 24 and the insulating layer 27 are even with each other.

In the present embodiment, as shown in FIG. 24, the conductive layer 52 is located farther from the medium facing surface 40 as compared with the first embodiment. The conductive layer 54 is shaped to be long and narrow, and lies on the insulating layer 9. The conductive layer 54 includes a first portion 54A (see FIG. 24) that is located farther from the medium facing surface 40 than is the conductive layer 51, a second portion 54B (see FIG. 23) that is located closer to the medium facing surface 40 than is the conductive layer 52, and a third portion 54C coupling the first portion 54A and the second portion 54B to each other. In FIG. 23 and FIG. 24 the boundaries between these portions are shown by broken lines. The third portion 54C passes between the conductive layer 51 and the conductive layer 52. The insulating layer 17 is disposed around the conductive layer 54.

In the present embodiment, the insulating layer 18 lies on the conductive layers 51, 52 and 54 and the insulating layer 17. The insulating layer 18 has the first opening for exposing the top surface of the conductive layer 51 and the second opening for exposing the top surface of the conductive layer 52. Additionally, the insulating layer 18 has a fifth opening (see FIG. 24) for exposing a portion of the top surface of the first portion 54A of the conductive layer 54 adjacent to an edge thereof opposite from the third portion 54C, and a sixth opening (see FIG. 23) for exposing a portion of the top surface of the second portion 54B of the conductive layer 54 adjacent to an edge thereof opposite from the third portion 54C. The conductive layer 55 lies on the conductive layer 51 at the position of the first opening of the insulating layer 18. The conductive layer 56 lies on the second portion 54B of the conductive layer 54 at the position of the sixth opening of the insulating layer 18. The conductive layer 59 lies on the first portion 54A of the conductive layer 54 at the position of the fifth opening of the insulating layer 18. The conductive layer 60 lies on the conductive layer 52 at the position of the second opening of the insulating layer 18.

As shown in FIG. 22 and FIG. 24, the conductive layers 63 and 66 are located in the space defined by the first portion 76A and the second portion 76B of the magnetic layer 76. The position of the conductive layer 63 is the same as in the first embodiment. The conductive layer 66 is located farther from the medium facing surface 40 than is the conductive layer 63, and lies on the insulating film 31 and the conductive layers 61 and 62. The conductive layer 66 is shaped to be elongated in the X direction. A portion of the conductive layer 66 adjacent to its one end in the longitudinal direction is in contact with the conductive layer 61, and a portion of the conductive layer 66 adjacent to its other end in the longitudinal direction is in contact with the conductive layer 62. The nonmagnetic layer 26 and the insulating film 31 are interposed between the conductive layer 66 and the main pole 25. The insulating film 31, the insulating layer 32 and the protective layer 36 are disposed around the conductive layers 63 and 66.

As shown in FIG. 22 to FIG. 24, the conductive layer 51 forms the portion 115C3 of the nonmagnetic portion 115C and the lead 112. The conductive layer 52 forms the portion 115C4 of the nonmagnetic portion 115C and the lead 113. The conductive layer 54 forms the portion 115C5 of the nonmagnetic portion 115C.

The conductive layer 55 forms the portion 115D1 of the third magnetic portion 115D. The conductive layer 56 forms the portion 115D3 of the third magnetic portion 115D. The conductive layer 59 forms the portion 115D2 of the third magnetic portion 115D. The conductive layer 60 forms the portion 115D4 of the third magnetic portion 115D.

The conductive layer 57 forms the portion 115A1 of the first magnetic portion 115A. The conductive layer 58 forms the portion 115B1 of the second magnetic portion 115B. The conductive layer 61 forms the portion 115A2 of the first magnetic portion 115A. The conductive layer 62 forms the portion 115B2 of the second magnetic portion 115B.

The conductive layer 63 forms the portion 115C1 of the nonmagnetic portion 115C. The conductive layer 66 forms the portion 115C2 of the nonmagnetic portion 115C. In order to prevent a fracture during energization, the conductive layer 63 connecting the conductive layers 57 and 58 to each other and the conductive layer 66 connecting the conductive layers 61 and 62 to each other each preferably have a somewhat great thickness such as 0.35 µm or greater.

In the present embodiment, the number of turns of the coil 115 is approximately two, being greater than the number of turns of the coil 111 of the first embodiment. The present embodiment thus makes it possible to increase the magnetomotive force produced by the coil 115 to allow the main pole 25 to produce a write magnetic field of greater magnitude.

The shapes of the first to fourth shield portions 121, 122, 123 and 124 of the present embodiment may be the same as those of the second embodiment.

Now, the method of manufacturing the magnetic head according to the present embodiment will be described briefly. The present embodiment differs from the first embodiment in that the coil 115 is formed in place of the coil 111. The step of forming the coil 115 includes the step of forming the conductive layers 57, 58, 61 and 62, which form the first and second magnetic portions 115A and 115B, using a magnetic conductive material. The step of forming the coil 115 further includes the step of forming the nonmagnetic portion 115C (the conductive layers 51, 52, 54, 63 and 66) and the step of forming the third magnetic portion 115D (the conductive layers 55, 56, 59 and 60).

In the present embodiment, the magnetic layers 74 and 75 are formed simultaneously with the conductive layers 57, 58, 61 and 62 using the same material as the conductive layers 57, 58, 61 and 62. More specifically, in the present embodiment, the step of forming the first and second magnetic portions 115A and 115B of the coil 115, the step of forming at least part of the write shield 120 (at least the first and second shield portions 121 and 122), and the step of forming at least part of the return path section 140 (at least the portions 141A and 142A of the first and second yoke portions 141 and 142) are performed simultaneously.

Further, in the present embodiment, the magnetic layer 73 is formed simultaneously with the conductive layers 55, 56, 59 and 60 using the same material as the conductive layers 55, 56, 59 and 60. More specifically, in the present embodiment, the step of forming the third magnetic portion 115D of the coil 115, the step of forming at least part of the write shield 120 (at least the fourth shield portion 124), and the step of forming at least part of the return path section 140 (at least the portion 141C of the first yoke portion 141, the portion 142C of the second yoke portion 142 and the second coupling portion 146) are performed simultaneously.

The remainder of configuration, function and effects of the present embodiment are similar to those of the first or second embodiment.

Fifth Embodiment

Figure 25:
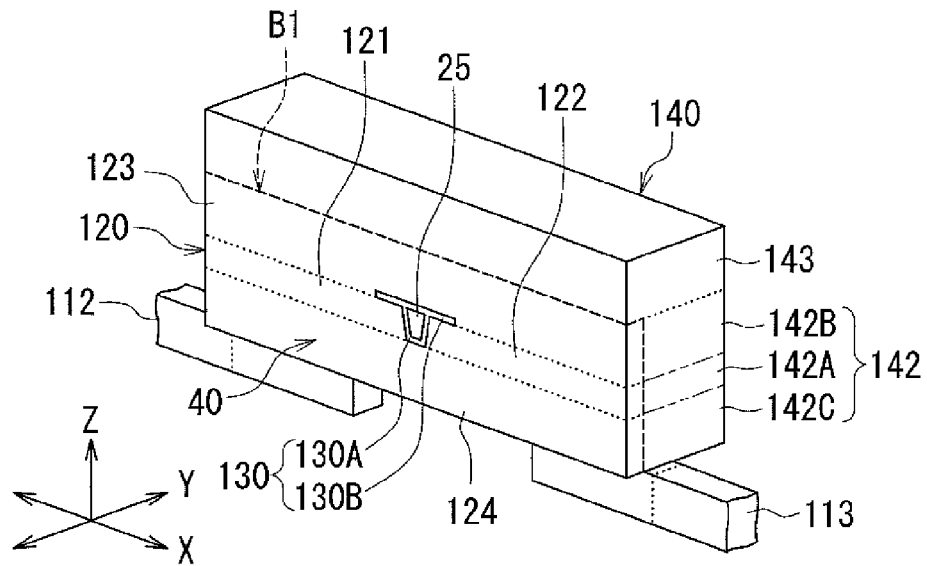
FIG. 25 is a perspective view showing the main part of a magnetic head according to a fifth embodiment of the invention.
Figure 26:
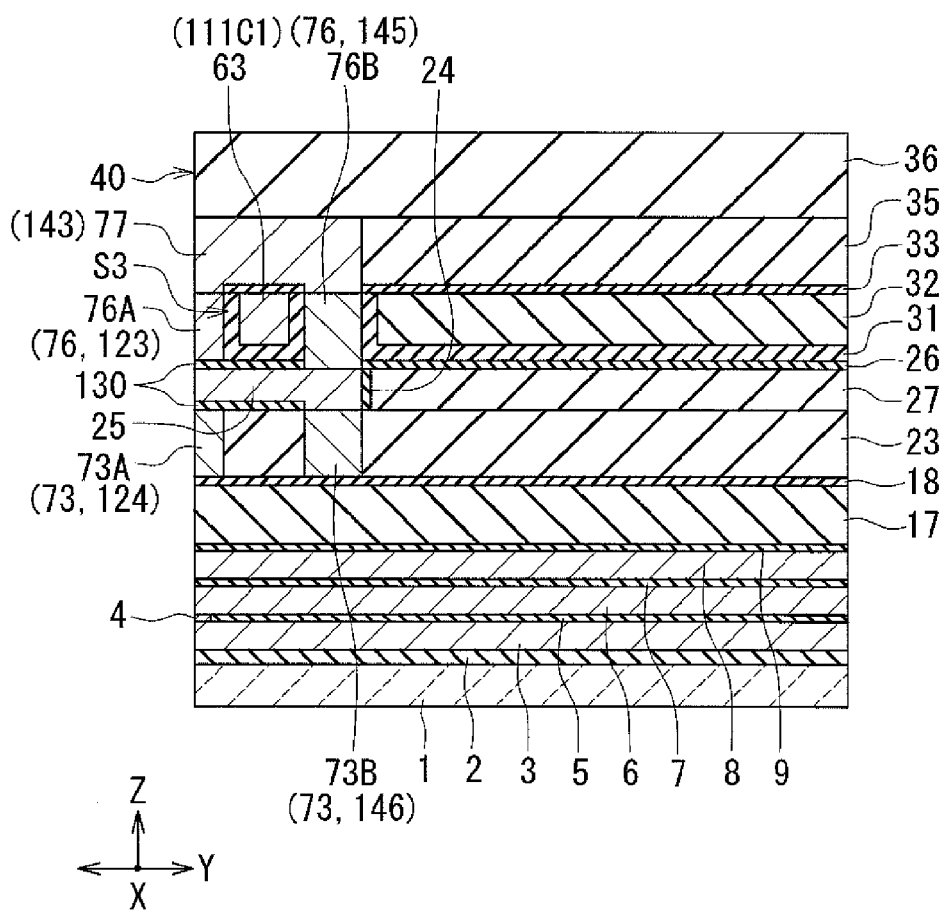
FIG. 26 is a cross-sectional view showing the configuration of the magnetic head according to the fifth embodiment of the invention.
Figure 27:
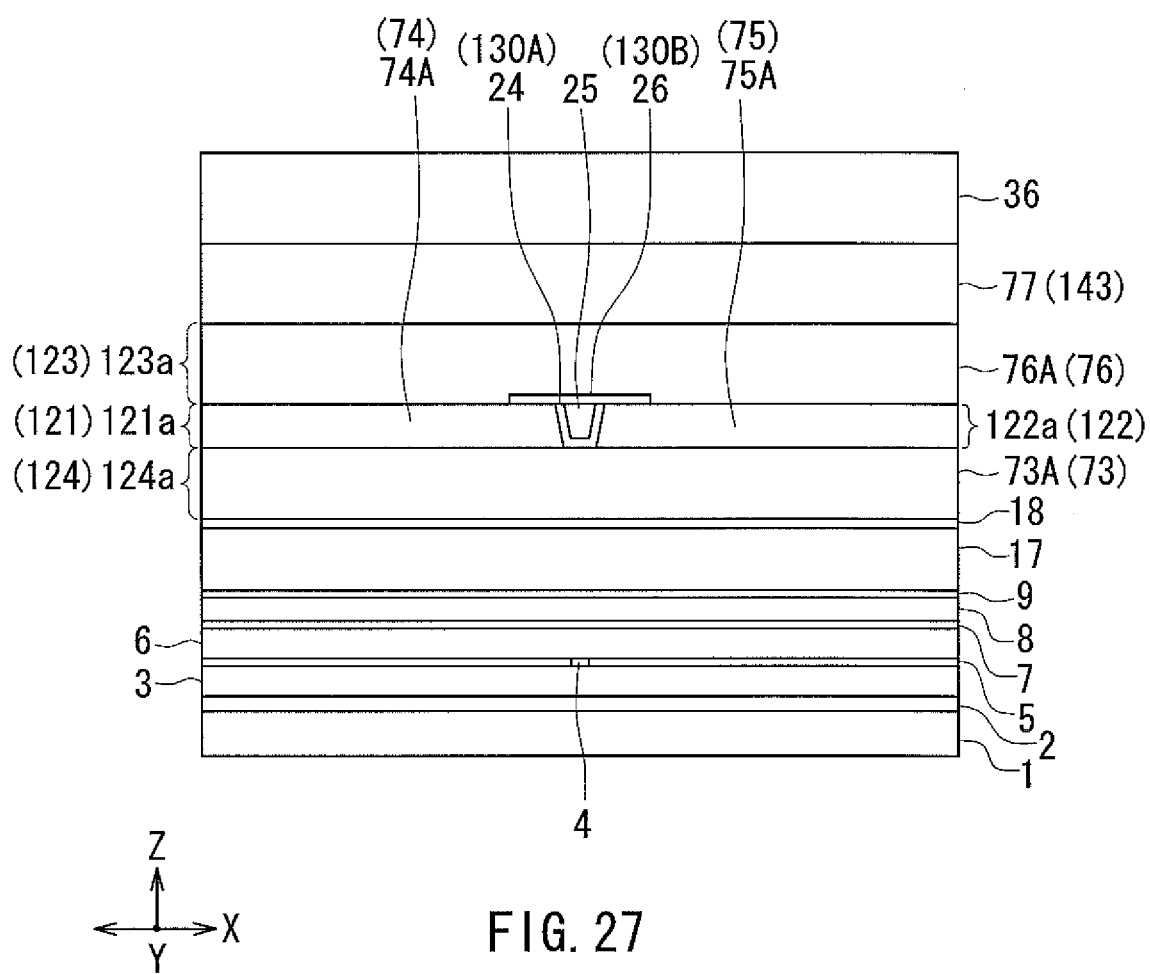
FIG. 27 is a front view showing the medium facing surface of the magnetic head according to the fifth embodiment of the invention.

A fifth embodiment of the present invention will now be described with reference to FIG. 25 to FIG. 27. FIG. 25 is a perspective view showing the main part of the magnetic head. FIG. 26 is a cross-sectional view showing the configuration of the magnetic head. FIG. 27 is a front view showing the medium facing surface of the magnetic head.

The magnetic head according to the present embodiment differs from the magnetic head according to the first embodiment in the following ways. In the magnetic head according to the present embodiment, the return path section 140 includes a third yoke portion 143 in addition to the first and second yoke portions 141 and 142 and the first and second coupling portions 145 and 146. The third yoke portion 143 is located on the front side in the direction of travel of the recording medium relative to the main pole 25. In FIG. 25 the boundary between the second yoke portion 142 and the third yoke portion 143 is shown by a dotted line.

As shown in FIG. 25 and FIG. 26, the third yoke portion 143 is connected to the third shield portion 123 so that a third space S3 is defined by the main pole 25, the gap part 130, the third shield portion 123 of the write shield 120, and the third yoke portion 143. In the present embodiment, the third yoke portion 143 is also connected to the portion 141B of the first yoke portion 141 and the portion 142B of the second yoke portion 142 shown in FIG. 1 and FIG. 2. The first coupling portion 145 couples the portion 141B of the first yoke portion 141, the portion 142B of the second yoke portion 142, and the third yoke portion 143 to each other.

The coil 111 passes through the third space S3 in addition to the first and second spaces S1 and S2 (see FIG. 3). In the present embodiment, in particular, the portion 111C1 of the nonmagnetic portion 111C of the coil 111 passes through the third space S3. In other words, the coil 111 includes the portion 111C1 passing through the third space S3.

Further, the magnetic head according to the present embodiment has an insulating layer 33 lying on the conductive layer 63, the insulating film 31 and the insulating layer 32, a magnetic layer 77 made of a magnetic material and lying on the magnetic layer 76 and the insulating layer 33, and an insulating layer 35 lying on the insulating layer 33 and surrounding the magnetic layer 77. The magnetic layer 77 forms the third yoke portion 143. The top surfaces of the magnetic layer 77 and the insulating layer 35 are even with each other. The protective layer 36 lies on the magnetic layer 77 and the insulating layer 35. The insulating layers 33 and 35 are made of alumina, for example.

According to the present embodiment, the inclusion of the third yoke portion 143 in the return path section 140 provides higher utilization efficiency of the magnetic field produced by the coil 111 when compared with the first embodiment. This effect will be described later in more detail with reference to the results of simulations.

The shapes of the first to fourth shield portions 121, 122, 123 and 124 of the present embodiment may be the same as those of the second embodiment. The remainder of configuration, function and effects of the present embodiment are similar to those of the first or second embodiment.

Sixth Embodiment

Figure 28:
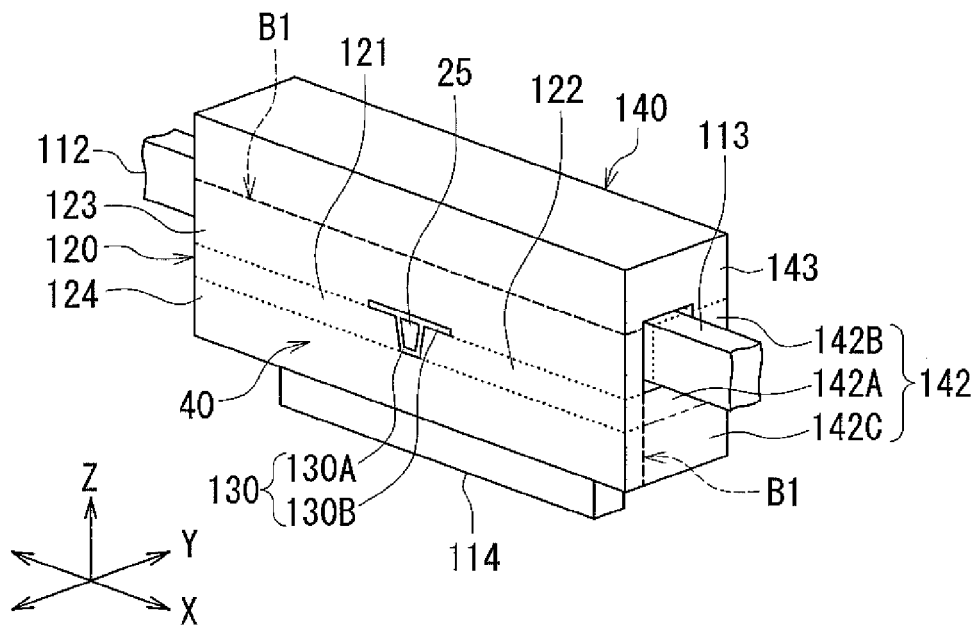
FIG. 28 is a perspective view showing the main part of a magnetic head according to a sixth embodiment of the invention.
Figure 29:
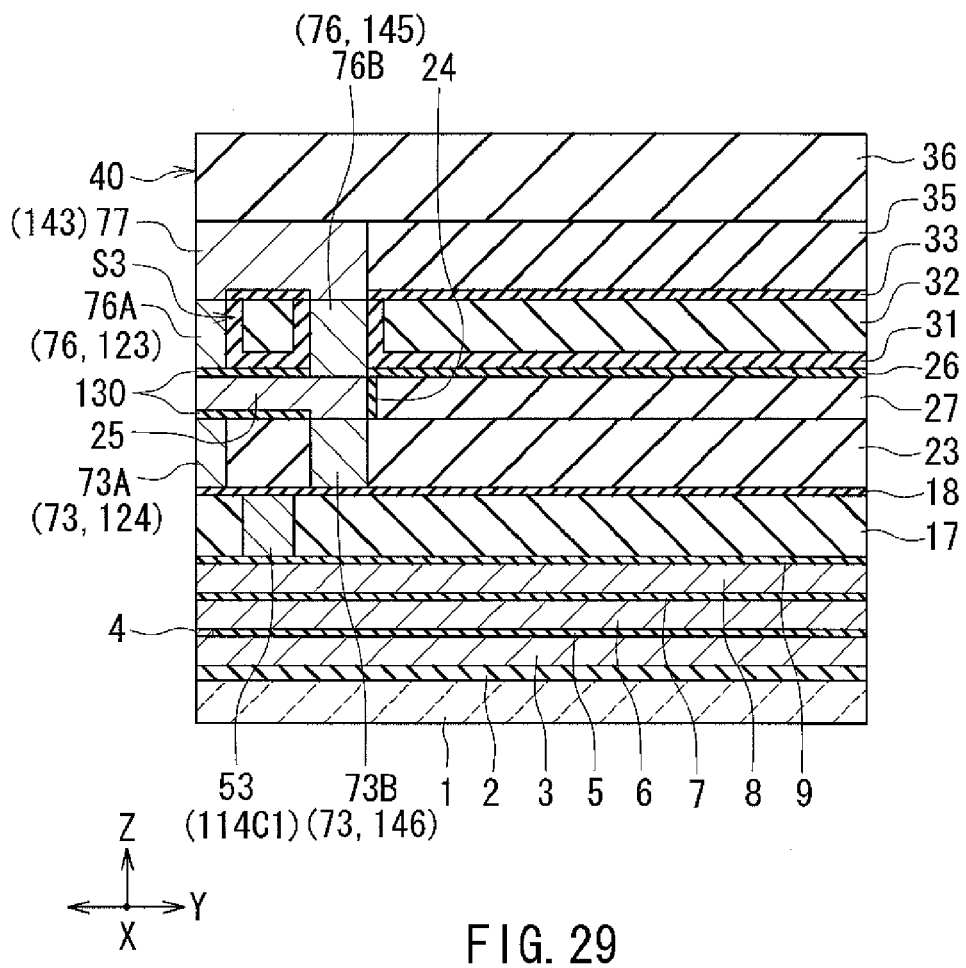
FIG. 29 is a cross-sectional view showing the configuration of the magnetic head according to the sixth embodiment of the invention.

A sixth embodiment of the present invention will now be described with reference to FIG. 28 and FIG. 29. FIG. 28 is a perspective view showing the main part of the magnetic head. FIG. 29 is a cross-sectional view showing the configuration of the magnetic head.

The magnetic head according to the present embodiment differs from the magnetic head according to the third embodiment in the following ways. In the magnetic head according to the present embodiment, the return path section 140 includes the third yoke portion 143 described in the fifth embodiment section, in addition to the first and second yoke portions 141 and 142 and the first and second coupling portions 145 and 146. In FIG. 28 the boundary between the second yoke portion 142 and the third yoke portion 143 is shown by a dotted line.

Further, the magnetic head according to the present embodiment has the insulating layers 33 and 35 and the magnetic layer 77 described in the fifth embodiment section. In the present embodiment, the insulating layer 33 lies on the conductive layers 64 and 65 (see FIG. 18), the insulating film 31 and the insulating layer 32, and is interposed between the magnetic layer 77 and each of the conductive layers 64 and 65.

The remainder of configuration, function and effects of the present embodiment are similar to those of the third or fifth embodiment.

Seventh Embodiment

Figure 30:
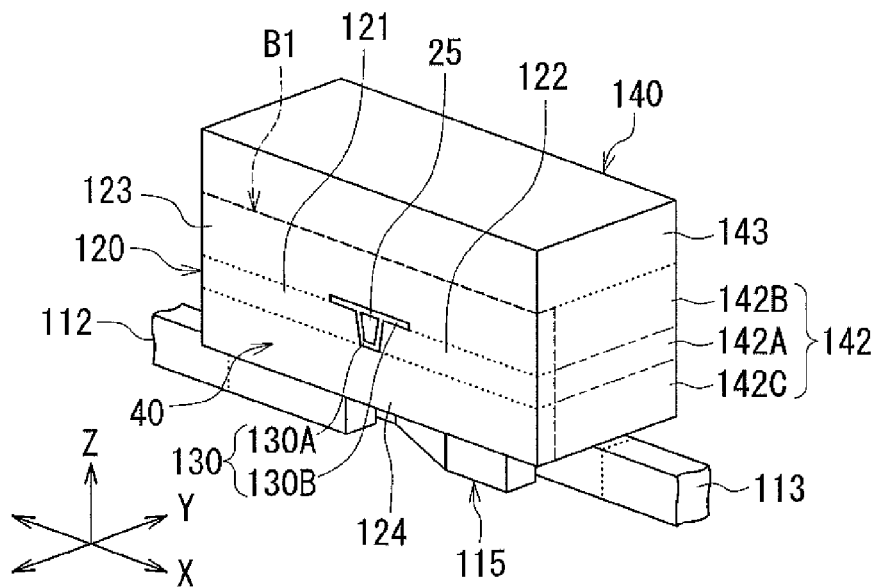
FIG. 30 is a perspective view showing the main part of a magnetic head according to a seventh embodiment of the invention.
Figure 31:
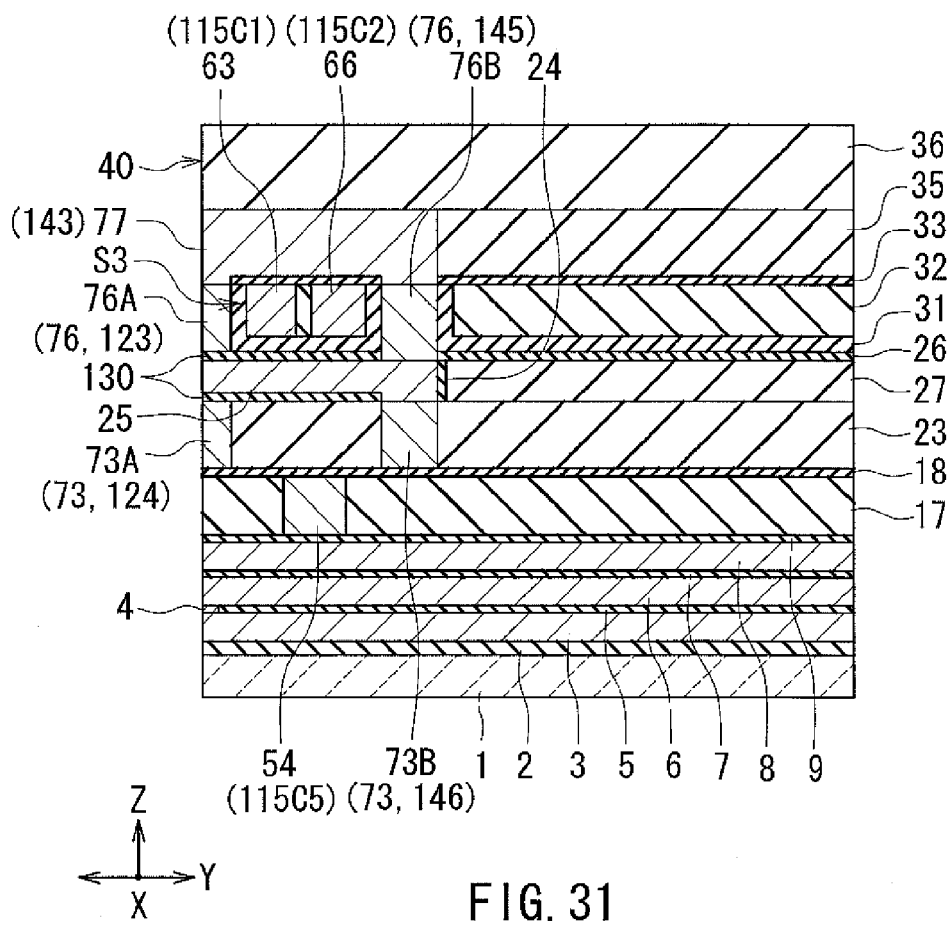
FIG. 31 is a cross-sectional view showing the configuration of the magnetic head according to the seventh embodiment of the invention.

A seventh embodiment of the present invention will now be described with reference to FIG. 30 and FIG. 31. FIG. 30 is a perspective view showing the main part of the magnetic head. FIG. 31 is a cross-sectional view showing the configuration of the magnetic head.

The magnetic head according to the present embodiment differs from the magnetic head according to the fourth embodiment in the following ways. In the magnetic head according to the present embodiment, the return path section 140 includes the third yoke portion 143 described in the fifth embodiment section, in addition to the first and second yoke portions 141 and 142 and the first and second coupling portions 145 and 146. In FIG. 30 the boundary between the second yoke portion 142 and the third yoke portion 143 is shown by a dotted line.

The coil 115 passes through the third space 53 in addition to the first and second spaces S1 and S2 (see FIG. 21). In the present embodiment, in particular, the portions 115C1 and 115C2 of the nonmagnetic portion 115C of the coil 115 pass through the third space S3. In other words, the coil 115 includes the portions 115C1 and 115C2 passing through the third space S3.

Further, the magnetic head according to the present embodiment has the insulating layers 33 and 35 and the magnetic layer 77 described in the fifth embodiment section. In the present embodiment, the insulating layer 33 lies on the conductive layers 63 and 66, the insulating film 31 and the insulating layer 32.

The remainder of configuration, function and effects of the present embodiment are similar to those of the fourth or fifth embodiment.

Eighth Embodiment

Figure 32:
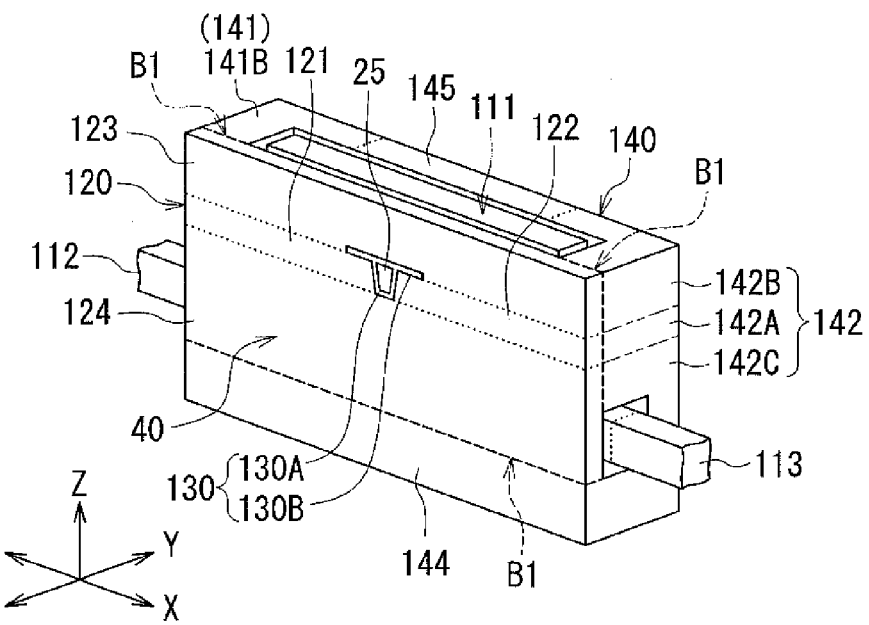
FIG. 32 is a perspective view showing the main part of a magnetic head according to an eighth embodiment of the invention.
Figure 33:
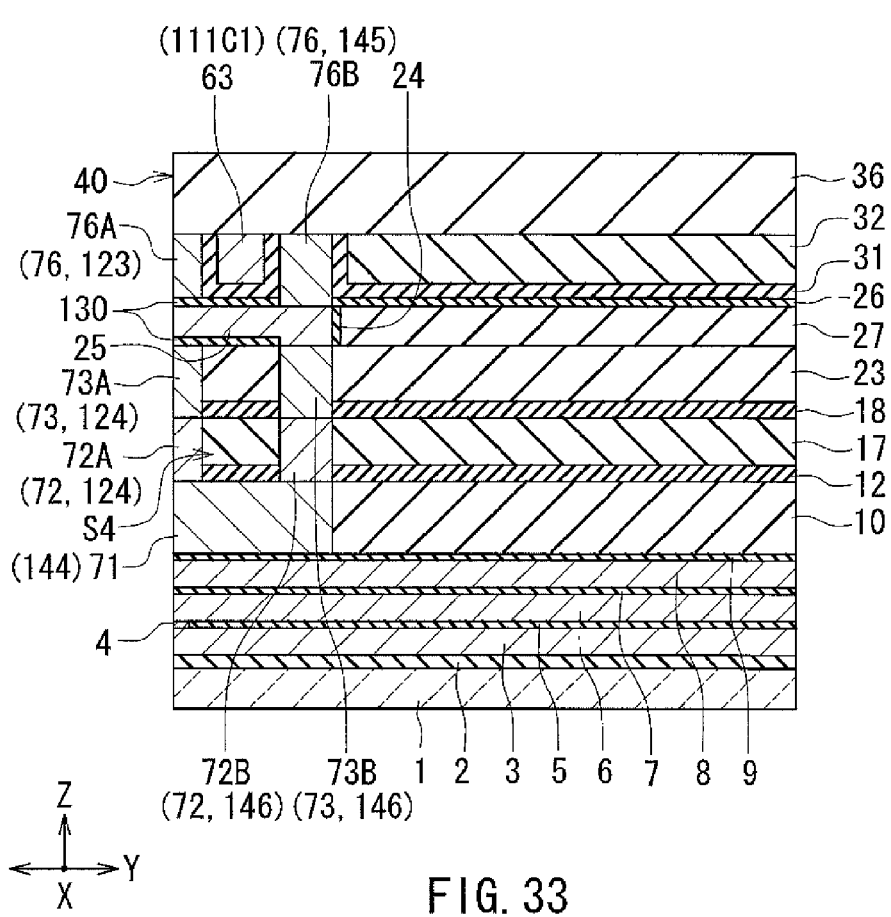
FIG. 33 is a cross-sectional view showing the configuration of the magnetic head according to the eighth embodiment of the invention.
Figure 34:
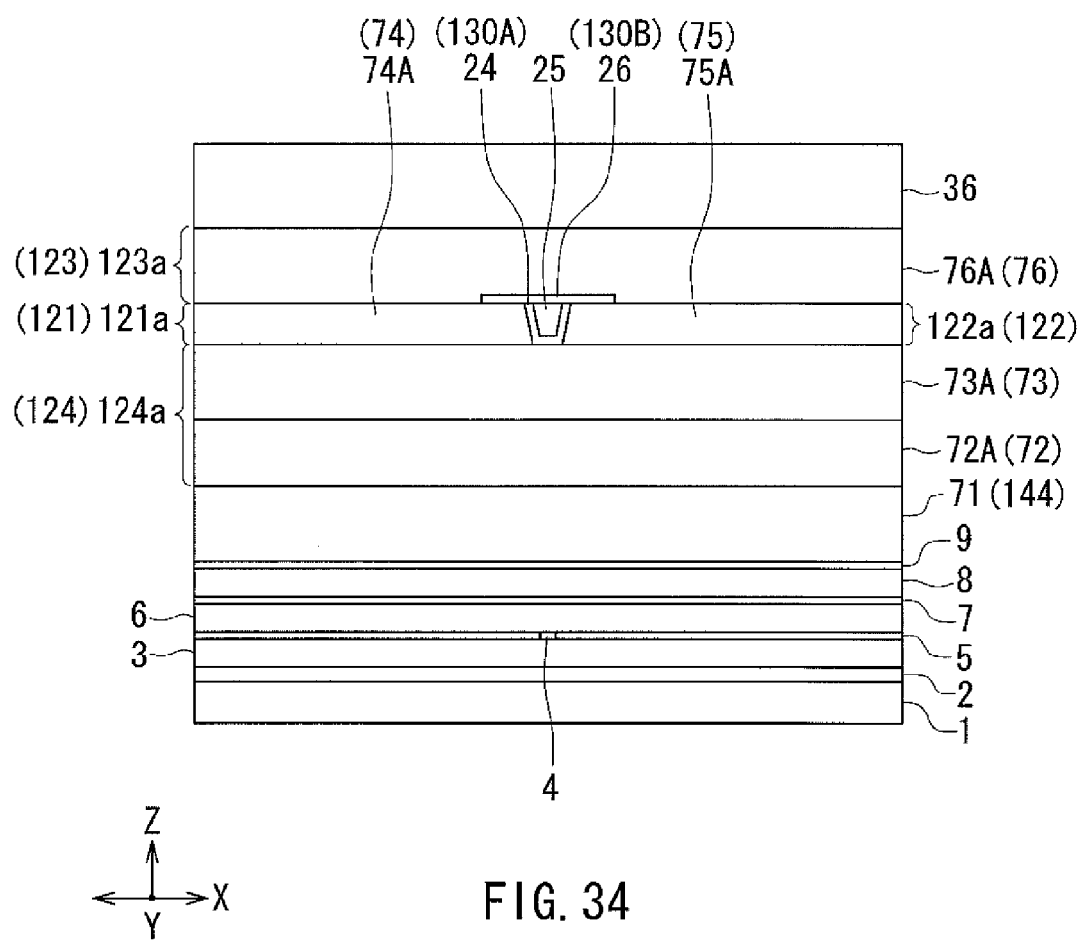
FIG. 34 is a front view showing the medium facing surface of the magnetic head according to the eighth embodiment of the invention.

An eighth embodiment of the present invention will now be described with reference to FIG. 32 to FIG. 34. FIG. 32 is a perspective view showing the main part of the magnetic head. FIG. 33 is a cross-sectional view showing the configuration of the magnetic head. FIG. 34 is a front view showing the medium facing surface of the magnetic head.

The magnetic head according to the present embodiment differs from the magnetic head according to the first embodiment in the following ways. In the magnetic head according to the present embodiment, the return path section 140 includes a fourth yoke portion 144 in addition to the first and second yoke portions 141 and 142 and the first and second coupling portions 145 and 146. The fourth yoke portion 144 is located on the rear side in the direction of travel of the recording medium relative to the main pole 25.

As shown in FIG. 32 and FIG. 33, the fourth yoke portion 144 is connected to the fourth shield portion 124 so that a fourth space S4 is defined by the main pole 25, the gap part 130, the fourth shield portion 124 of the write shield 120, and the fourth yoke portion 144 of the return path section 140. In the present embodiment, the fourth yoke portion 144 is also connected to the portion 141C of the first yoke portion 141 and the portion 142C of the second yoke portion 142 shown in FIG. 2. The second coupling portion 146 couples the portion 141C of the first yoke portion 141, the portion 142C of the second yoke portion 142, and the fourth yoke portion 144 to each other.

As shown in FIG. 32, the portion 142C of the second yoke portion 142 of the present embodiment is greater in maximum dimension in the Z direction when compared with the example of the first embodiment shown in FIG. 1 and FIG. 2. Although not illustrated, the portion 141C of the first yoke portion 141 of the present embodiment is greater in maximum dimension in the Z direction when compared with the example of the first embodiment shown in FIG. 2, as with the portion 142C of the second yoke portion 142. Further, as shown in FIG. 32 and FIG. 33, the fourth shield portion 124 of the present embodiment is greater in dimension in the Z direction when compared with the example of the first embodiment shown in FIG. 1 and FIG. 4. As shown in FIG. 33, the second coupling portion 146 of the present embodiment is also greater in dimension in the Z direction when compared with the example of the first embodiment shown in FIG. 4.

The magnetic head according to the present embodiment has a magnetic layer 71 made of a magnetic material and lying on the insulating layer 9 in the vicinity of the medium facing surface 40, and an insulating layer 10 lying on the insulating layer 9 and surrounding the magnetic layer 71. The magnetic layer 71 forms the fourth yoke portion 144. The insulating layer 10 is made of alumina, for example.

The magnetic head according to the present embodiment further has a magnetic layer 72 made of a magnetic material and lying on the magnetic layer 71. The magnetic layer 72 includes a first portion 72A located between the medium facing surface 40 and the conductive layers 51 and 52 (see FIG. 6), and a second portion 72B located such that the conductive layers 51 and 52 are interposed between the first portion 72A and the second portion 72B. The first and second portions 72A and 72B are both shaped to be elongated in the X direction.

The magnetic head according to the present embodiment further has an insulating layer 12. The insulating layer 12 lies on the magnetic layer 71 and the insulating layer 10, surrounds the magnetic layer 72 and is interposed between the magnetic layer 71 and each of the conductive layers 51 and 52. In the present embodiment, the insulating layer 17 lies on the insulating layer 12 and surrounds the magnetic layer 72 and the conductive layers 51 and 52. The insulating layer 12 is made of alumina, for example.

In the present embodiment, the insulating layer 18 has a seventh opening and an eighth opening in addition to the first and second openings described in the first embodiment section. The seventh opening exposes the top surface of the first portion 72A of the magnetic layer 72 at a position near the medium facing surface 40. The eighth opening exposes the top surface of the second portion 72B of the magnetic layer 72 at a position farther from the medium facing surface 40 than the positions of the conductive layers 51 and 52. The first portion 73A of the magnetic layer 73 lies on the first portion 72A of the magnetic layer 72 at the position of the seventh opening of the insulating layer 18. The second portion 73B of the magnetic layer 73 lies on the second portion 72B of the magnetic layer 72 and the insulating layer 18, and is in contact with the second portion 72B at the position of the eighth opening of the insulating layer 18.

The fourth shield portion 124 is formed of the first portion 72A and a part of the first portion 73A. The portion 141C (see FIG. 2) of the first yoke portion 141 is formed of a part of each of the second portions 72B and 73B. The portion 142C of the second yoke portion 142 is formed of another part of each of the second portions 72B and 73B. The second coupling portion 146 is formed of the remaining part of each of the second portions 72B and 73B.

According to the present embodiment, the inclusion of the fourth yoke portion 144 in the return path section 140 provides higher utilization efficiency of the magnetic field produced by the coil 111 when compared with the first embodiment. This effect will be described later in more detail with reference to the results of simulations.

The shapes of the first to fourth shield portions 121, 122, 123 and 124 of the present embodiment may be the same as those of the second embodiment. The remainder of configuration, function and effects of the present embodiment are similar to those of the first or second embodiment.

Ninth Embodiment

Figure 35:
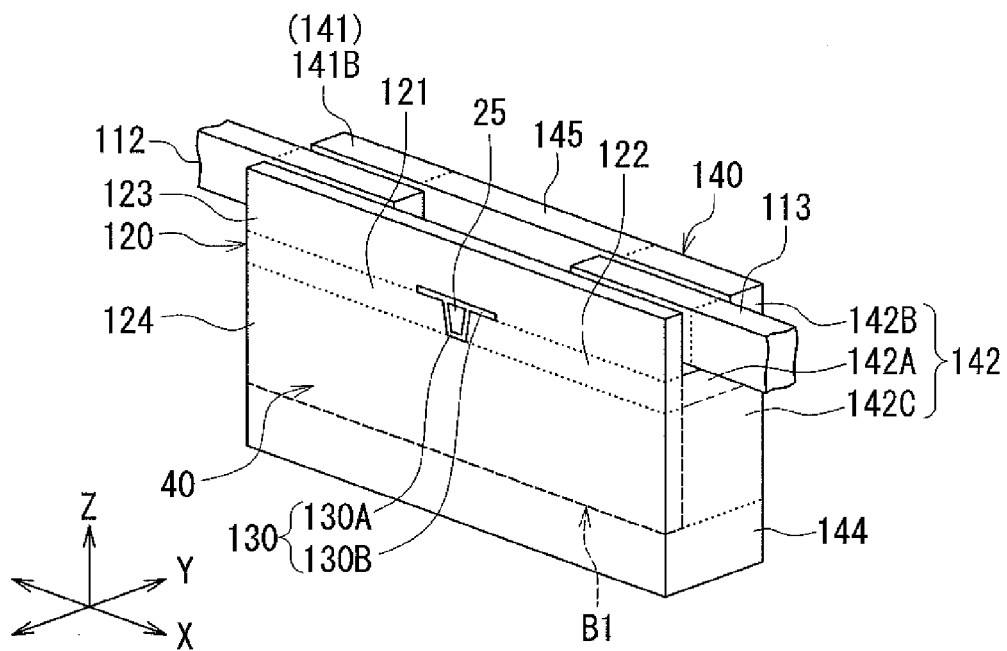
FIG. 35 is a perspective view showing the main part of a magnetic head according to a ninth embodiment of the invention.
Figure 36:
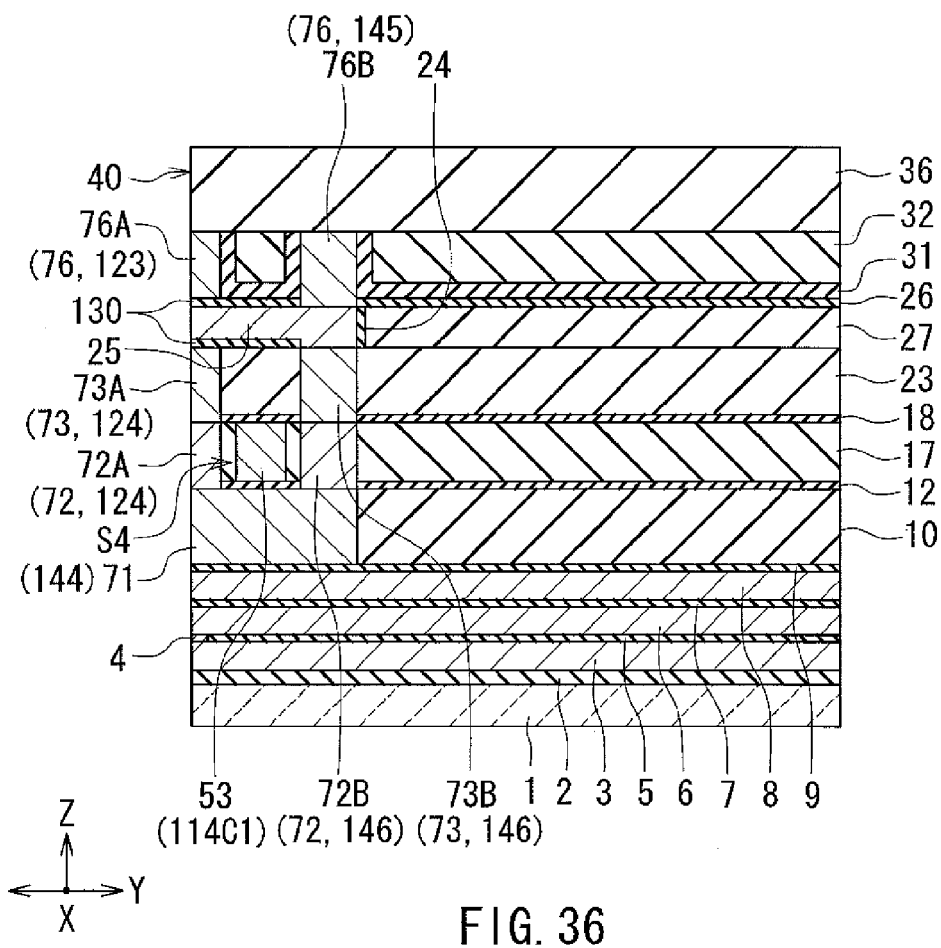
FIG. 36 is a cross-sectional view showing the configuration of the magnetic head according to the ninth embodiment of the invention.

A ninth embodiment of the present invention will now be described with reference to FIG. 35 and FIG. 36. FIG. 35 is a perspective view showing the main part of the magnetic head. FIG. 36 is a cross-sectional view showing the configuration of the magnetic head.

The magnetic head according to the present embodiment differs from the magnetic head according to the third embodiment in the following ways. In the magnetic head according to the present embodiment, the return path section 140 includes the fourth yoke portion 144 described in the eighth embodiment section, in addition to the first and second yoke portions 141 and 142 and the first and second coupling portions 145 and 146. In FIG. 35 the boundary between the second yoke portion 142 and the fourth yoke portion 144 is shown by a dotted line. As shown in FIG. 35, the portion 142C of the second yoke portion 142 of the present embodiment is greater in dimension in the Z direction when compared with the example of the third embodiment shown in FIG. 14 and FIG. 15. Further, although not illustrated, the portion 141C of the first yoke portion 141 of the present embodiment is greater in dimension in the Z direction when compared with the example of the third embodiment shown in FIG. 15, as with the portion 142C of the second yoke portion 142.

The shapes of the fourth shield portion 124 of the write shield 120 and the second coupling portion 146 of the return path section 140 of the present embodiment are the same as those of the eighth embodiment. The coil 114 passes through the fourth space S4 described in the eighth embodiment section, in addition to the first and second spaces S1 and S2 (see FIG. 16). In the present embodiment, in particular, the portion 114C1 of the nonmagnetic portion 114C of the coil 114 passes through the fourth space S4. In other words, the coil 114 includes the portion 114C1 passing through the fourth space S4.

Further, the magnetic head according to the present embodiment includes the magnetic layers 71 and 72 and the insulating layers 10 and 12 described in the eighth embodiment section. In the present embodiment, the conductive layer 53 lies on the insulating layer 12. Further, the second portion 72B of the magnetic layer 72 is connected to portions of the first portion 72A adjacent to opposite ends thereof in the X direction so that a space is defined by the first portion 72A and the second portion 72B. The conductive layer 53 is disposed in the space.

Further, in the present embodiment, the insulating layer 18 has a ninth opening in place of the seventh and eighth openings of the eighth embodiment. The ninth opening has the same planar shape (shape in a plan view) as that of the magnetic layer 72, and exposes the entire top surface of the magnetic layer 72. The magnetic layer 73 is in contact with the magnetic layer 72 through the ninth opening of the insulating layer 18.

The remainder of configuration, function and effects of the present embodiment are similar to those of the third or eighth embodiment.

Tenth Embodiment

Figure 37:
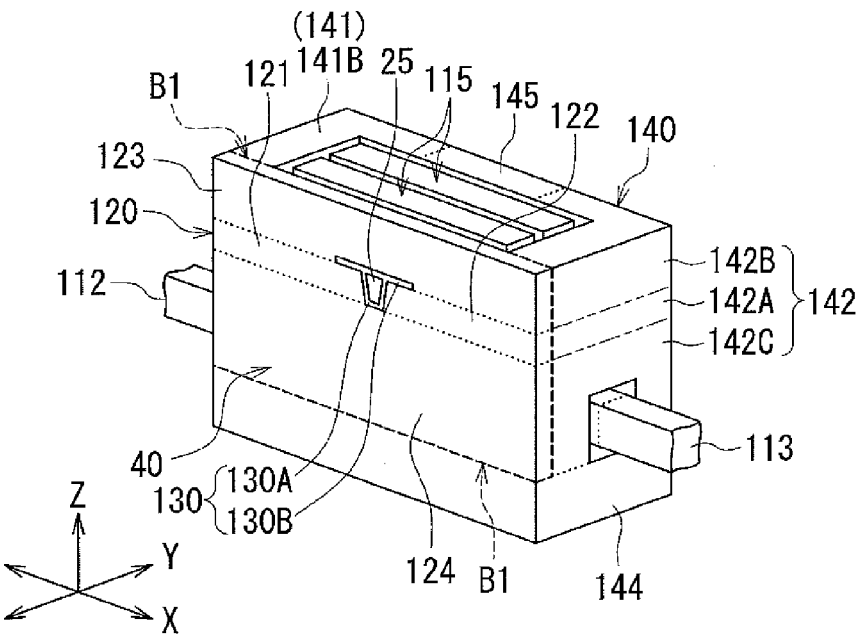
FIG. 37 is a perspective view showing the main part of a magnetic head according to a tenth embodiment of the invention.
Figure 38:
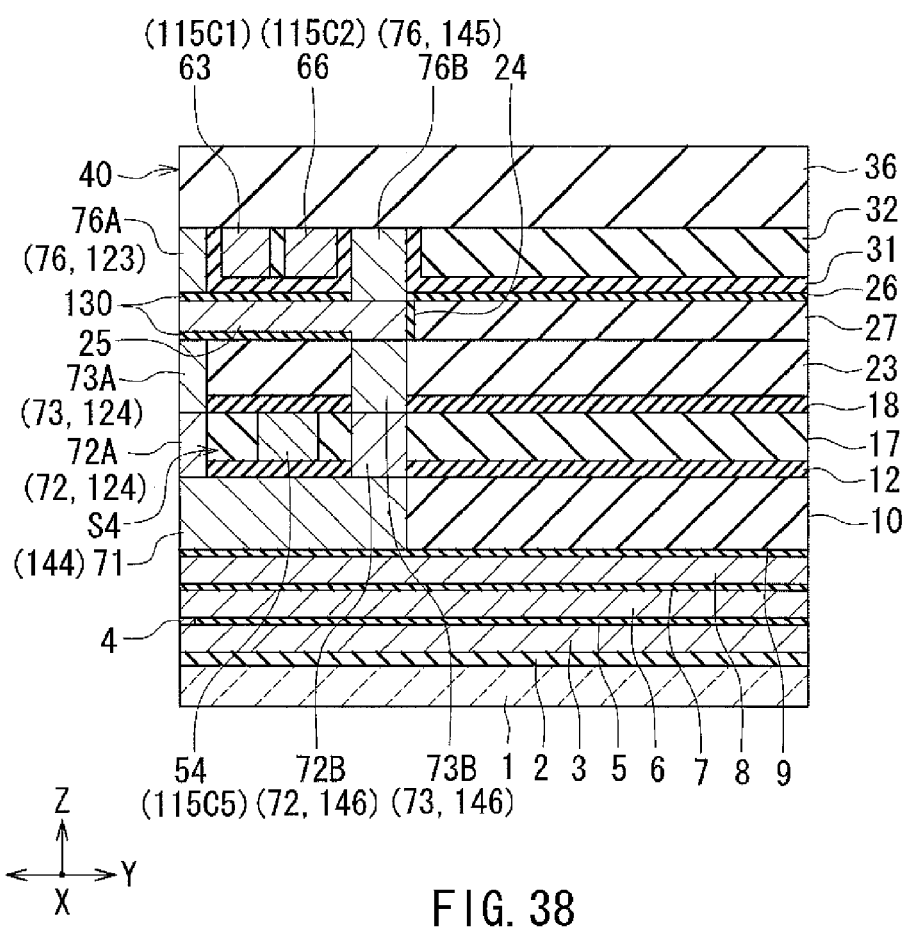
FIG. 38 is a cross-sectional view showing the configuration of the magnetic head according to the tenth embodiment of the invention.

A tenth embodiment of the present invention will now be described with reference to FIG. 37 and FIG. 38. FIG. 37 is a perspective view showing the main part of the magnetic head. FIG. 38 is a cross-sectional view showing the configuration of the magnetic head.

The magnetic head according to the present embodiment differs from the magnetic head according to the fourth embodiment in the following ways. In the magnetic head according to the present embodiment, the return path section 140 includes the fourth yoke portion 144 described in the eighth embodiment section, in addition to the first and second yoke portions 141 and 142 and the first and second coupling portions 145 and 146. In FIG. 37 the boundary between the second yoke portion 142 and the fourth yoke portion 144 is shown by a dotted line. As shown in FIG. 37, the portion 142C of the second yoke portion 142 of the present embodiment is greater in maximum dimension in the Z direction when compared with the example of the fourth embodiment shown in FIG. 19. Further, although not illustrated, the portion 141C of the first yoke portion 141 of the present embodiment is greater in maximum dimension in the Z direction when compared with the example of the fourth embodiment shown in FIG. 20, as with the portion 142C of the second yoke portion 142.

The shapes of the fourth shield portion 124 of the write shield 120 and the second coupling portion 146 of the return path section 140 of the present embodiment are the same as those of the eighth embodiment. The coil 115 passes through the fourth space S4 described in the eighth embodiment section, in addition to the first and second spaces S1 and S2 (see FIG. 21). In the present embodiment, in particular, the portion 115C5 of the nonmagnetic portion 115C of the coil 115 passes through the fourth space S4. In other words, the coil 115 includes the portion 115C5 passing through the fourth space S4.

Further, the magnetic head according to the present embodiment includes the magnetic layers 71 and 72 and the insulating layers 10 and 12 described in the eighth embodiment section. In the present embodiment, the conductive layers 51 and 52 (see FIG. 23 and FIG. 24) and the conductive layer 54 are located on the insulating layer 12. Further, the magnetic layer 72 has a cavity for accommodating the conductive layer 54. The cavity is surrounded by the first portion 72A and the second portion 72B of the magnetic layer 72. The cavity also accommodates part of each of the conductive layers 51 and 52. The second portion 72B has two notches for drawing the conductive layers 51 and 52 from the cavity of the magnetic layer 72 to outside the magnetic layer 72.

The remainder of configuration, function and effects of the present embodiment are similar to those of the fourth or eighth embodiment.

Eleventh Embodiment

Figure 39:
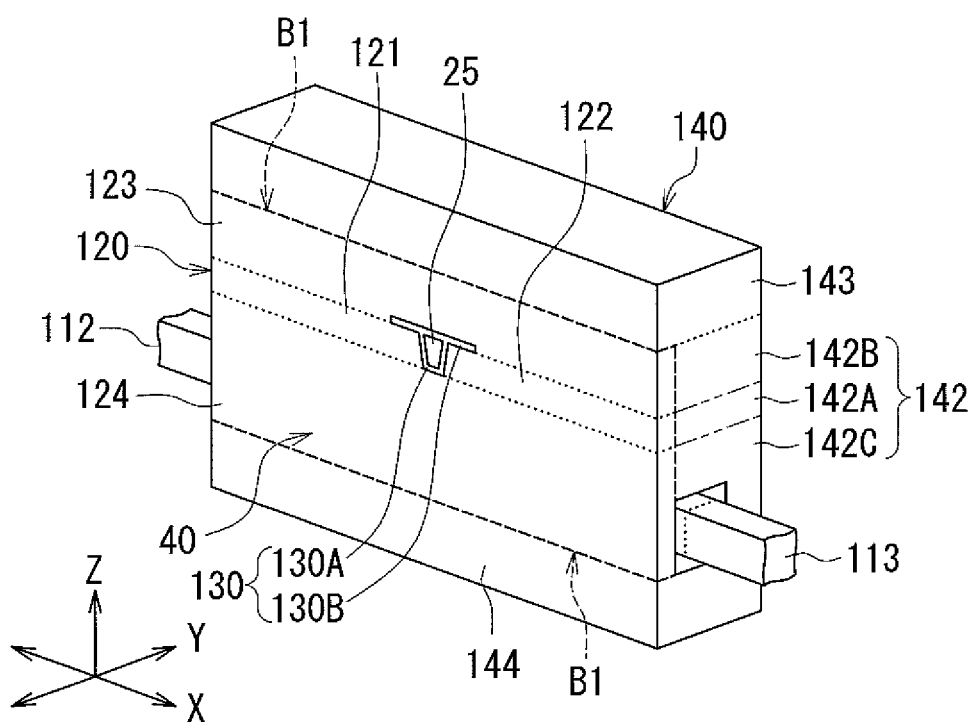
FIG. 39 is a perspective view showing the main part of a magnetic head according to an eleventh embodiment of the invention.
Figure 40:
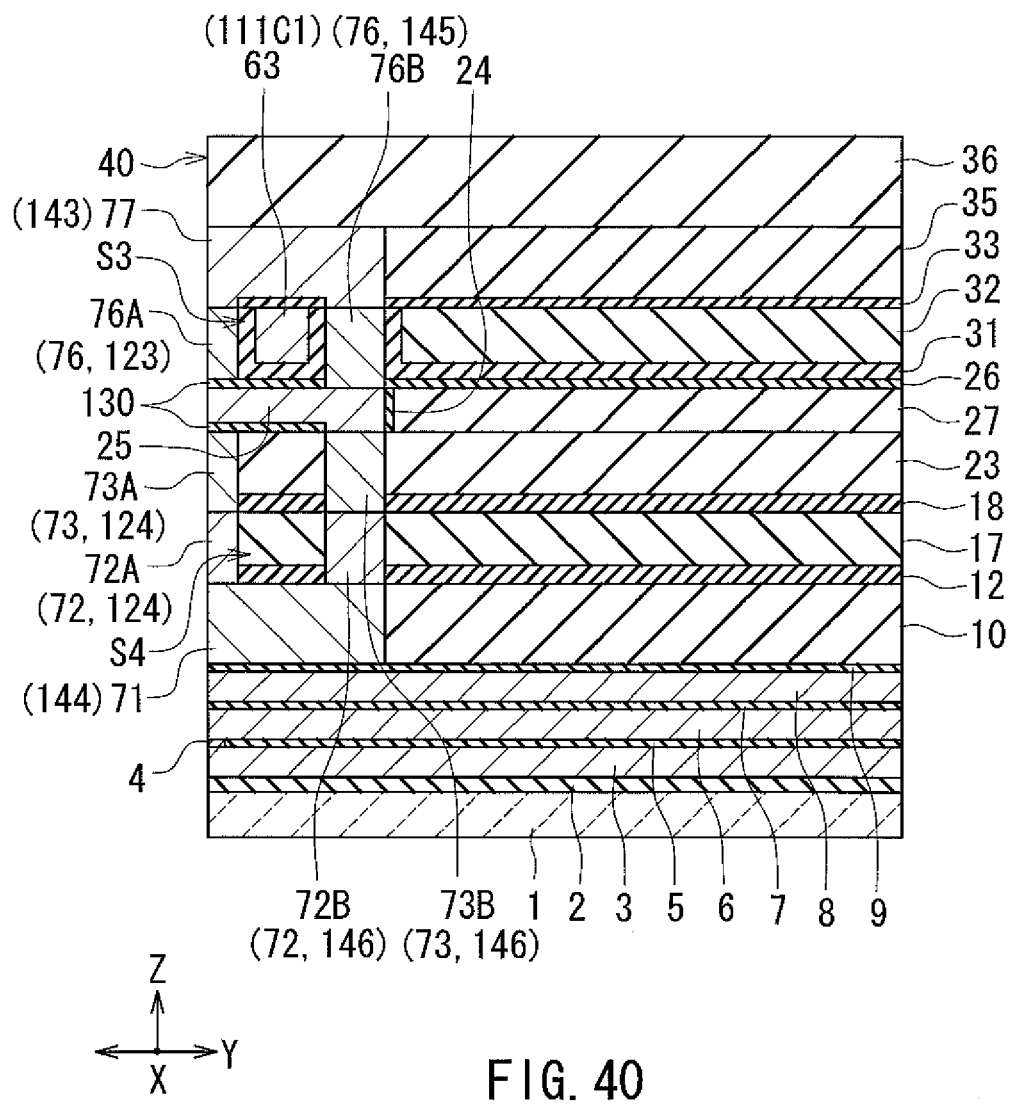
FIG. 40 is a cross-sectional view showing the configuration of the magnetic head according to the eleventh embodiment of the invention.
Figure 41:
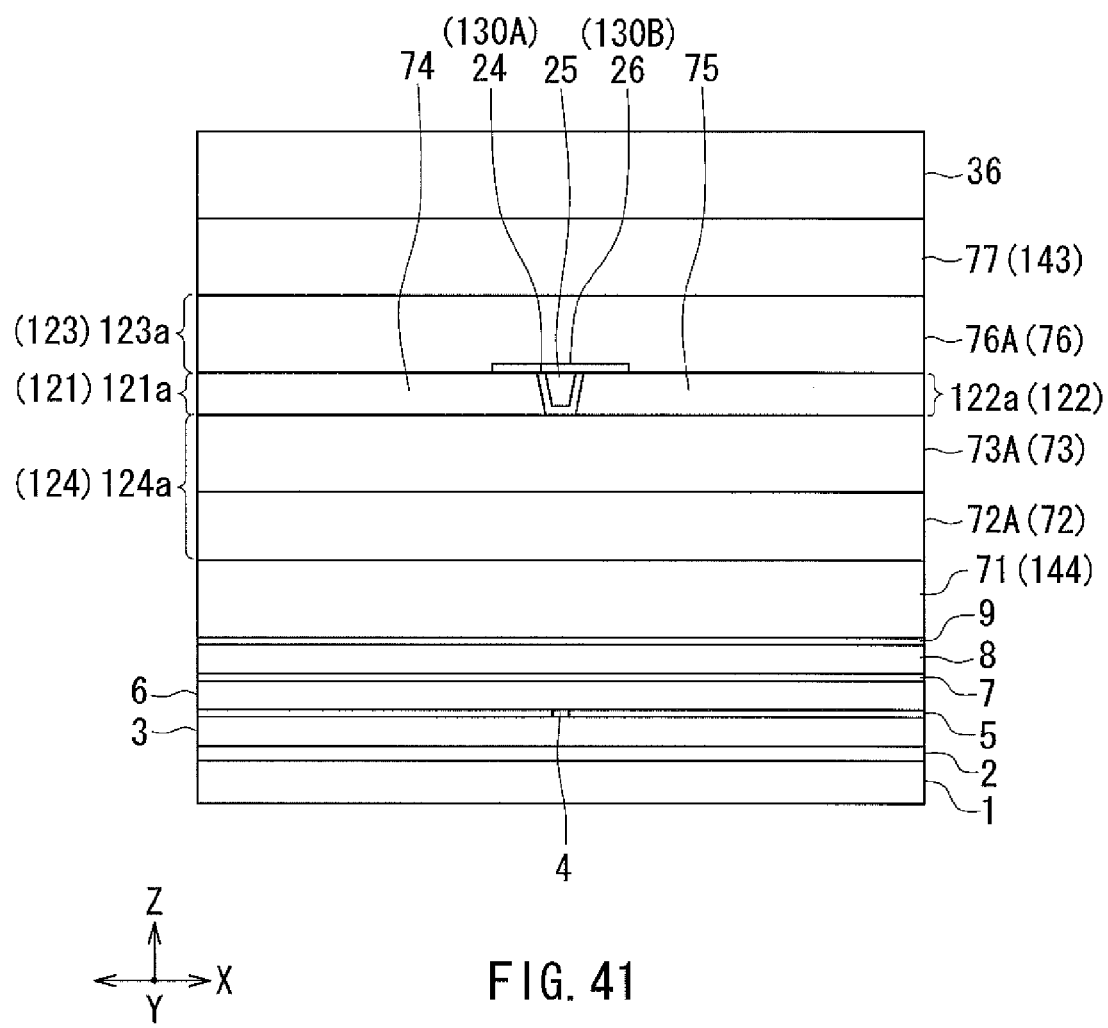
FIG. 41 is a front view showing the medium facing surface of the magnetic head according to the eleventh embodiment of the invention.

An eleventh embodiment of the present invention will now be described with reference to FIG. 39 to FIG. 41. FIG. 39 is a perspective view showing the main part of the magnetic head. FIG. 40 is a cross-sectional view showing the configuration of the magnetic head. FIG. 41 is a front view showing the medium facing surface of the magnetic head.

The magnetic head according to the present embodiment differs from the magnetic head according to the first embodiment in the following ways. In the magnetic head according to the present embodiment, the return path section 140 includes the third yoke portion 143 described in the fifth embodiment section and the fourth yoke portion 144 described in the eighth embodiment section, in addition to the first and second yoke portions 141 and 142 and the first and second coupling portions 145 and 146. The fourth shield portion 124 of the write shield 120, and the portion 141C of the first yoke portion 141, the portion 142C of the second yoke portion 142 and the second coupling portion 146 of the return path section 140 of the present embodiment are the same in shape as those of the eighth embodiment.

Further, the magnetic head according to the present embodiment has the insulating layers 33 and 35 and the magnetic layer 77 described in the fifth embodiment section and the magnetic layers 71 and 72 and the insulating layers 10 and 12 described in the eighth embodiment section.

The remainder of configuration, function and effects of the present embodiment are similar to those of the first, fifth or eighth embodiment.

Modification Example

Figure 42:
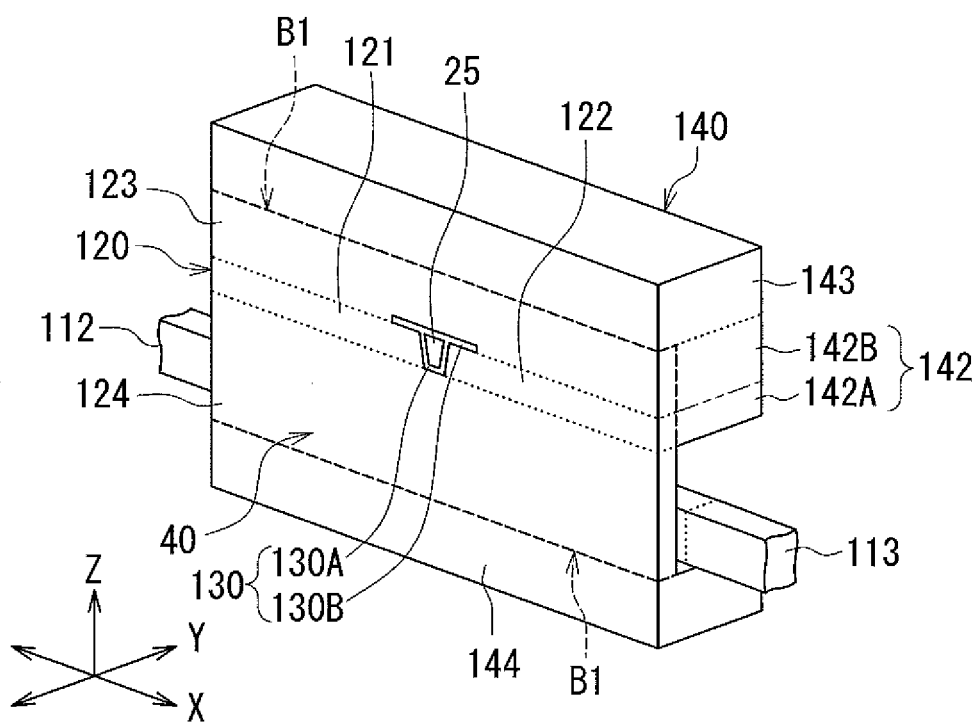
FIG. 42 is a perspective view showing the main part of a modification example of the magnetic head according to the eleventh embodiment of the invention.

A modification example of the present embodiment will now be described with reference to FIG. 42. FIG. 42 is a perspective view showing the main part of the modification example of the magnetic head according to the present embodiment. The modification example does not have the portion 142C of the second yoke portion 142 shown in FIG. 39. Further, although not illustrated, the modification example does not have the portion 141C (see FIG. 2) of the first yoke portion 141. The remainder of configuration of the modification example is the same as that of the magnetic head according to the present embodiment shown in FIG. 39 to FIG. 41. In the modification example, the second coupling portion 146 (see FIG. 40) couples the fourth yoke portion 144 and the main pole 25 to each other.

Twelfth Embodiment

Figure 43:
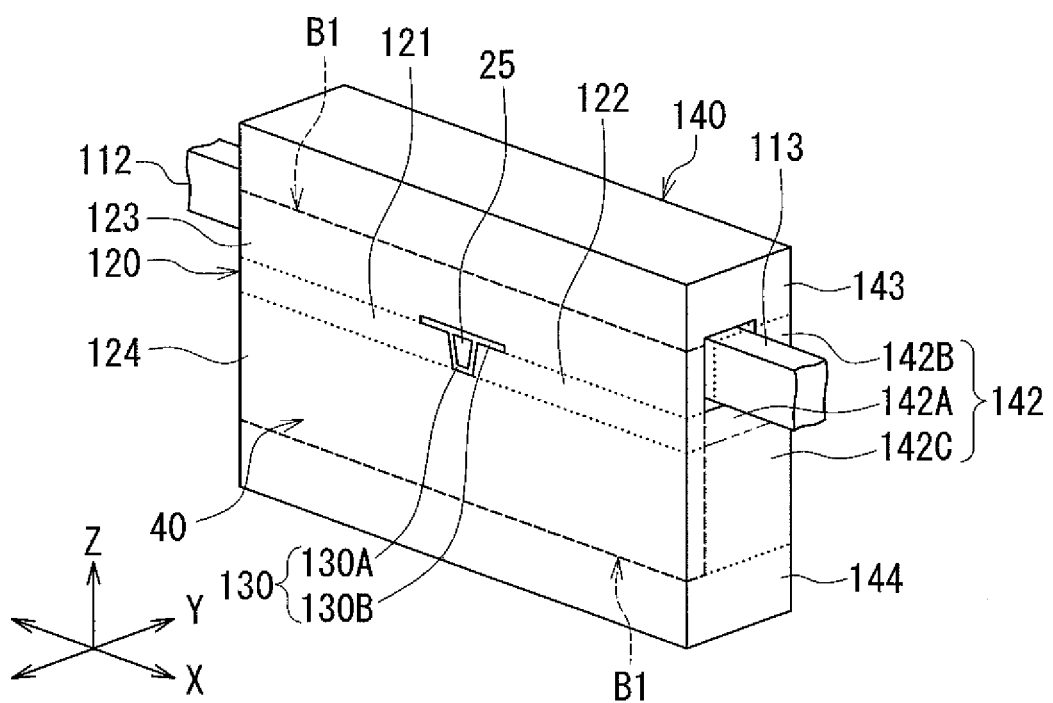
FIG. 43 is a perspective view showing the main part of a magnetic head according to a twelfth embodiment of the invention.
Figure 44:
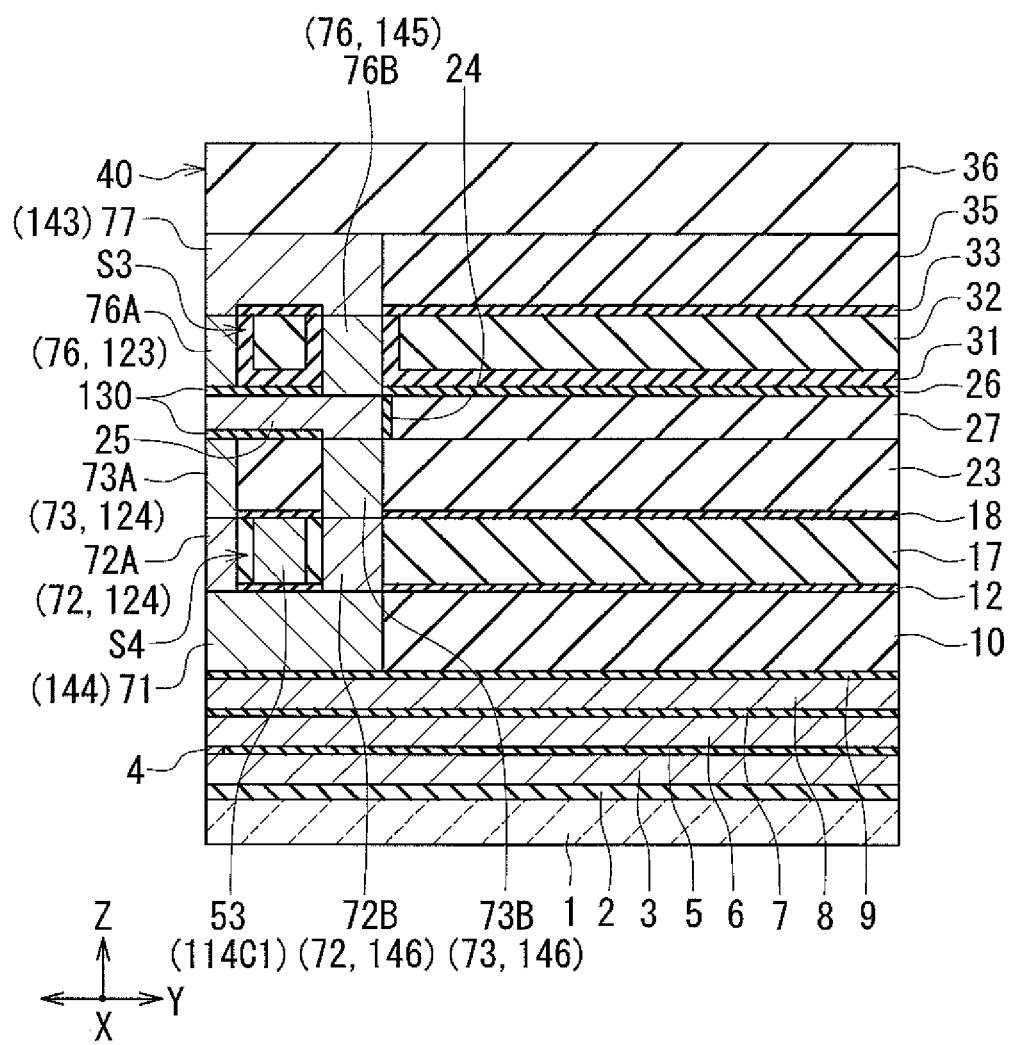
FIG. 44 is a cross-sectional view showing the configuration of the magnetic head according to the twelfth embodiment of the invention.

A twelfth embodiment of the present invention will now be described with reference to FIG. 43 and FIG. 44. FIG. 43 is a perspective view showing the main part of the magnetic head. FIG. 44 is a cross-sectional view showing the configuration of the magnetic head.

The magnetic head according to the present embodiment differs from the magnetic head according to the third embodiment in the following ways. In the magnetic head according to the present embodiment, the return path section 140 includes the third yoke portion 143 described in the sixth embodiment (fifth embodiment) section and the fourth yoke portion 144 described in the ninth embodiment (eighth embodiment) section, in addition to the first and second yoke portions 141 and 142 and the first and second coupling portions 145 and 146. The fourth shield portion 124 of the write shield 120, and the portion 141C of the first yoke portion 141, the portion 142C of the second yoke portion 142 and the second coupling portion 146 of the return path section 140 of the present embodiment are the same in shape as those of the ninth embodiment (eighth embodiment).

Further, the magnetic head according to the present embodiment has the insulating layers 33 and 35 and the magnetic layer 77 described in the sixth embodiment (fifth embodiment) section and the magnetic layers 71 and 72 and the insulating layers 10 and 12 described in the ninth embodiment (eighth embodiment) section.

The remainder of configuration, function and effects of the present embodiment are similar to those of the third, sixth or ninth embodiment.

Thirteenth Embodiment

Figure 45:
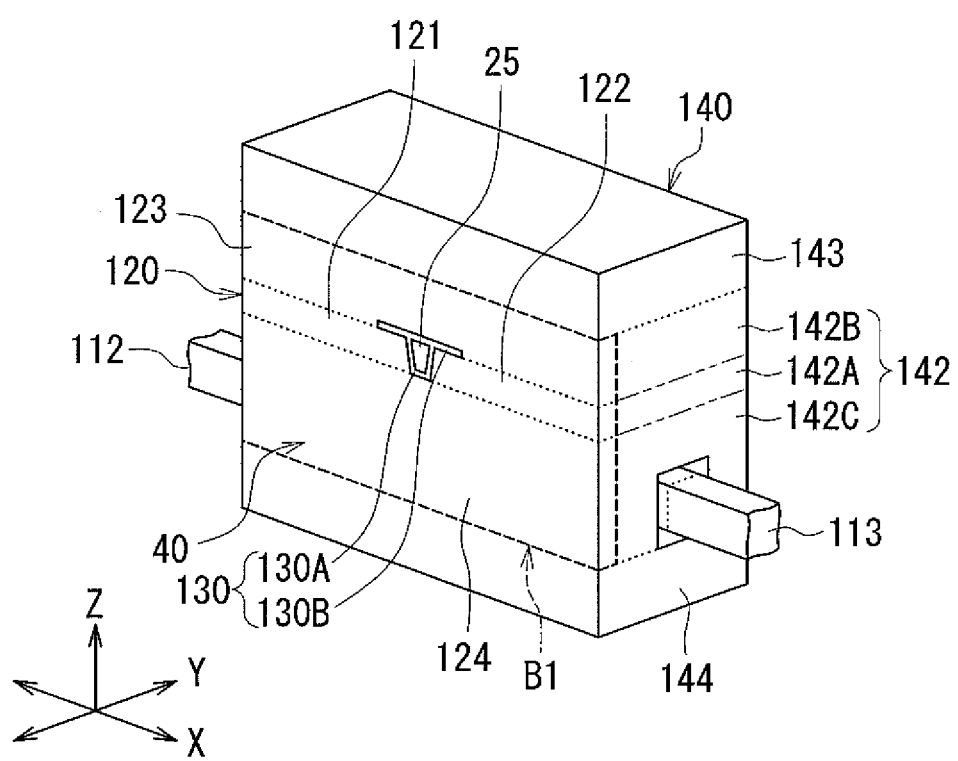
FIG. 45 is a perspective view showing the main part of a magnetic head according to a thirteenth embodiment of the invention.
Figure 46:
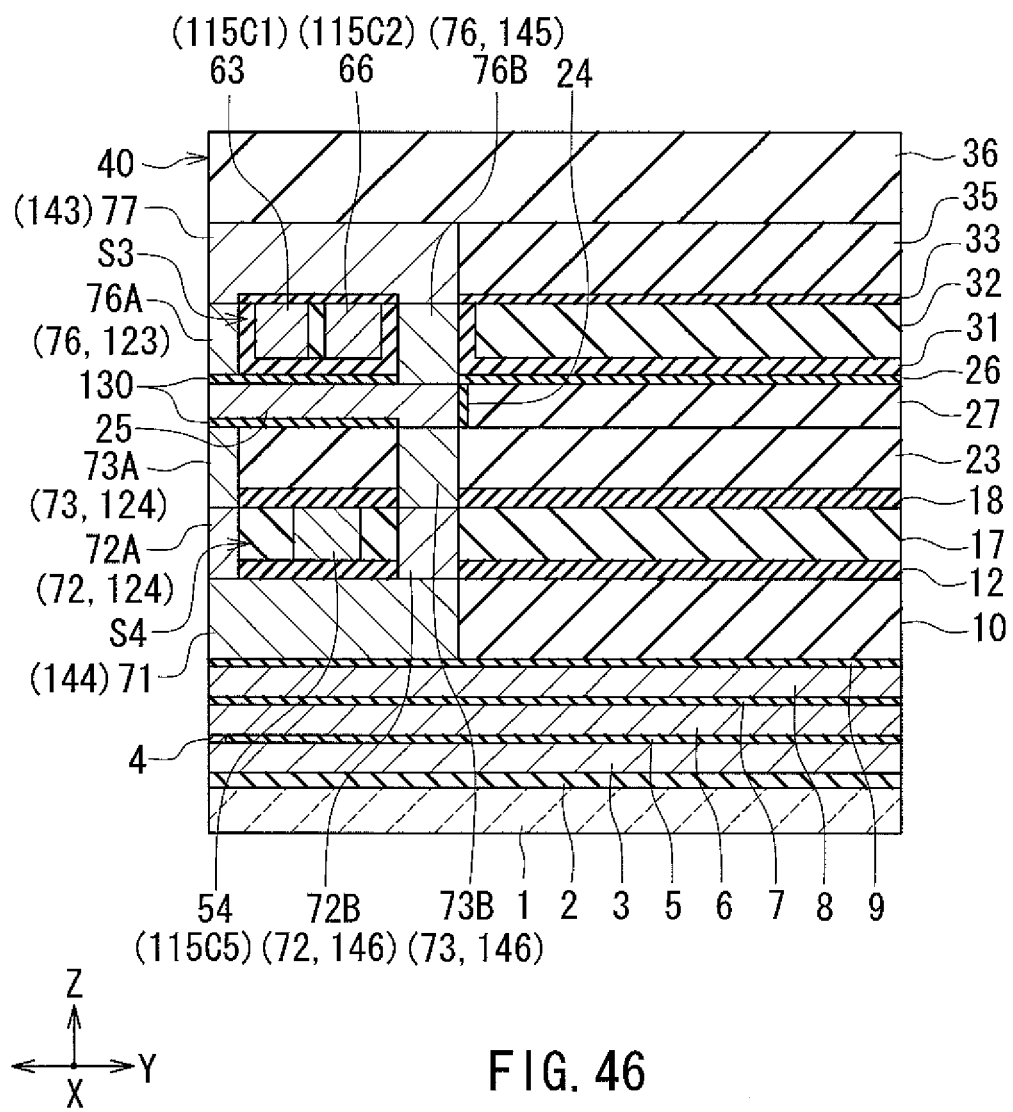
FIG. 46 is a cross-sectional view showing the configuration of the magnetic head according to the thirteenth embodiment of the invention.

A thirteenth embodiment of the present invention will now be described with reference to FIG. 45 and FIG. 46. FIG. 45 is a perspective view showing the main part of the magnetic head. FIG. 46 is a cross-sectional view showing the configuration of the magnetic head.

The magnetic head according to the present embodiment differs from the magnetic head according to the fourth embodiment in the following ways. In the magnetic head according to the present embodiment, the return path section 140 includes the third yoke portion 143 described in the seventh embodiment (fifth embodiment) section and the fourth yoke portion 144 described in the tenth embodiment (eighth embodiment) section, in addition to the first and second yoke portions 141 and 142 and the first and second coupling portions 145 and 146. The fourth shield portion 124 of the write shield 120, and the portion 141C of the first yoke portion 141, the portion 142C of the second yoke portion 142 and the second coupling portion 146 of the return path section 140 of the present embodiment are the same in shape as those of the tenth embodiment (eighth embodiment).

The coil 115 passes through the third space S3 described in the seventh embodiment (fifth embodiment) section and the fourth space S4 described in the tenth embodiment (eighth embodiment) section, in addition to the first and second spaces S1 and S2 (see FIG. 21). In the present embodiment, in particular, the portions 115C1 and 115C2 of the nonmagnetic portion 115C of the coil 115 pass through the third space S3, and the portion 115C5 of the nonmagnetic portion 115C passes through the fourth space S4. In other words, the coil 115 includes the portions 115C1 and 115C2 passing through the third space S3 and the portion 115C5 passing through the fourth space S4.

Further, the magnetic head according to the present embodiment has the insulating layers 33 and 35 and the magnetic layer 77 described in the seventh embodiment (fifth embodiment) section and the magnetic layers 71 and 72 and the insulating layers 10 and 12 described in the tenth embodiment (eighth embodiment) section.

The remainder of configuration, function and effects of the present embodiment are similar to those of the fourth, seventh or tenth embodiment.

Modification Example

Figure 47:
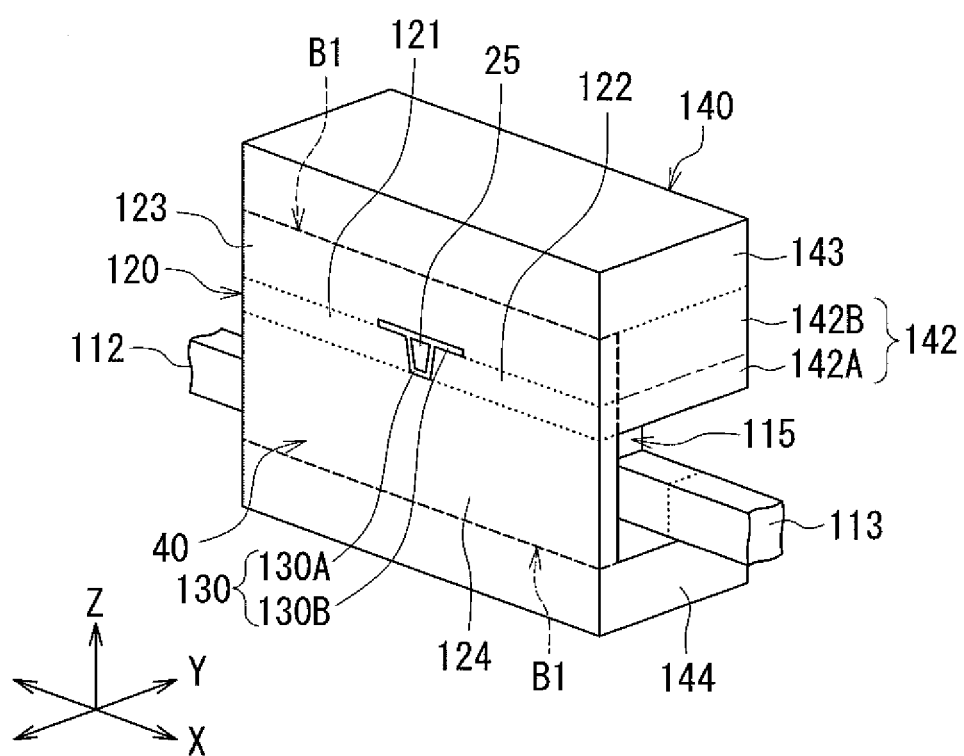
FIG. 47 is a perspective view showing the main part of a modification example of the magnetic head according to the thirteenth embodiment of the invention.

A modification example of the present embodiment will now be described with reference to FIG. 47. FIG. 47 is a perspective view showing the main part of the modification example of the magnetic head according to the present embodiment. The modification example does not have the portion 142C of the second yoke portion 142 shown in FIG. 45. Further, although not illustrated, the modification example does not have the portion 141C (see FIG. 20) of the first yoke portion 141. The remainder of configuration of the modification example is the same as that of the magnetic head according to the present embodiment shown in FIG. 45 and FIG. 46. In the modification example, the second coupling portion 146 (see FIG. 46) couples the fourth yoke portion 144 and the main pole 25 to each other.

[Simulations]

The effects of the foregoing embodiments of the present invention will now be described in more detail with reference to the results of first and second simulations. The first simulation will be described first. The first simulation used models of magnetic heads of first to third practical examples and models of magnetic heads of third and fourth comparative examples described below. The magnetic heads of the first to third practical examples each correspond to the magnetic head of the present invention.

The magnetic head of the first practical example is configured so that the return path section 140 includes the first and second yoke portions 141 and 142 and does not include the third and fourth yoke portions 143 and 144, like the first to fourth embodiments.

The magnetic head of the second practical example is configured so that the return path section 140 includes the first to third yoke portions 141 to 143 and does not include the fourth yoke portion 144, like the fifth to seventh embodiments.

The magnetic head of the third practical example is configured so that the return path section 140 includes the first to fourth yoke portions 141 to 144, like the eleventh to thirteenth embodiments.

Each of the magnetic heads of the first to third practical examples has a coil that passes through the first and second spaces S1 and S2 so as to surround at least part of the entire outer periphery of the main pole 25 when viewed from the medium facing surface 40. In the first simulation, the material of the coil is any conductive material. The material of any other coil mentioned later in relation to the first and second simulations is also any conductive material.

The magnetic head of the third comparative example is the same as the magnetic head of the first comparative example described in the first embodiment section. The magnetic head of the fourth comparative example is formed by providing the magnetic head of the third comparative example with a coil wound around the main pole 25 in place of the coil having the first winding portion wound around the first coupling part and the second winding portion wound around the second coupling part.

In the first simulation, the coils of the aforementioned models were given the same number of turns. Then, the effective write field $H_{eff}$ was determined for each model. The effective write field is a write magnetic field from the main pole 25 that effectively acts on the magnetic recording layer of a recording medium in order to form a record bit by inverting the magnetization of the magnetic recording layer. The effective write field $H_{eff}$ is expressed by the following equation using a component $H_y$ of the write magnetic field in a direction perpendicular to the magnetic recording layer (the Y direction), a component $H_T$ of the write magnetic field in the track width direction (the X direction), and a component $H_L$ of the write magnetic field in the direction in which tracks extend (the Z direction).

$$H_{eff} = \{(H_y^2 + H_T^2)^{1/3} + H_L^{2/3}\}^{3/2}$$

Figure 48:
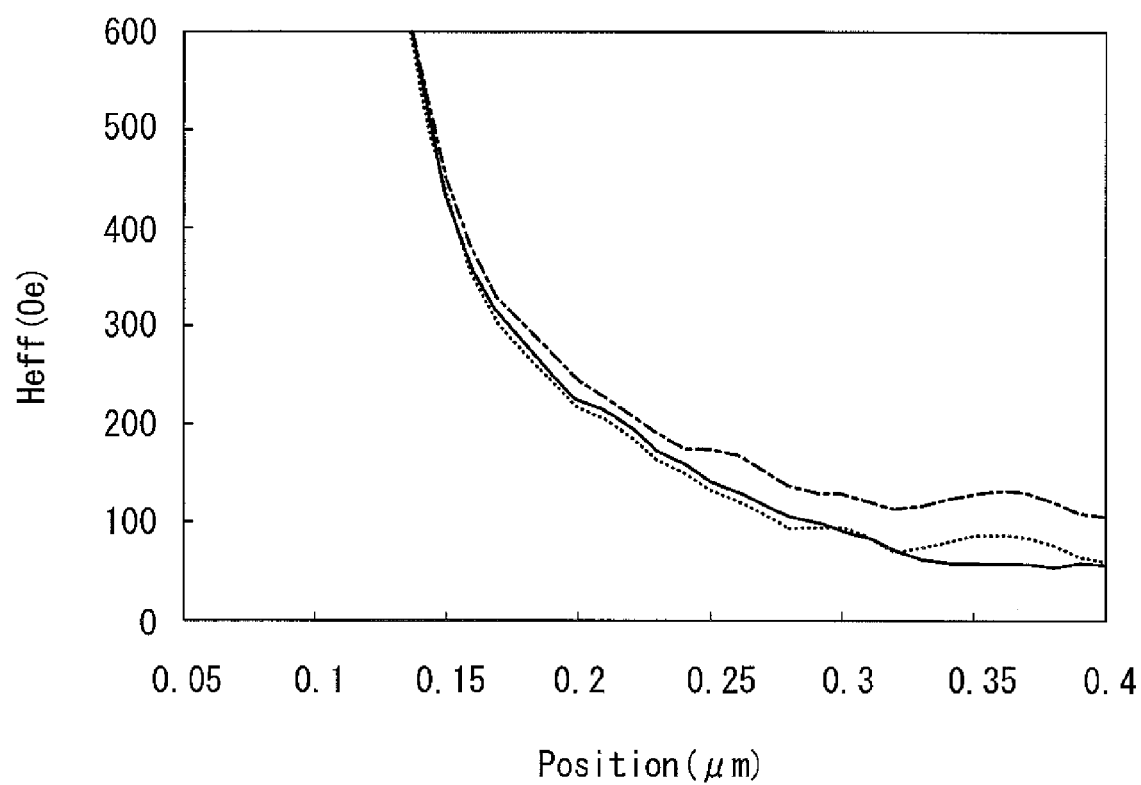
FIG. 48 is a characteristic diagram showing the effective write field determined by a first simulation.

The results of the first simulation will now be described with reference to FIG. 48. FIG. 48 is a characteristic diagram showing the effective write field $H_{eff}$ determined by the first simulation. In FIG. 48, the horizontal axis represents position on the medium facing surface 40 in the track width direction (the X direction), while the vertical axis represents the effective write field $H_{eff}$. On the horizontal axis of FIG. 48, the center position of the end face of the main pole 25 in the track width direction is taken as 0 μm for each model. $H_{eff}$ is measured in Oe (1 Oe=79.6 A/m). Further, in FIG. 48, the solid line represents the average value of the effective write fields $H_{eff}$ of the magnetic head models of the first to third practical examples; the dot-and-dash line represents the effective write field $H_{eff}$ of the magnetic head model of the third comparative example; and the dotted line represents the effective write field $H_{eff}$ of the magnetic head model of the fourth comparative example. Because the magnetic head models of the first to third practical examples showed effective write fields $H_{eff}$ of almost the same value, FIG. 48 shows the average value of the effective write fields $H_{eff}$ of these models.

As shown in FIG. 48, the magnetic head models of the first to third practical examples have a lower effective write field $H_{eff}$ in a wide range away from the center of the end face of the main pole 25 in the track width direction, when compared with the magnetic head model of the third comparative example. Further, the magnetic head models of the first to third practical examples have a lower effective write field $H_{eff}$ particularly in the vicinity of the position of 0.36 μm on the horizontal axis of FIG. 48 when compared with the magnetic head model of the fourth comparative example. At the position of 0.36 μm on the horizontal axis of FIG. 48, the avarage effective write field $H_{eff}$ of the magnetic head models of the first to third practical examples was about 57 Oe, the effective write field $H_{eff}$ of the magnetic head model of the third comparative example was about 131 Oe, and that of the magnetic head model of the fourth comparative example was about 87 Oe. As can be seen from these results, when compared with the magnetic heads of the third and fourth comparative examples, the magnetic head of the present invention is more capable of reducing the magnitude of a magnetic field directed toward the recording medium from a position away from the end face of the main pole 25 in the track width direction, and thus more capable of preventing unwanted erasure.

The second simulation will now be described. In the second simulation, the magnetic flux rise time defined as below was determined for each of the models employed for the first simulation. The magnetic flux rise time is the time that elapses from the start of generation of a magnetic flux from the end face of the main pole 25 until the amount of the magnetic flux generated from the end face of the main pole 25 reaches 80% of the maximum value. The magnetic flux rise time is a parameter representative of the high frequency characteristics of a magnetic head, showing that the shorter the time, the higher the rate at which the direction of the magnetic flux generated from the end face of the main pole 25 varies. As the frequency of the write signal is increased in order to provide higher recording density, it is required of the write head unit to provide an improved rate of change in the direction of the magnetic flux generated from the end face of the main pole 25, that is, to shorten the magnetic flux rise time. The other conditions for the second simulation were the same as those for the first simulation.

The results of the second simulation will now be described with reference to Table 1. Table 1 shows the magnetic flux rise time for each model determined by the second simulation. The magnetic flux rise time is in ps. Table 1 also shows the component $H_y$ of the write magnetic field in a direction perpendicular to the magnetic recording layer (the Y direction), determined for each model by the first simulation. $H_y$ is in Oe.

TABLE 1

| Model | $H_y$ (Oe) | Rise time (ps) |
|---|---|---|
| Third practical example | 7284 | 65.9 |
| Second practical example | 7276 | 66.1 |
| First practical example | 7275 | 66.4 |
| Fourth comparative example | 7271 | 66.8 |
| Third comparative example | 7241 | 68.0 |

As shown in Table 1, for each of the magnetic head models of the first to third practical examples, the component $H_y$ of the write magnetic field is greater and the magnetic flux rise time is shorter, when compared with the magnetic head models of the third and fourth comparative examples. This suggests that the magnetic head models of the first to third practical examples provide higher utilization efficiency of the magnetic field produced by the coil when compared with the magnetic head models of the third and fourth comparative examples.

The magnetic head model of the second practical example is greater in component $H_y$ of the write magnetic field and shorter in magnetic flux rise time than the magnetic head model of the first practical example. Further, the magnetic head model of the third practical example is greater in component $H_y$ of the write magnetic field and shorter in magnetic flux rise time than the magnetic head model of the second practical example. These results show that in the magnetic head of the present invention, the inclusion of at least one of the third yoke portion 143 and the fourth yoke portion 144, in addition to the first and second yoke portions 141 and 142, in the return path section 140 allows further enhancement of the utilization efficiency of the magnetic field produced by the coil.

The benefit of being able to enhance the utilization efficiency of the magnetic field produced by the coil, provided by the magnetic head of the present invention, becomes more noticeable particularly when the coil has a smaller number of turns. Now, this will be described below. It can be generally said that the less the minimum value of the write current (hereafter referred to as the minimum write current value) required to obtain desired write characteristics, the higher the performance of the write head unit. For the write head unit including the write shield and the return path section, the minimum write current value depends on the volume of the magnetic path formed by the main pole, the write shield and the return path section, and the magnetomotive force of the coil. In general, the volume of the magnetic path formed by the main pole, the write shield and the return path section increases with an increase in the yoke length which is the distance from the medium facing surface to one of edges of the one or more interfaces between the main pole and the return path section that is closest to the medium facing surface. Thus, the minimum write current value can be said to be dependent on the yoke length and the magnetomotive force of the coil. The minimum write current value decreases as the yoke length decreases and as the magnetomotive force of the coil increases.

On the other hand, as described above, as the frequency of the write signal is increased in order to provide higher recording density, it is required of the write head unit to provide an improved rate of change in the direction of the magnetic flux generated from the end face of the main pole. To meet this requirement, the write head unit including the write shield and the return path section desirably has a shorter yoke length. In general, however, shortening the yoke length requires that the number of turns of the coil be reduced. Thus, shortening the yoke length should result in a reduction of the magnetomotive force of the coil.

Typical magnetic heads that have been mass-produced often have a coil of three or four turns. On the other hand, the yoke length is about 8.5 µm for a coil of four turns, and about 6.5 µm for a coil of three turns. From this, it is conceivable that the yoke length will be about 4.5 µm for a coil of two turns, and about 2.5 µm for a coil of one turn.

Table 2 shows the relationship between the yoke length, the number of turns of the coil, and the yoke length per turn of the coil. The yoke length per turn of the coil is the yoke length divided by the number of turns of the coil.

TABLE 2

| Yoke length (µm) | Number of turns of coil | Yoke length per turn of coil (µm/number of turns) |
|---|---|---|
| 8.5 | 4 | 2.13 |
| 6.5 | 3 | 2.17 |
| 4.5 | 2 | 2.25 |
| 2.5 | 1 | 2.50 |

Table 2 shows that the smaller the number of turns of the coil, the greater the yoke length per turn of the coil becomes. This means that as the number of turns of the coil is reduced, the volume of the magnetic path that has to be driven by one turn of the coil increases when a current of the same value flows through the coil. Accordingly, the minimum write current value may increase as the number of turns of the coil is reduced.

Thus, in order to inhibit an increase in the minimum write current value even when the number of turns of the coil is as small as one or two, it is necessary to reduce the yoke length or improve the structure of the return path section so as to utilize more efficiently the magnetic field produced by the coil. Reducing the yoke length would require that the magnetic head be manufactured with higher precision, thus placing additional burden on the manufacturing process of the magnetic head. It is thus desirable to inhibit an increase in the minimum write current value by improving the structure of the return path section.

According to the magnetic head of the present invention, the return path section 140 includes the first and second yoke portions 141 and 142, and the coil 111, 114 or 115 passes through the first and second spaces S1 and S2 so as to surround at least part of the entire outer periphery of the main pole 25 when viewed from the medium facing surface 40. This allows the utilization efficiency of the magnetic field produced by the coil to be higher than that provided by the magnetic heads of the third and fourth comparative examples. Furthermore, structurally, the return path section 140 of the magnetic head of the present invention can include at least one of the third yoke portion 143 and the fourth yoke portion 144. The inclusion of at least one of the third yoke portion 143 and the fourth yoke portion 144 in the return path section 140 allows further enhancement of the utilization efficiency of the magnetic field produced by the coil. In this manner, the magnetic head of the present invention makes it possible to inhibit an increase in the minimum write current value. This benefit becomes more noticeable particularly when the number of turns of the coil is as small as one or two.

Now, a description will be made as to the effect provided by the particular configuration in which the coil 111 or 114 does not wrap one turn around the entire outer periphery of the main pole 25 when viewed from the medium facing surface 40. First, to reduce the resistance of the conductor made up of the coil and the leads 112 and 113, a cross section of the conductor orthogonal to the direction of current passing through the two leads 112 and 113 connected to opposite ends of the coil is preferably shaped to increase in size immediately after the coil. To that end, in view of space in the magnetic head, the two leads 112 and 113 are preferably drawn from the coil in opposite directions along the track width.

Where the coil wraps one or more turns around the entire outer periphery of the main pole 25 when viewed from the medium facing surface 40, drawing the two leads 112 and 113 from the coil in opposite directions along the track width would inevitably result in a structure in which two or more portions of the coil lie side by side in the Y direction. In this case, the manufacturing process of the coil is complicated and it is not possible to reduce the yoke length YL.

In contrast, where the coil does not wrap one turn around the entire outer periphery of the main pole 25 when viewed from the medium facing surface 40, it is possible to draw the two leads 112 and 113 from the coil in opposite directions along the track width without necessitating the structure in which two or more portions of the coil lie side by side in the Y direction. In this case, the manufacturing process of the coil is simplified and a reduction of the yoke length YL is possible.

The present invention is not limited to the foregoing embodiments, and various modifications may be made thereto. For example, the magnetic head of the present invention may be a thermally-assisted magnetic recording head or a microwave-assisted magnetic recording head provided with a means for applying heat or a microwave magnetic field to a recording medium.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
   a medium facing surface facing a recording medium;
   a coil that produces a magnetic field corresponding to data to be written on the recording medium;
   a main pole having an end face located in the medium facing surface, the main pole allowing a magnetic flux that corresponds to the magnetic field produced by the coil to pass, and producing a write magnetic field for writing the data on the recording medium by means of a perpendicular magnetic recording system;
   a write shield made of a magnetic material and having an end face located in the medium facing surface;
   a gap part made of a nonmagnetic material and interposed between the main pole and the write shield; and a return path section made of a magnetic material, the return path section connecting the write shield and part of the main pole away from the medium facing surface to each other, wherein the end face of the write shield includes a first end face portion and a second end face portion located on opposite sides of the end face of the main pole in a track width direction, the write shield includes a first shield portion and a second shield portion located on opposite sides of the main pole in the track width direction, the first shield portion has the first end face portion, the second shield portion has the second end face portion, the return path section includes a first yoke portion and a second yoke portion located on opposite sides of the main pole in the track width direction, the first yoke portion is connected to the first shield portion so that a first space is defined by the main pole, the gap part, the first shield portion and the first yoke portion, the second yoke portion is connected to the second shield portion so that a second space is defined by the main pole, the gap part, the second shield portion and the second yoke portion, the coil passes through the first and second spaces so as to surround at least part of an entire outer periphery of the main pole when viewed from the medium facing surface, the first shield portion includes a portion located between the first space and the medium facing surface, the second shield portion includes a portion located between the second space and the medium facing surface, and the coil includes a first magnetic portion located in the first space and a second magnetic portion located in the second space, the first and second magnetic portions being made of a magnetic conductive material.

2. The magnetic head according to claim 1, wherein the coil further includes a nonmagnetic portion located outside the first and second spaces and made of a nonmagnetic conductive material.

3. The magnetic head according to claim 1, wherein, at least in a region between two cross sections that are perpendicular to a direction of travel of the recording medium and sandwich the first and second magnetic portions of the coil, the write shield and the return path section are made of the same material as the first and second magnetic portions of the coil.

4. The magnetic head according to claim 1, wherein the write shield includes a portion that is located farther from the main pole in the track width direction than are one or more interfaces between the write shield and the return path section.

5. The magnetic head according to claim 1, wherein the end face of the write shield further includes a third end face portion located on a front side in a direction of travel of the recording medium relative to the end face of the main pole, the write shield further includes a third shield portion located on the front side in the direction of travel of the recording medium relative to the main pole, and the third shield portion has the third end face portion.

6. The magnetic head according to claim 5, wherein the return path section further includes a third yoke portion located on the front side in the direction of travel of the recording medium relative to the main pole, and the third yoke portion is connected to the third shield portion so that a third space is defined by the main pole, the gap part, the third shield portion and the third yoke portion.

7. The magnetic head according to claim 6, wherein the coil includes a portion passing through the third space.

8. The magnetic head according to claim 7, wherein the portion of the coil passing through the third space is made of a nonmagnetic conductive material.

9. The magnetic head according to claim 1, wherein the end face of the write shield further includes a fourth end face portion located on a rear side in a direction of travel of the recording medium relative to the end face of the main pole, the write shield further includes a fourth shield portion located on the rear side in the direction of travel of the recording medium relative to the main pole, and the fourth shield portion has the fourth end face portion.

10. The magnetic head according to claim 9, wherein the return path section further includes a fourth yoke portion located on the rear side in the direction of travel of the recording medium relative to the main pole, and the fourth yoke portion is connected to the fourth shield portion so that a fourth space is defined by the main pole, the gap part, the fourth shield portion and the fourth yoke portion.

11. The magnetic head according to claim 10, wherein the coil includes a portion passing through the fourth space.

12. The magnetic head according to claim 11, wherein the portion of the coil passing through the fourth space is made of a nonmagnetic conductive material.

13. The magnetic head according to claim 1, wherein the end face of the write shield further includes a third end face portion located on a front side in a direction of travel of the recording medium relative to the end face of the main pole, and a fourth end face portion located on a rear side in the direction of travel of the recording medium relative to the end face of the main pole, the write shield further includes a third shield portion located on the front side in the direction of travel of the recording medium relative to the main pole, and a fourth shield portion located on the rear side in the direction of travel of the recording medium relative to the main pole, the third shield portion has the third end face portion, and the fourth shield portion has the fourth end face portion.

14. The magnetic head according to claim 13, wherein the return path section further includes a third yoke portion located on the front side in the direction of travel of the recording medium relative to the main pole, and a fourth yoke portion located on the rear side in the direction of travel of the recording medium relative to the main pole, the third yoke portion is connected to the third shield portion so that a third space is defined by the main pole, the gap part, the third shield portion and the third yoke portion, and the fourth yoke portion is connected to the fourth shield portion so that a fourth space is defined by the main pole, the gap part, the fourth shield portion and the fourth yoke portion.

15. The magnetic head according to claim 14, wherein the coil includes a portion passing through at least one of the third space and the fourth space.

16. The magnetic head according to claim 15, wherein the portion of the coil passing through at least one of the third space and the fourth space is made of a nonmagnetic conductive material.

17. The magnetic head according to claim 1, wherein the coil does not wrap one turn around the entire outer periphery of the main pole.

18. The magnetic head according to claim 17, wherein, of the entire outer periphery of the main pole when viewed from the medium facing surface, the coil surrounds a portion located on a front side or a rear side in a direction of travel of the recording medium and portions located on opposite sides in the track width direction.

19. The magnetic head according to claim 18, wherein a distance from the medium facing surface to one of edges of one or more interfaces between the main pole and the return path section, the one of the edges being closest to the medium facing surface, falls within the range of 1.0 to 2.5 µm.

20. A head assembly comprising a slider, and a supporter that flexibly supports the slider, wherein the slider includes the magnetic head according to claim 1 and is disposed to face a recording medium.

21. A magnetic recording device comprising the magnetic head according to claim 1, a recording medium, and a positioning device that supports the magnetic head and positions the magnetic head with respect to the recording medium.

22. A method of manufacturing the magnetic head for perpendicular magnetic recording of claim 1, comprising the steps of: forming the coil; forming the main pole; forming the write shield; forming the gap part; and forming the return path section, wherein
  the step of forming the coil includes the step of forming the first and second magnetic portions using the magnetic conductive material,
  the step of forming the write shield includes the step of forming at least part of the write shield using the same material as the first and second magnetic portions of the coil,
  the step of forming the return path section includes the step of forming at least part of the return path section using the same material as the first and second magnetic portions of the coil, and
  the step of forming the first and second magnetic portions of the coil, the step of forming the at least part of the write shield, and the step of forming the at least part of the return path section are performed simultaneously.

23. The method according to claim 22, wherein
  the coil further includes a nonmagnetic portion located outside the first and second spaces and made of a nonmagnetic conductive material, and
  the step of forming the coil further includes the step of forming the nonmagnetic portion.

* * * * *